(12) United States Patent
Wu et al.

(10) Patent No.: US 12,392,931 B2
(45) Date of Patent: Aug. 19, 2025

(54) METHOD FOR PRODUCING WETTABLE SILICONE HYDROGEL CONTACT LENSES

(71) Applicant: Alcon Inc., Fribourg (CH)

(72) Inventors: Daqing Wu, Suwanee, GA (US); Feng Jing, Snellville, GA (US); Steve Yun Zhang, Sugar Hill, GA (US); Junhao Ge, Shanghai (CN); Jack W. Trieu, Atlanta, GA (US)

(73) Assignee: Alcon Inc., Fribourg (CH)

( * ) Notice: Subject to any disclaimer, the term of this patent is extended or adjusted under 35 U.S.C. 154(b) by 0 days.

(21) Appl. No.: 17/823,539

(22) Filed: Aug. 31, 2022

(65) Prior Publication Data

US 2023/0103231 A1    Mar. 30, 2023

Related U.S. Application Data

(60) Provisional application No. 63/239,694, filed on Sep. 1, 2021.

(51) Int. Cl.
| | | |
|---|---|---|
| G02B 1/14 | (2015.01) | |
| B29D 11/00 | (2006.01) | |
| G02B 1/04 | (2006.01) | |
| B29K 83/00 | (2006.01) | |

(52) U.S. Cl.
CPC ........ *G02B 1/043* (2013.01); *B29D 11/00067* (2013.01); *B29D 11/00076* (2013.01); *B29D 11/00134* (2013.01); *B29D 11/0048* (2013.01); *B29D 11/00865* (2013.01); *G02B 1/14* (2015.01); *B29K 2083/00* (2013.01)

(58) Field of Classification Search
CPC .... G02B 1/043; G02B 1/14; B29D 11/00067; B29D 11/00076; B29D 11/00134; B29D 11/0048; B29D 11/00865
See application file for complete search history.

(56) References Cited

U.S. PATENT DOCUMENTS

| | | |
|---|---|---|
| 1,019,770 A | 3/1912 | Doner |
| 4,444,711 A | 4/1984 | Schad |
| 4,460,534 A | 7/1984 | Boehm et al. |
| 4,929,693 A | 5/1990 | Akashi |
| 5,166,345 A | 11/1992 | Akashi et al. |
| 5,527,925 A | 6/1996 | Chabrecek et al. |
| 5,843,346 A | 12/1998 | Morrill |
| 5,894,002 A | 4/1999 | Boneberger et al. |
| 6,017,121 A | 1/2000 | Chateau et al. |
| 6,019,914 A | 2/2000 | Lokshin et al. |
| 6,113,814 A | 9/2000 | Gemert et al. |
| 6,149,841 A | 11/2000 | Kumar |
| 6,218,508 B1 | 4/2001 | Kragh et al. |
| 6,296,785 B1 | 10/2001 | Nelson et al. |
| 6,348,604 B1 | 2/2002 | Nelson et al. |
| 6,440,571 B1 | 8/2002 | Valint, Jr. et al. |
| 7,556,750 B2 | 7/2009 | Xiao et al. |
| 7,584,630 B2 | 9/2009 | Van Gemert |
| 7,605,190 B2 | 10/2009 | Moszner et al. |
| 7,999,989 B2 | 8/2011 | Asai et al. |
| 8,158,037 B2 | 4/2012 | Chopra et al. |
| 8,318,144 B2 | 11/2012 | Ketelson et al. |
| 8,529,057 B2 | 9/2013 | Qiu et al. |
| 8,647,699 B2 | 2/2014 | Muller et al. |
| 8,697,770 B2 | 4/2014 | Duis et al. |
| 8,741,188 B2 | 6/2014 | Chopra et al. |
| 9,052,438 B2 | 6/2015 | Xiao et al. |
| 9,097,916 B2 | 8/2015 | Chopra et al. |
| 9,422,447 B2 | 8/2016 | Holland et al. |
| 9,465,234 B2 | 10/2016 | Chopra et al. |
| 9,505,184 B2 | 11/2016 | Kolluru et al. |
| 9,720,138 B2 | 8/2017 | Chang |
| 9,904,074 B2 | 2/2018 | Duis et al. |
| 10,081,697 B2 | 9/2018 | Huang et al. |
| 10,197,707 B2 | 2/2019 | Xiao et al. |
| 10,449,740 B2 | 10/2019 | Qian et al. |
| 2011/0085128 A1* | 4/2011 | Liu .......... G02B 1/043 264/1.36 |
| 2012/0026457 A1 | 2/2012 | Qiu et al. |
| 2013/0118127 A1* | 5/2013 | Kolluru ........ G02B 1/043 351/159.33 |
| 2015/0316688 A1 | 11/2015 | Cefalo et al. |
| 2016/0061995 A1 | 3/2016 | Chang et al. |
| 2017/0165932 A1* | 6/2017 | Qian ........... B29D 11/00038 |
| 2017/0166673 A1* | 6/2017 | Huang ............ C08G 77/16 |
| 2019/0179055 A1 | 6/2019 | Qiu et al. |
| 2021/0181379 A1 | 6/2021 | Zheng et al. |
| 2022/0251302 A1 | 8/2022 | Chang et al. |

* cited by examiner

FOREIGN PATENT DOCUMENTS

EP    0632329 A1    1/1995

*Primary Examiner* — Jacob T Minskey
*Assistant Examiner* — Adrien J Bernard
(74) *Attorney, Agent, or Firm* — Jian Zhou

(57) ABSTRACT

The invention provide a method for producing coated silicone hydrogel contact lenses in a cost-effective and environmentally friendly manner. The method is free of lens extraction step and comprises: curing thermally or actinically in a lens mold a polymerizable composition that comprises at least one hydrophilized polysiloxane vinylic crosslinker, hydroxyethyl methacrylate, $C_1$-$C_2$ alkoxyethyl (meth)acrylate, at least one free-radical initiator, and at least one solvent selected from the group consisting of water, propylene glycol, and/or a low-molecular weight polyethyleneglycol; and heating the cast-molded silicone hydrogel contact lens in an aqueous coating solution to form a coated silicone hydrogel contact lens comprising a bulk silicone hydrogel material and a layer of a crosslinked hydrophilic polymeric material that is covalently attached onto the bulk silicone hydrogel material. Resultant contact lenses are optically clear and wettable and have a relatively high oxygen permeability.

12 Claims, No Drawings

METHOD FOR PRODUCING WETTABLE SILICONE HYDROGEL CONTACT LENSES

This application claims the benefit under 35 USC § 119 (e) of U.S. provisional application No. 63/239,694 filed 1 Sep. 2021, incorporated by reference in its entirety.

The present invention is related to a method for producing optically-clear and wettable silicone hydrogel contact lenses in a cost-effective and environmentally friendly manner. The present invention is also related to wettable silicone hydrogel contact lenses made according to a method of the invention.

BACKGROUND

In recent years, soft silicone hydrogel contact lenses become more and more popular because of their high oxygen permeability and comfort. "Soft" contact lenses can conform closely to the shape of the eye, so oxygen cannot easily circumvent the lens. Soft contact lenses must allow oxygen from the surrounding air (i.e., oxygen) to reach the cornea because the cornea does not receive oxygen from the blood supply like other tissue. If sufficient oxygen does not reach the cornea, corneal swelling occurs. Extended periods of oxygen deprivation cause the undesirable growth of blood vessels in the cornea. By having high oxygen permeability, a silicone hydrogel ("SiHy") contact lens allows sufficient oxygen permeate through the lens to the cornea and to have minimal adverse effects on corneal health.

Most commercially available SiHy contact lenses are produced according to a conventional cast molding technique involving use of disposable plastic molds and a SiHy lens-forming composition (or a SiHy lens formulation) that generally includes one or more silicone-containing polymerizable components and at least one hydrophilic polymerizable component. However, silicone-containing polymerizable components and hydrophilic polymerizable components are not miscible (compatible with each other) sufficiently to form an optically clear lens formulation for making optically clear SiHy contact lenses. Moreover, the silicone-containing components are typically not soluble in water or an ophthalmically-compatible solvent (as non-reactive diluent). As such, one or more ophthalmically incompatible organic solvents have to be used in a SiHy lens formulation.

Furthermore, some polymerizable components in a SiHy lens formulation may not be ophthalmically compatible. Unreacted and partially-reacted polymerizable components left in resultant SiHy contact lenses formed from a SiHy lens formulation need to be removed in an extraction process involving use of one or more ophthalmically incompatible organic solvents. Such lens extraction increases the production cost and decreases the production efficiency.

Because of use of one or more ophthalmically incompatible organic solvents in a SiHy lens formulation and in an extraction process, a solvent exchange or hydration process has been carried out in the production. Such solvent exchange or hydration process also increases the production cost and decreases the production efficiency.

Use of ophthalmically incompatible organic solvents in the production of SiHy contact lenses can be costly and is not environmentally friendly. It is desirable that a process for manufacturing SiHy contact lens does not involve use of any ophthalmically incompatible organic solvent.

In addition, a SiHy material typically has a surface, or at least some areas of its surface, which is hydrophobic (non-wettable) and susceptible to adsorbing lipids or proteins from the ocular environment and may adhere to the eye. Thus, a SiHy contact lens will generally require a surface modification. Recently, a new cost-effective approach has been described in U.S. Pat. Nos. 8,529,057 and 10,449,740 for applying a non-silicone hydrogel coating onto a SiHy contact lens, comprising a step of forming a base coating on a SiHy contact lens, one or more steps of rinsing the SiHy contact lens having the base coating thereon with a solvent (e.g., water, a mixture of water and an organic solvent, and/or a buffered saline, and a step of covalently attaching of a partially-crosslinked hydrophilic polymeric material onto the base coating directly in a lens package during autoclave. The base-coating forming and rinsing steps may not be environmentally friendly and/or can increase the production cost and decrease the production efficiency.

Therefore, there is still a need for a cost-effective and environmentally-friendly method for producing SiHy contact lenses, especially wettable SiHy contact lenses.

SUMMARY OF THE INVENTION

The present invention, in one aspect, provides a method for producing coated silicone hydrogel contact lenses, comprising the steps of: (1) introducing a polymerizable composition into a lens mold, wherein the polymerizable composition comprises (a) at least one hydrophilized polysiloxane vinylic crosslinker, (b) optionally hydroxyethyl methacrylate, (c) at least one $C_1$-$C_2$ alkoxyethyl (meth) acrylate, (d) from about 2% to about 10% by weight of at least one carboxyl-containing (meth)acryloxy monomer relative to the total amount of all polymerizable components, (e) at least one free-radical, and (f) optionally at least one solvent selected from the group consisting of water, propylene glycol, a polyethyleneglycol having a molecular weight of about 400 Daltons or less, and combinations thereof; (2) curing thermally or actinically the polymerizable composition in the lens mold to form a silicone hydrogel lens precursor comprising a bulk silicone hydrogel material that comprises carboxyl groups; (3) optionally hydrating the silicone hydrogel lens precursor obtained in step (2) in water or an aqueous solution to obtain a hydrated silicone hydrogel contact lens; and (4) heating the silicone hydrogel lens precursor obtained in step (2) or the hydrated silicone hydrogel contact lens obtained in step (3) directly in an aqueous solution having a pH from about 6.5 to about 9.5 and including at least one water-soluble, thermally-crosslinkable hydrophilic polymeric material at a temperature from about 60° C. to about 140° C. to form a coated silicone hydrogel contact lens comprising the bulk silicone hydrogel material and a layer of a crosslinked hydrophilic polymeric material that is covalently attached onto the bulk silicone hydrogel material, wherein the coated silicone hydrogel contact lens exhibits a water-break-up-time (WBUT) of at least about 5 seconds and an oxygen permeability of at least about 50 barrers.

In another aspect, the invention provides a silicone hydrogel contact lens, comprising a bulk silicone hydrogel material and a layer of a non-silicone hydrogel material (i.e., a crosslinked hydrophilic polymeric material) thereon, wherein the bulk silicone hydrogel material comprises (a) repeating units of at least one hydrophilized polysiloxane vinylic crosslinker, (b) optionally repeating units of hydroxyethyl methacrylate, (c) repeating units of at least one $C_1$-$C_2$ alkoxyethyl (meth)acrylate, (d) carboxyl-containing repeating units of at least one carboxyl-containing (meth) acryloxy monomer, wherein the layer of the non-silicone hydrogel material is covalently attached to the bulk silicone hydrogel material through the carboxyl groups of the carboxyl-containing repeating units, wherein the silicone hydrogel contact lens has a water-break-up-time (WBUT) of at least about 5 seconds, an oxygen permeability of at least about 50 barrers, and an elastic modulus of from 0.2 MPa to 1.8 MPa.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

"About" as used herein in this application means that a number, which is referred to as "about", comprises the recited number plus or minus 1-10% of that recited number.

"Contact Lens" refers to a structure that can be placed on or within a wearer's eye. A contact lens can correct, improve, or alter a user's eyesight, but that need not be the case.

A "hydrogel contact lens" refers to a contact lens comprising a hydrogel bulk (core) material. A hydrogel bulk material can be a non-silicone hydrogel material or preferably a silicone hydrogel material.

A "hydrogel" or "hydrogel material" refers to a cross-linked polymeric material which has three-dimensional polymer networks (i.e., polymer matrix), is insoluble in water, but can hold at least 10% by weight of water in its polymer matrix when it is fully hydrated (or equilibrated).

A "silicone hydrogel" or "SiHy" refers to a silicone-containing hydrogel obtained by copolymerization of a polymerizable composition comprising at least one silicone-containing monomer or at least one silicone-containing macromer or at least one crosslinkable silicone-containing prepolymer.

A siloxane, which often also described as a silicone, refers to a molecule having at least one moiety of —Si—O—Si— where each Si atom carries two organic groups as substituents.

As used in this application, the term "non-silicone hydrogel" or "non-silicone hydrogel material" interchangeably refers to a hydrogel that is theoretically free of silicon.

"Hydrophilic," as used herein, describes a material or portion thereof that will more readily associate with water than with lipids.

The term "room temperature" refers to a temperature of about 17° C. to about 26° C.

The term "soluble", in reference to a compound or material in a solvent, means that the compound or material can be dissolved in the solvent to give a solution with a concentration of at least about 0.5% by weight at room temperature (i.e., a temperature of about 17° C. to about 26° C.).

The term "insoluble", in reference to a compound or material in a solvent, means that the compound or material can be dissolved in the solvent to give a solution with a concentration of less than 0.01% by weight at room temperature (as defined above).

A "vinylic monomer" refers to a compound that has one sole ethylenically unsaturated group, is soluble in a solvent, and can be polymerized actinically or thermally.

The term "olefinically unsaturated group" or "ethylenically unsaturated group" is employed herein in a broad sense and is intended to encompass any groups containing at least one $>C=CH_2$ group. Exemplary ethylenically unsaturated groups include without limitation (meth)acryloyl

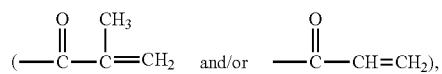

allyl, vinyl, styrenyl, or other $C=CH_2$ containing groups.

An "acrylic monomer" refers to a vinylic monomer having one sole (meth)acryloyl group. Examples of acrylic monomers includes (meth)acryloxy [or (meth)acryloyloxy] monomers and (meth)acrylamido monomers.

An "(meth)acryloxy monomer" or "(meth)acryloyloxy monomer" refers to a vinylic monomer having one sole group of

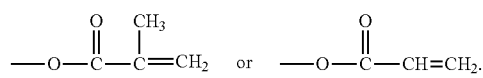

An "(meth)acrylamido monomer" refers to a vinylic monomer having one sole group of

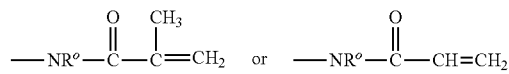

in which $R^o$ is H or $C_1$-$C_4$ alkyl.

The term "(meth)acrylamide" refers to methacrylamide and/or acrylamide.

The term "(meth)acrylate" refers to methacrylate and/or acrylate.

An "N-vinyl amide monomer" refers to an amide compound having a vinyl group (—CH=CH$_2$) that is directly attached to the nitrogen atom of the amide group.

An "ene monomer" refers to a vinylic monomer having one sole ene group.

A "hydrophilic vinylic monomer", a "hydrophilic acrylic monomer", a "hydrophilic (meth)acryloxy monomer", or a "hydrophilic (meth)acrylamido monomer", as used herein, respectively refers to a vinylic monomer, an acrylic monomer, a (meth)acryloxy monomer, or a (meth)acrylamido monomer), which typically yields a homopolymer that is water-soluble or can absorb at least 10 percent by weight of water.

A "hydrophobic vinylic monomer", a "hydrophobic acrylic monomer", a "hydrophobic (meth)acryloxy monomer", or a "hydrophobic (meth)acrylamido monomer", as used herein, respectively refers to a vinylic monomer, an acrylic monomer, a (meth)acryloxy monomer, or a (meth)acrylamido monomer), which typically yields a homopolymer that is insoluble in water and can absorb less than 10% by weight of water.

As used in this application, the term "vinylic crosslinker" refers to an organic compound having at least two ethylenically unsaturated groups. A "vinylic crosslinking agent" refers to a vinylic crosslinker having a molecular weight of 700 Daltons or less.

An "acrylic crosslinker" refers to a vinylic crosslinker having at least two (meth)acryloyl groups.

The term "acrylic repeating units" refers to repeating units of a polymeric material, each of which is derived from an acrylic monomer or crosslinker in a free-radical polymerization to form the polymeric material.

The term "terminal (meth)acryloyl group" refers to one (meth)acryloyl group at one of the two ends of the main chain (or backbone) of an organic compound as known to a person skilled in the art.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV/visible irradiation, ionizing radiation (e.g. gamma ray or X-ray irradiation), microwave irradiation, and the like. Thermal curing or actinic curing methods are well-known to a person skilled in the art.

As used in this application, the term "polymer" means a material formed by polymerizing/crosslinking one or more monomers or macromers or prepolymers or combinations thereof.

A "macromer" or "prepolymer" refers to a compound or polymer that contains ethylenically unsaturated groups and has a number average molecular weight of greater than 700 Daltons.

As used in this application, the term "molecular weight" of a polymeric material (including monomeric or macromeric materials) refers to the number-average molecular weight unless otherwise specifically noted or unless testing conditions indicate otherwise. A skilled person knows how to determine the molecular weight of a polymer according to known methods, e.g., GPC (gel permeation chromatochraphy) with one or more of a refractive index detector, a low-angle laser light scattering detector, a multi-angle laser light scattering detector, a differential viscometry detector, a UV detector, and an infrared (IR) detector; MALDI-TOF MS (matrix-assisted desorption/ionization time-of-flight mass spectroscopy); $^1$H NMR (Proton nuclear magnetic resonance) spectroscopy; etc.

A "polysiloxane segment" or "polydiorganosiloxane segment" interchangeably refers to a polymer chain segment (i.e., a divalent radical) of

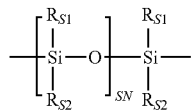

in which SN is an integer of 3 or larger and each of $R_{S1}$ and $R_{S2}$ independent of one another are selected from the group consisting of: $C_1$-$C_{10}$ alkyl; phenyl; $C_1$-$C_4$-alkyl-substituted phenyl; $C_1$-$C_4$-alkoxy-substituted phenyl; phenyl-$C_1$-$C_6$-alkyl; $C_1$-$C_{10}$ fluoroalkyl; $C_1$-$C_{10}$ fluoroether; aryl; aryl $C_1$-$C_{18}$ alkyl; -alk-$(OC_2H_4)_{\gamma 1}$—$OR^o$ (in which alk is $C_1$-$C_6$ alkylene diradical, $R^o$ is H or $C_1$-$C_4$ alkyl and γ1 is an integer from 1 to 10); a $C_2$-$C_{40}$ organic radical having at least one functional group selected from the group consisting of hydroxyl group (—OH), carboxyl group (—COOH), amino group (—$NR_{N1}R_{N1}$'), amino linkages of —$NR_{N1}$—, amide linkages of —$CONR_{N1}$—, amide of —$CONR_{N1}R_{N1}$', urethane linkages of —OCONH—, and $C_1$-$C_4$ alkoxy group, or a linear hydrophilic polymer chain, in which $R_{N1}$ and $R_{N1}$' independent of each other are hydrogen or a $C_1$-$C_{15}$ alkyl.

A "polysiloxane vinylic monomer" refers to a compound comprising at least one polysiloxane segment and one sole ethylenically-unsaturated group.

A "polydiorganosiloxane vinylic crosslinker" or "polysiloxane vinylic crosslinker" interchangeably refers to a compound comprising at least one polysiloxane segment and at least two ethylenically-unsaturated groups.

A "linear polydiorganosiloxane vinylic crosslinker" or "linear polysiloxane vinylic crosslinker" interchangeably refers to a compound comprising a main chain which includes at least one polysiloxane segment and is terminated with one ethylenically-unsaturated group at each of the two ends of the main chain.

A "chain-extended polydiorganosiloxane vinylic crosslinker" or "chain-extended polysiloxane vinylic crosslinker" interchangeably refers to a compound comprising at least two ethylenically-unsaturated groups and at least two polysiloxane segments each pair of which are linked by one divalent radical.

The term "fluid" as used herein indicates that a material is capable of flowing like a liquid.

As used in this application, the term "optically clear" in reference to a polymerizable composition means that the polymerizable composition is a transparent solution or liquid mixture (i.e., having a light transmissibility of 85% or greater, preferably 90% or greater in the range between 400 to 700 nm).

The term "monovalent radical" refers to an organic radical that is obtained by removing a hydrogen atom from an organic compound and that forms one bond with one other group in an organic compound. Examples include without limitation, alkyl (by removal of a hydrogen atom from an alkane), alkoxy (or alkoxyl) (by removal of one hydrogen atom from the hydroxyl group of an alkyl alcohol), thiyl (by removal of one hydrogen atom from the thiol group of an alkylthiol), cycloalkyl (by removal of a hydrogen atom from a cycloalkane), cycloheteroalkyl (by removal of a hydrogen atom from a cycloheteroalkane), aryl (by removal of a hydrogen atom from an aromatic ring of the aromatic hydrocarbon), heteroaryl (by removal of a hydrogen atom from any ring atom), amino (by removal of one hydrogen atom from an amine), etc.

The term "divalent radical" refers to an organic radical that is obtained by removing two hydrogen atoms from an organic compound and that forms two bonds with other two groups in an organic compound. For example, an alkylene divalent radical (i.e., alkylenyl) is obtained by removal of two hydrogen atoms from an alkane, a cycloalkylene divalent radical (i.e., cycloalkylenyl) is obtained by removal of two hydrogen atoms from the cyclic ring.

In this application, the term "substituted" in reference to an alkyl or an alkylenyl means that the alkyl or the alkylenyl comprises at least one substituent which replaces one hydrogen atom of the alkyl or the alkylenyl and is selected from the group consisting of hydroxyl (—OH), carboxyl (—COOH), —$NH_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, and combinations thereof.

In this application, the term "polyoxazoline" refers to a polymer or polymer segment of

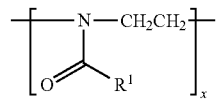

in which: $R^1$ is hydrogen, methyl, ethyl, N-pyrrolidonylmethyl, N-pyrrolidonylethyl, N-pyrrolidonylpropyl, or a monovalent radical of -alk-$(OC_2H_4)_{m3}$—OR' in which alk is $C_1$-$C_4$ alkyl diradical; R" is $C_1$-$C_4$ alkyl (preferably methyl); m3 is an integer from 1 to 10 (preferably 1 to 5); x is an integer from 5 to 500.

In this application, the term "poly(2-oxazoline-co-ethyleneimine)" refers to a statistical copolymer or a polymer segment thereof having a formula of

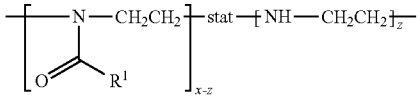

in which: $R^1$ is hydrogen, methyl, ethyl, N-pyrrolidonylmethyl, N-pyrrolidonylethyl, N-pyrrolidonylpropyl, or a monovalent radical of -alk-$(OC_2H_4)_{m3}$—OR' in which alk is $C_1$-$C_4$ alkyl diradical; R" is $C_1$-$C_4$ alkyl (preferably methyl); m3 is an integer from 1 to 10 (preferably 1 to 5); x is an integer from 5 to 500; z is an integer equal to or less than x. A poly(2-oxazoline-co-ethyleneimine) is obtained by hydrolyzing a polyoxazoline.

In this application, the term "poly(2-oxazoline-co-ethyleneimine)-epichlorohydrin" refers to a polymer obtained by reacting a poly(2-oxazoline-co-ethyleneimine) with epichlorohydrin to convert all or substantial percentage (≥90%) of the secondary amine groups of the poly(2-oxazoline-co-ethyleneimine) into azetidinium groups. Examples of poly(2-oxazoline-co-ethyleneimine)-epichlorohydrin are disclosed in a copending U.S. pat. Appl. No. 2016/0061995A1.

An "epichlorohydrin-functionalized polyamine" or "epichlorohydrin-functionalized polyamidoamine" refers to a polymer obtained by reacting a polyamine or polyamidoamine with epichlorohydrin to convert all or a substantial percentage of the secondary amine groups of the polyamine or polyamidoamine into azetidinium groups.

The term "polyamidoamine-epichlorohydrin" refers to an epichlorohydrin-functionalized adipic acid-diethylenetriamine copolymer.

In this application the term "azetidinium" or "3-hydroxyazetidinium" refers to a positively-charged (i.e., cationic), divalent radical (or group or moiety) of

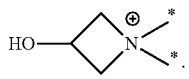

The term "thermally-crosslinkable" in reference to a polymeric material or a functional group means that the polymeric material or the functional group can undergo a crosslinking (or coupling) reaction with another material or functional group at a relatively-elevated temperature (from about 40° C. to about 140° C.), whereas the polymeric material or functional group cannot undergo the same crosslinking reaction (or coupling reaction) with another material or functional group at a temperature of from about 5° C. to about 15° C., to an extend detectable for a period of about one hour.

As used in this application, the term "phosphorylcholine" refers to a zwitterionic group of

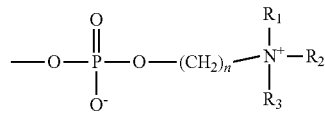

in which n is an integer of 1 to 5 and $R_1$, $R_2$ and $R_3$ independently of each other are $C_1$-$C_8$ alkyl or $C_1$-$C_8$ hydroxyalkyl.

As used in this application, the term "reactive vinylic monomer" refers to any vinylic monomer having at least one reactive functional group selected from the group consisting of carboxyl group, primary amino group, and secondary amino group.

As used in this application, the term "non-reactive vinylic monomer" refers to any vinylic monomer (either hydrophilic or hydrophobic vinylic monomer) free of carboxyl group, primary amino group, secondary amino group, epoxide group, isocyanate group, azlactone group, or aziridine group.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates free radical crosslinking/polymerizing reaction by the use of heat energy.

As used in this application, the term "bulk silicone hydrogel material" in reference to a contact lens interchangeably means a layer of the silicone hydrogel material that has substantially the 3-dimensional shape of the contact lens.

The intrinsic "oxygen permeability", $Dk_i$, of a material is the rate at which oxygen will pass through a material. Oxygen permeability is conventionally expressed in units of barrers, where "barrer" is defined as $[(cm^3 \text{ oxygen})(mm)/(cm^2)(sec)(mm \text{ Hg})] \times 10^{-10}$.

The "oxygen transmissibility", Dk/t, of an insert or material is the rate at which oxygen will pass through a specific insert or material with an average thickness of t [in units of mm] over the area being measured. Oxygen transmissibility is conventionally expressed in units of barrers/mm, where "barrers/mm" is defined as $[(cm^3 \text{ oxygen})/(cm^2)(sec)(mm \text{ Hg})] \times 10^{-9}$.

The "ion permeability" through a lens correlates with the Ionoflux Diffusion Coefficient. The Ionoflux Diffusion Coefficient, D (in units of [mm²/min]), is determined by applying Fick's law as follows:

$$D=-n'/(A \times dc/dx)$$

where n'=rate of ion transport [mol/min]; A=area of lens exposed [mm²]; dc=concentration difference [mol/L]; dx=thickness of lens [mm].

The term "modulus" or "elastic modulus" in reference to a contact lens or a material means the tensile modulus or Young's modulus which is a measure of the stiffness of a contact lens or a material. The modulus can be measured according to the procedures described in Example 1.

The term "dry lens precursor" refers to a cast-molded contact lens that is obtained by cast-molding of a polymerizable composition in a mold and has not been subjected to extraction and/or hydration post-molding processes (i.e., having not been in contact with water or any organic solvent or any liquid after molding).

The term "a wettable silicone hydroge contact lens" means that the silicone hydrogel contact lens has a water-break-up-time ("WBUT") of at least about 5 seconds, preferably at least about 10 seconds, more preferably at least about 15 seconds, even more preferably at least about 20 seconds. The water-break-up-time ("WBUT") can be measured according to the procedures described in Example 1.

The term "an optically-clear silicone hydrogel contact lens" means that the silicone hydrogel contact lens has a light transmissibility of at least 85%, preferably at least 90%, more preferably at least 93%, even more preferably at least 95% in the range from 400 to 700 nm. The light transmissibility of a contact lens in the range from 400 to 700 nm can be measured according to the procedures described in Example 1.

An "average water contact angle" refers to a water contact angle (measured by Sessile Drop), which is obtained by averaging measurements of at least 3 individual contact lenses or samples of a silicone hydrogel material.

In general, the invention is directed to a method for producing optically clear and wettable silicone hydrogel contact lenses in a cost-effective and environmentally friendly manner. The invention is based partly on the discovery that selected polymerizable components, such as, hydroxyethyl methacrylate, alkoxyethyl methacrylate (e.g., ethoxyethyl methacrylate or methoxyethyl methacrylate), carboxyl-containing (meth)acryloxy monomer (e.g., acrylic acid or methacrylic acid) and a hydrophilized polysiloxane vinylic crosslinker can be formulated in an ophthalmically compatible organic solvent (e.g., propylene glycol) to form a lens formulation capable of making optically clear silicone hydrogel contact lens having a relatively high oxygen permeability (at least 50 barrers). The invention is also based partly on the discovery that the cast-molded silicone hydrogel contact lenses are not required to be subjected to an extraction and hydration processes and can be surface-modified directly in a packaging solution in a lens package during autoclave.

The present invention provides the following advantages. First, no ophthalmically incompatible organic solvent is used in a method of the invention. By eliminating ophthalmically incompatible organic solvent, extraction and hydration steps post molding can be eliminated. As such, the production is greatly simplified, the production cost can be siginificantly lowered, and the production process is environmentally friendly. Second, the step of forming a base coating on a silicone hydrogel contact lens is eliminated. The production cost associated with the base-coating step and rinsing steps is eliminated.

The present invention, in one aspect, provides a method for producing coated silicone hydrogel contact lenses, comprising the steps of: (1) introducing a polymerizable composition into a lens mold, wherein the polymerizable composition comprises (a) at least one hydrophilized polysiloxane vinylic crosslinker, (b) optionally hydroxyethyl methacrylate, (c) at least one $C_1$-$C_2$ alkoxyethyl (meth)acrylate, (d) from about 2% to about 10% by weight of at least one carboxyl-containing (meth)acryloxy monomer relative to the total amount of all polymerizable components, (e) at least one free-radical, and (f) optionally at least one solvent selected from the group consisting of water, propylene glycol, a polyethyleneglycol having a molecular weight of about 400 Daltons or less, and combinations thereof; (2) curing thermally or actinically the polymerizable composition in the lens mold to form a silicone hydrogel lens precursor comprising a bulk silicone hydrogel material that comprises carboxyl groups; (3) optionally hydrating the silicone hydrogel lens precursor obtained in step (2) in water or an aqueous solution to obtain a hydrated silicone hydrogel contact lens; and (4) heating the silicone hydrogel lens precursor obtained in step (2) or the hydrated silicone hydrogel contact lens obtained in step (3) directly in an aqueous solution having a pH from about 6.5 to about 9.5 and including at least one water-soluble, thermally-crosslinkable hydrophilic polymeric material at a temperature from about 60° C. to about 140° C. to form a coated silicone hydrogel contact lens comprising the bulk silicone hydrogel material and a layer of a crosslinked hydrophilic polymeric material that is covalently attached onto the bulk silicone hydrogel material, wherein the coated silicone hydrogel contact lens exhibits a water-break-up-time (WBUT) of at least about 5 seconds (preferably at least about 10 seconds, more preferably at least about 15 seconds, even more preferably at least about 20 seconds) and an oxygen permeability of at least about 50 barrers (preferably at least about 60 barrers, more preferably at least about 70 barrers, even more preferably at least about 80 barrers).

In accordance with a preferred embodiment of the invention, the sum of the amounts of components (a) to (e) is at least about 90% by weight, preferably at least about 92% by weight, more preferably at least about 94% by weight, even more preferably at least about 96% by weight relative to the total amount of all polymerizable components in the polymerizable composition.

In accordance with any preceeding embodiments of the invention, the polymerizable composition comprises hydroxyethyl methacrylate.

In accordance with any preceeding embodiments of the invention, the polymerizable composition comprises at least one solvent selected from the group consisting of water, propylene glycol, a polyethyleneglycol having a molecular weight of about 400 Daltons or less, and combinations thereof.

In accordance with the invention, any hydriphilized polysiloxane vinylic crosslinker can be used in the invention, so long as it comprises at least about 1.50 (preferably at least about 2.0, more preferably at least about 2.5, even more preferably at least about 3.0) milliequivalent/gram ("meq/g") of hydrophilic moieties, which preferably are hydroxyl groups (—OH), carboxyl groups (—COOH), amino groups (—NHR$_{N1}$ in which R$_{N1}$ is H or $C_1$-$C_2$ alkyl), amide moieties (—CO—NR$_{N1}$R$_{N2}$ in which R$_{N1}$ is H or $C_1$-$C_2$ alkyl and R$_{N2}$ is a covalent bond, H, or $C_1$-$C_2$ alkyl), N—$C_1$-$C_3$ acylamino groups, urethane moieties (—NH—CO—O—), urea moieties (—NH—CO—NH—), a polyethylene glycol chain of

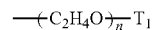

in which n is an integer of 2 to 20 and $T_1$ is H, methyl or acetyl or a phosphorylcholin group, or combinations thereof.

In any preceeding embodiments, said at least one hydrophilized polysiloxane vinylic crosslinker comprises a polysiloxane vinylic crosslinker that comprises (1) a polysiloxane segment comprising dimethylsiloxane units and hydrophilized siloxane units each having one methyl substituent and one monovalent $C_4$-$C_{40}$ organic radical substituent having 2 to 6 hydroxyl groups and (2) two terminal (meth)acryloyl groups. More preferably, said at least one hydrophilized polysiloxane vinylic crosslinker comprises a polysiloxane vinylic crosslinker of formula (1)

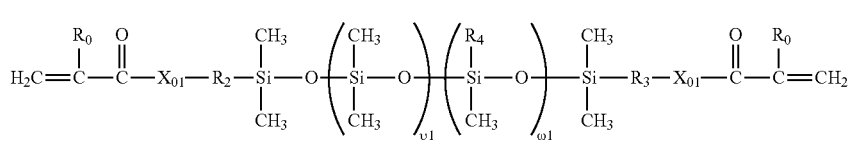
(I)

in which:
- υ1 is an integer of from 30 to 500 and ω1 is an integer of from 1 to 75, provided that ω1/υ1 is from about 0.035 to about 0.15 (preferably from about 0.040 to about 0.12, even more preferably from about 0.045 to about 0.10);
- $X_{01}$ is O or $NR_n$ in which $R_n$ is hydrogen or $C_1$-$C_{10}$-alkyl;
- $R_o$ is hydrogen or methyl;
- $R_2$ and $R_3$ independently of each other are a substituted or unsubstituted $C_1$-$C_{10}$ alkylene divalent radical or a divalent radical of —$R_5$—O—$R_6$— in which $R_5$ and $R_6$ independently of each other are a substituted or unsubstituted $C_1$-$C_{10}$ alkylene divalent radical;
- $R_4$ is a monovalent radical of any one of formula (2) to (7)

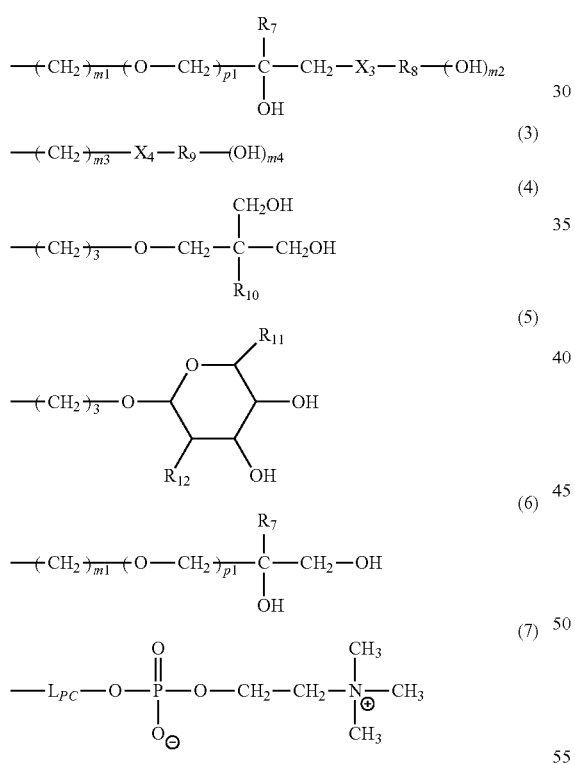

p1 is zero or 1; m1 is an integer of 2 to 4; m2 is an integer of 1 to 5; m3 is an integer of 3 to 6; m4 is an integer of 2 to 5;
$R_7$ is hydrogen or methyl;
$R_8$ is a $C_2$-$C_6$ hydrocarbon radical having (m2+1) valencies;
$R_9$ is a $C_2$-$C_6$ hydrocarbon radical having (m4+1) valencies;
$R_{10}$ is ethyl or hydroxymethyl;
$R_{11}$ is methyl or hydromethyl;
$R_{12}$ is hydroxyl or methoxy;

$X_3$ is a sulfur linkage of —S— or a teriary amino linkage of —$NR_{13}$— in which $R_{13}$ is $C_1$-$C_1$ alkyl, hydroxyethyl, hydroxypropyl, or 2,3-dihydroxypropyl;
$X_4$ is an amide linkage of

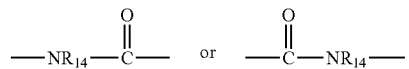

in which $R_{14}$ is hydrogen or $C_1$-$C_{10}$ alkyl;
$L_{PC}$ is a divalent radical of —$CH_2$—$CHR_0$—$R_{15}$—, —$C_3H_6$—O—$R_{16}$—,

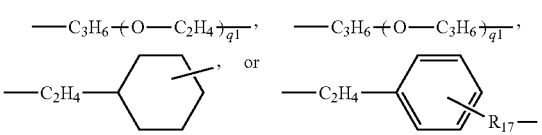

in which q1 is an integer of 1 to 20, $R_{15}$ is a linear or branched $C_1$-$C_{10}$ alkylene divalent radical, $R_{16}$ is a linear or branched $C_3$-$C_{10}$ alkylene divalent radical, and $R_{17}$ is a direct bond or a linear or branched $C_1$-$C_4$ alkylene divalent radical.

In any preceeding embodiments, $R_4$ is a monovalent radical of one of formula (2a) to (2y).

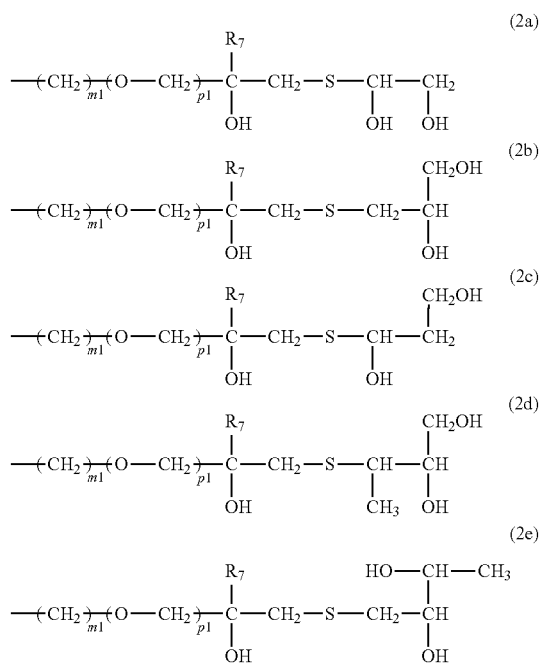

-continued
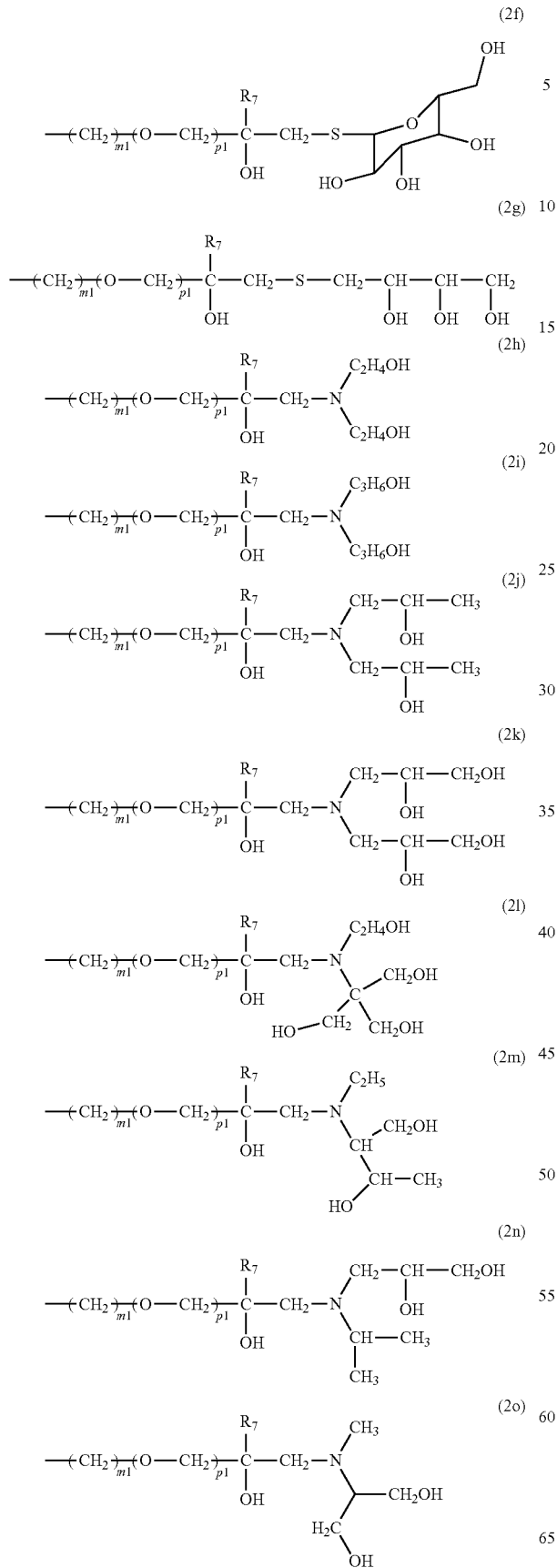
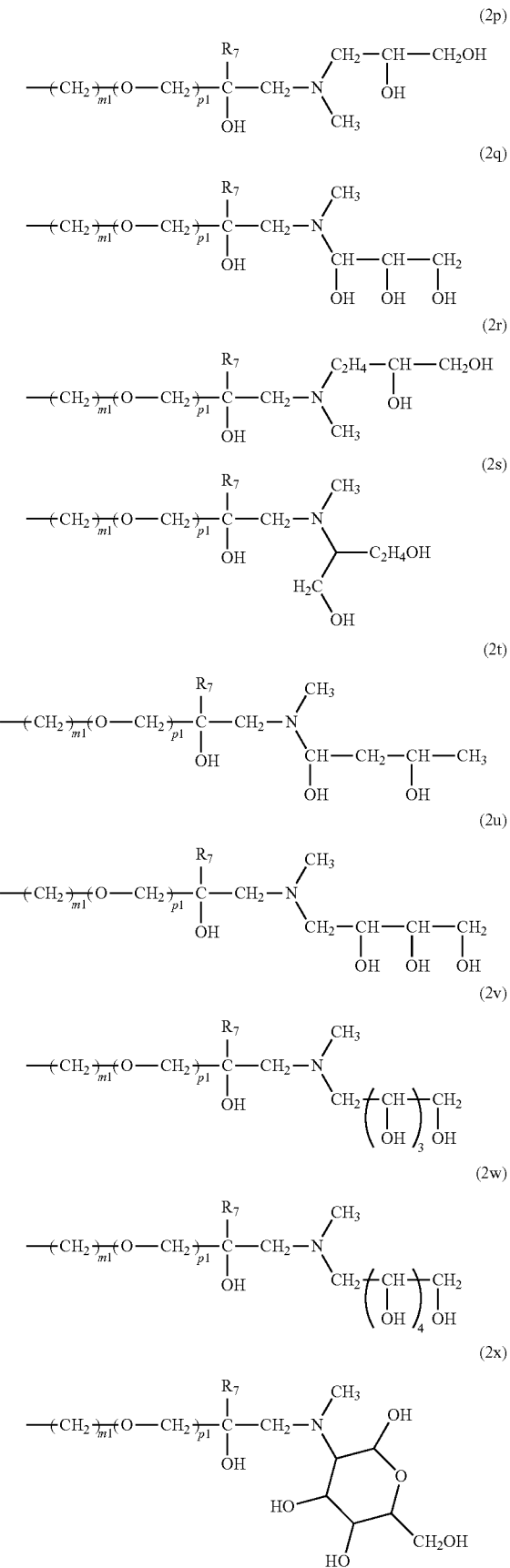

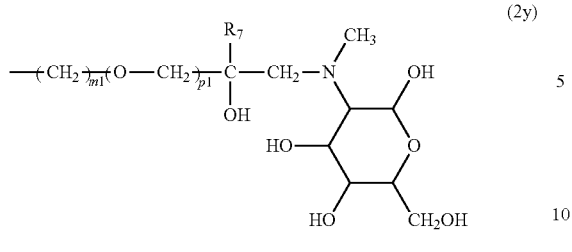
(2y)
in which p1 is zero or 1 (preferably 1), m1 is an integer of 2 to 4 (preferably 3), $R_7$ is hydrogen or methyl (preferably hydrogen).
In any preceeding embodiments, alternatively $R_4$ a monovalent radical of one of formula (3a) to (3y).
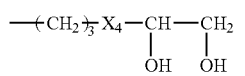
(3a)
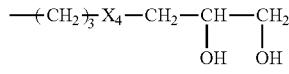
(3b)
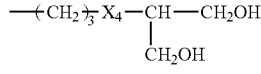
(3c)
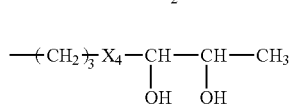
(3d)
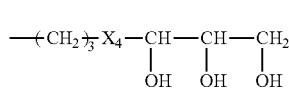
(3e)
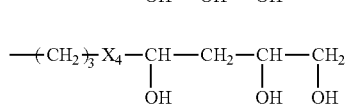
(3f)
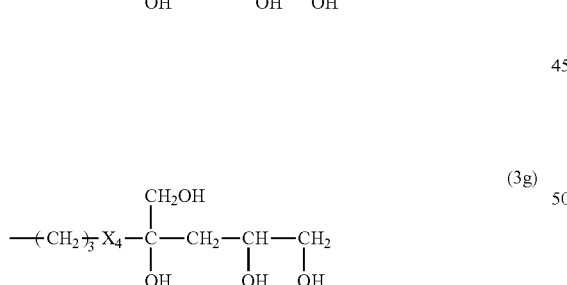
(3g)
(3h)
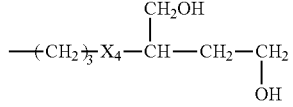
(3i)
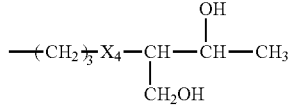
(3j)
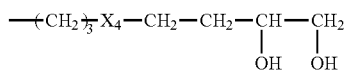
(3k)
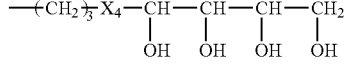
(3l)
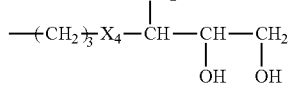
(3m)
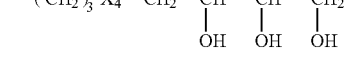
(3n)
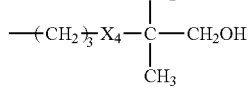
(3o)
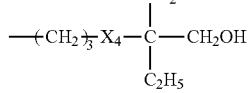
(3p)
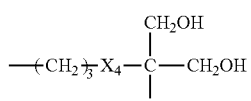
(3q)
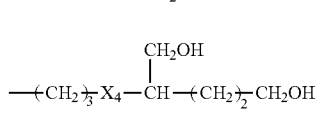
(3r)
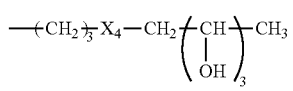
(3s)
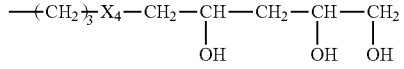
(3t)

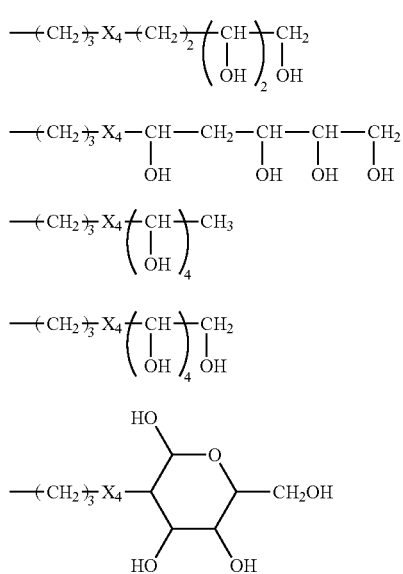

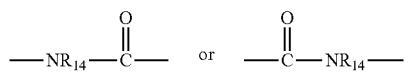

in which $X_4$ is an amide linkage of

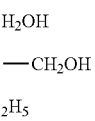

in which $R_{14}$ is hydrogen or $C_1$-$C_{10}$ alkyl.

In any preceeding embodiments, alternatively $R_4$ is a monovalent radical of formula (4a) or (4b).

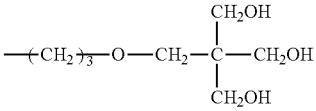

In any preceeding embodiments, alternatively $R_4$ is a monovalent radical of one of formula (5a to 5c).

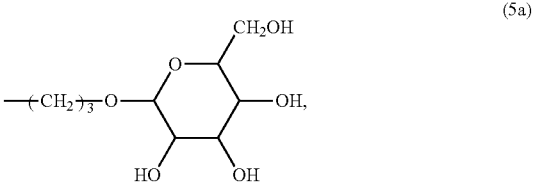

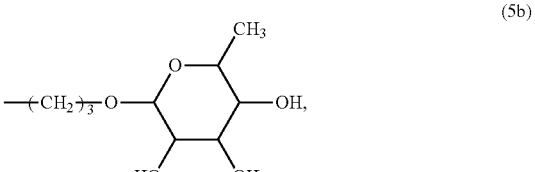

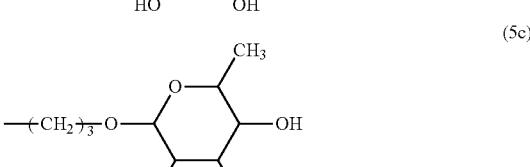

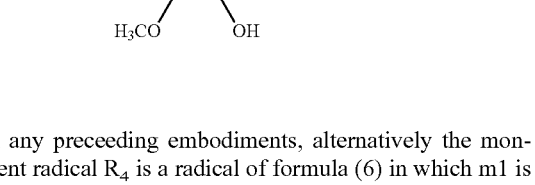

In any preceeding embodiments, alternatively the monovalent radical $R_4$ is a radical of formula (6) in which m1 is 3, p1 is 1, and $R_7$ is hydrogen. Such a preferred first polysiloxane vinylic crosslinker is represented by formula (A)

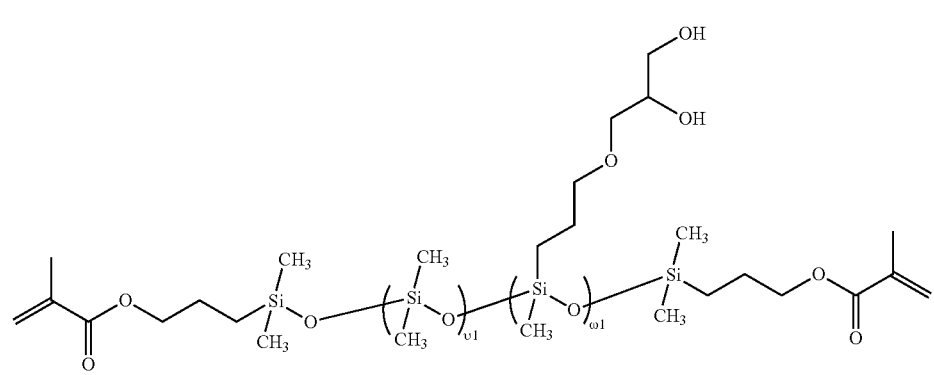

in which υ1 and ω1 are as defined above.

In any preceeding embodiments, alternatively $R_4$ is a monovalent radical of formula (7a)

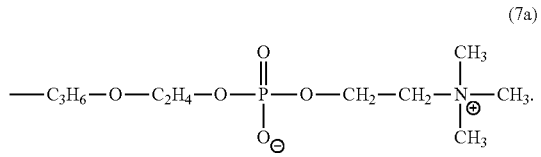
(7a)

The procedures for preparing a polysiloxane vinylic crosslinkers of formula (1) have been described in detail in U.S. Pat. No. 10,081,697 and U.S. Pat. Appl. Ser. No. 63/147,624 filed 9 Feb. 2021.

In accordance with the invention, any carboxyl-containing (meth)acryloxy monomer can be used in the invention. Examples of carboxyl-containing (meth)acryloxy monomers include without limitation acrylic acid, methacrylic acid, ethylacrylic acid, propyacrylic acid, (meth)acryloyloxyacetic acid, mono-2-[(meth)acryloyloxy]ethyl succinate, (meth)acryloyloxypropanoic acid, and (meth)acryloyloxybutanoic acid.

In accordance with the invention, a free radical initiator can be either a photoinitiator or a thermal initiator. A "photoinitiator" refers to a chemical that initiates free radical crosslinking/polymerizing reaction by the use of light. A "thermal initiator" refers to a chemical that initiates free radical crosslinking/polymerizing reaction by the use of heat energy.

Any thermal polymerization initiators can be used in the invention. Suitable thermal polymerization initiators are known to the skilled artisan and comprise, for example peroxides, hydroperoxides, azo-bis(alkyl- or cycloalkylnitriles), persulfates, percarbonates, or mixtures thereof. Examples of preferred thermal polymerization initiators include without limitation benzoyl peroxide, t-butyl peroxide, t-amyl peroxybenzoate, 2,2-bis(tert-butylperoxy)butane, 1,1-bis(tert-butylperoxy)cyclohexane, 2,5-Bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, di-t-butyl-diperoxyphthalate, t-butyl hydro-peroxide, t-butyl peracetate, t-butyl peroxybenzoate, t-butylperoxy isopropyl carbonate, acetyl peroxide, lauroyl peroxide, decanoyl peroxide, dicetyl peroxydicarbonate, di(4-t-butylcyclohexyl) peroxy dicarbonate (Perkadox 16), di(2-ethylhexyl)peroxy dicarbonate, t-butylperoxy pivalate (Lupersol 11); t-butylperoxy-2-ethylhexanoate (Trigonox 21-C50), 2,4-pentanedione peroxide, dicumyl peroxide, peracetic acid, potassium persulfate, sodium persulfate, ammonium persulfate, 2,2'-azobis(4-methoxy-2,4-dimethylvaleronitrile) (VAZO 33), 2,2'-Azobis[2-(2-imidazolin-2-yl)propane]dihydrochloride (VAZO 44), 2,2'-azobis(2-amidinopropane) dihydrochloride (VAZO 50), 2,2'-azobis(2,4-dimethylvaleronitrile) (VAZO 52), 2,2'-azobis(isobutyronitrile) (VAZO 64 or AIBN), 2,2'-azobis-2-methylbutyronitrile (VAZO 67), 1,1-azobis(1-cyclohexanecarbonitrile) (VAZO 88); 2,2'-azobis (2-cyclopropylpropionitrile), 2,2'-azobis(methylisobutyrate), 4,4'-Azobis(4-cyanovaleric acid), and combinations thereof. Preferably, the thermal initiator is 2,2'-azobis(isobutyronitrile) (AIBN or VAZO 64).

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®, Germanium-based Norrish Type I photoinitiators (e.g., those described in U.S. Pat. No. 7,605,190). Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329.

In accordance with any preceeding embodiments of the invention, the polymerizable composition can further comprise one or more additional polymerizable components (other than components (a) to (e) known to a person skilled in the art, so long as the sum of the amounts of those additional polymerizable component components is about 10% by weight or less, preferably about 8% by weight or less, more preferably about 6% by weight or less, even more preferably about 4% by weight or less, relative to the total amount of all polymerizable components in the polymerizable composition.

In accordance with any preceeding embodiments of the invention, the polymerizable composition can further comprise a non-silicone vinylic crosslinker, preferably selected from the group consisting of ethyleneglycol di-(meth)acrylate, diethyleneglycol di-(meth)acrylate, triethyleneglycol di-(meth)acrylate, tetraethyleneglycol di-(meth)acrylate, polyethylene glycol di-(meth)acrylate having a number averaged molecular weight of from 200 to 10,000 daltons, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth) acrylate, bis[2-(meth)acryloxyethyl]phosphate, trimethylolpropane di-(meth)acrylate, and 3,4-bis[(meth)acryloyl]tetrahydrofuan, diacrylamide (i.e., N-(1-oxo-2-propenyl)-2-propenamide), dimethacrylamide (i.e., N-(1-oxo-2-methyl-2-propenyl)-2-methyl-2-propenamide), N,N-di(meth) acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis (meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamide-propane-2-yl dihydrogen phosphate (i.e., N,N'-2-phophonyloxypropylene bis(meth)acrylamide), piperazine diacrylamide (or 1,4-bis(meth)acryloyl piperazine), triallyl isocyanurate, triallyl cyanurate, and combinations thereof, more preferably selected from the group consisting of ethyleneglycol di-(meth)acrylate, diethyleneglycol di-(meth) acrylate, triethyleneglycol di-(meth)acrylate, tetraethyleneglycol di-(meth)acrylate, polyethylene glycol di-(meth) acrylate having a number averaged molecular weight of from 200 to 10,000 daltons, and combinations thereof.

In accordance with any preceeding embodiments of the invention, a polymerizable composition can also comprises other polymerizable materials, such as, a UV-absorbing vinylic monomer, a polymerizable UV/high-energy-violet-light ("HEVL") absorbing compound (including UV/HEVL absorbing vinylic monomer described below, and/or polymerizable Cu(II)-porphyrins described in U.S. Pat. Appl. Pub. No. 20150316688), a polymerizable photochromic compound, a polymerizable tinting agent (polymerizable dye), or combinations thereof, as known to a person skilled in the art.

Any suitable UV-absorbing vinylic monomers and UV/HEVL-absorbing vinylic monomers can be used in a polymerizable composition for preparing a preformed SiHy contact lens of the invention. Examples of preferred UV-absorbing and UV/HEVL-absorbing vinylic monomers include without limitation: 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl) benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxypropylphenyl) benzotriazole, 2-hydroxy-5-methoxy-3-(5-(trifluoromethyl)-2H-benzo[d][1,2,3]triazol-2-yl)benzyl methacrylate (WL-1), 2-hydroxy-5-methoxy-3-(5-methoxy-2H-benzo[d][1,2,3]triazol-2-yl)benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl)benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-(5-chloro-2H-benzo[d][1,2,3]triazol-2-yl)-6-methoxyphenol (WL-8), 2-{2'-Hydroxy-3'-tert-5'[3"-(4"-vinylbenzyloxy)propoxy]phenyl}-5-methoxy-2H-benzotriazole, phenol, 2-(5-chloro-2H-benzotriazol-2-yl)-6-(1,1-dimethylethyl)-4-ethenyl-(UVAM), 2-[2'-hydroxy-5'-(2-methacryloxyethyl)phenyl)]-2H-benzotriazole (2-Propenoic acid, 2-methyl-, 2-[3-(2H-benzotriazol-2-yl)-4-hydroxyphenyl]ethyl ester, Norbloc), 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole (UV13), 2-{2'-Hydroxy-3'-tert-butyl-5'-[3'-methacryloyloxypropoxy]phenyl}-5-chloro-2H-benzotriazole (UV28), 2-[2'-Hydroxy-3'-tert-butyl-5'-(3'-acryloyloxypropoxy)phenyl]-5-trifluoromethyl-2H-benzotriazole (UV23), 2-(2'-hydroxy-5-methacrylamidophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-3'-t-butyl-2'-hydroxy-5'-(3"-dimethylvinylsilylpropoxy)-2'-hydroxy-phenyl)-5-methoxybenzotriazole (UV15), 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chlorobenzotriazol-2-yl)-4-hydroxyphenyl]-propyl ester (16-100, CAS #96478-15-8), 2-(3-(tert-butyl)-4-hydroxy-5-(5-methoxy-2H-benzo[d][1,2,3]triazol-2-yl)phenoxy)ethyl methacrylate (16-102); Phenol, 2-(5-chloro-2H-benzotriazol-2-yl)-6-methoxy-4-(2-propen-1-yl) (CAS #1260141-20-5); 2-[2-Hydroxy-5-[3-(methacryloyloxy)propyl]-3-tert-butylphenyl]-5-chloro-2H-benzotriazole; Phenol, 2-(5-ethenyl-2H-benzotriazol-2-yl)-4-methyl-, homopolymer (9CI) (CAS #83063-87-0). In accordance with the invention, the polymerizable composition comprises about 0.1% to about 3.0%, preferably about 0.2% to about 2.5%, more preferably about 0.3% to about 2.0%, by weight of one or more UV-absorbing vinylic monomers, related to the amount of all polymerizable components in the polymerizable composition.

Examples of preferred photochromic vinylic monomers include polymerizable naphthopyrans, polymerizable benzopyrans, polymerizable indenonaphthopyrans, polymerizable phenanthropyrans, polymerizable spiro(benzindoline)-naphthopyrans, polymerizable spiro(indoline)benzopyrans, polymerizable spiro(indoline)-naphthopyrans, polymerizable spiro(indoline)quinopyrans, polymerizable spiro(indoline)-pyrans, polymerizable naphthoxazines, polymerizable spirobenzopyrans; polymerizable spirobenzopyrans, polymerizable spirobenzothiopyrans, polymerizable naphthacenediones, polymerizable spirooxazines, polymerizable spiro(indoline)naphthoxazines, polymerizable spiro(indoline)pyridobenzoxazines, polymerizable spiro(benzindoline)pyridobenzoxazines, polymerizable spiro(benzindoline)naphthoxazines, polymerizable spiro(indoline)-benzoxazines, polymerizable diarylethenes, and combinations thereof, as disclosed in U.S. Pat. Nos. 4,929,693, 5,166,345, 6,017,121, 7,556,750, 7,584,630, 7,999,989, 8,158,037, 8,697,770, 8,741,188, 9,052,438, 9,097,916, 9,465,234, 9,904,074, 10,197,707, 6,019,914, 6,113,814, 6,149,841, 6,296,785, and 6,348,604.

In accordance with any preceeding embodiments, the polymerizable composition comprises: preferably from about 30% to about 65% (more preferably from about 35% to about 60%, even more preferably from about 40% to about 60%) by weight of component (a); preferably from about 30% to about 65% (more preferably from about 35% to about 60%, even more preferably from about 40% to about 60%) by weight of components (b) and (c); and preferably from about 2% to about 10% (more preferably from about 3% to about 9%, even more preferably from about 4% to about 8%) by weight of component (d), relative to the total amount of all polymerizable components.

In any preceeding embodiments, the weight ratio of component (c) to component (b) in the polymerizable composition is about 40 to about 10, preferably about 35 to about 15, more preferably about 30 to about 15, even more preferably about 23 to about 11.

Other polymerizable components (materials), including various silicone-containing vinylic monomers, polysiloxane vinylisc crosslinkers, hydrophilic vinylic monomers, and hydrophobic vinylic monomers, are well known to a person skilled in the art. One or more such polymerizable components can be used in a polymerizable composition of the invention, so long as their amounts is less than about 10% by weight (preferably less than about 8% by weight, more preferably less than about 6% by weight, even more preferably less than about 4% by weight), relative to the total amount of all polymerizable components in the polymerizable composition In accordance with any preceeding embodiments, the polymerizable composition can also comprise other necessary components known to a person skilled in the art, such as, for example, a bioactive agent (e.g., a drug, an amino acid, a polypeptide, a protein, a nucleic acid, 2-pyrrolidone-5-carboxylic acid (PCA), an alpha hydroxyl acid, linoleic and gamma linoleic acids, vitamins, or any combination thereof), leachable lubricants (e.g., a non-crosslinkable hydrophilic polymer having an average molecular weight from 5,000 to 500,000, preferably from 10,000 to 300,000, more preferably from 20,000 to 100,000 Daltons), leachable tear-stabilizing agents (e.g., a phospholipid, a monoglyceride, a diglyceride, a triglyceride, a glycolipid, a glyceroglycolipid, a sphingolipid, a sphingo-glycolipid, a fatty acid having 8 to 36 carbon atoms, a fatty alcohol having 8 to 36 carbon atoms, or a mixture thereof), mold releasing agent, and mixtures thereof, as known to a person skilled in the art.

A polymerizable composition of the invention can be prepared by blending all of the desirable components as known to a person skilled in the art.

Lens molds for making contact lenses including hydrogel contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens-forming cavity is formed between the first molding surface and the second molding surface. The molding surface of a mold half is the cavity-forming surface of the mold and in direct contact with the polymerizable composition.

Methods of manufacturing mold sections for cast molding a contact lens are generally well known to those of ordinary skill in the art. The process of the present invention is not limited to any particular method of forming a mold. In fact, any method of forming a mold can be used in the present invention.

In general, a lens mold for cast-molding of contact lenses comprises at least two mold halves (or mold sections), one male half and one female mold half. The male mold half has a first molding (or optical) surface which is in direct contact with a polymerizable composition for cast molding of a contact lens and defines the posterior (concave) surface of a molded contact lens; and the female mold half has a second molding (or optical) surface which is in direct contact with the polymerizable composition and defines the anterior (convex) surface of the molded contact lens. The male and female mold halves are configured to receive each other such that a lens-forming cavity is formed between the first molding surface and the second molding surface.

The mold halves can be formed through various techniques, such as injection molding. Methods of manufacturing mold halves for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711; 4,460,534; 5,843,346; and 5,894,002.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, New Jersey), or the like can be used. Other materials that allow UV light transmission could be used, such as quartz glass and sapphire.

In accordance with the invention, the polymerizable composition can be dispensed into the lens mold according to any known techniques. For example, a specific amount of a polymerizable composition is typically dispensed into a female mold half by means of a dispensing device and then a male mold half is put on and the mold is closed. As the mold closes, any excess polymerizable composition is pressed into an overflow provided on the female mold half (or alternatively on the male mold half).

The molding assmbly (i.e., the closed mold containing the second polymerizable fluid composition and the partially-crosslinked circular layer immersed therein) is subsequently cured thermally or actinically, as known to a person skilled in the art, to form a silicone hydrogel lens precursor comprising a bulk silicone hydrogel material that comprises carboxyl groups. It is understood that carboxyl groups on and/or near the surface of the bulk silicone hydrogel material can serve as reactive sites at which a layer of a crosslinked hydrophilic polymeric material can be covalently attached.

After curing, the molds can be opened according to any techniques known to a person skilled in the art. After the mold is separated, the silicone hydrogel lens precursor adheres to one of the male and female mold halves.

The silicone hydrogel lens precursor adhered on the lens-adhered mold half can be removed from the lens-adhered mold half and then subject to one or more post molding processes.

In accordance with the invention, a water-soluble and thermally-crosslinkable hydrophilic polymeric material preferably comprises azetidinium groups or epoxy groups or combinations thereof. Preferably, the water-soluble and crosslinkable hydrophilic polymeric material is a partially-crosslinked polymeric material that comprises a three-dimensional network and thermally-crosslinkable groups, preferably azetidinium groups, within the network or being attached to the network. The term "partially-crosslinked" in reference to a polymeric material means that the crosslinkable groups of starting materials for making the polymeric material in crosslinking reaction have not been fully consumed. For example, such a thermally-crosslinkable hydrophilic polymeric material comprises azetidinium groups and is a partial reaction product of at least one azetidinium-containing polymer with at least one hydrophilicity-enhancing agent (i.e., a wetting agent) having at least one carboxyl, primary amine, secondary amine, or thiol group, according to the crosslinking reactions shown in Scheme I Scheme I

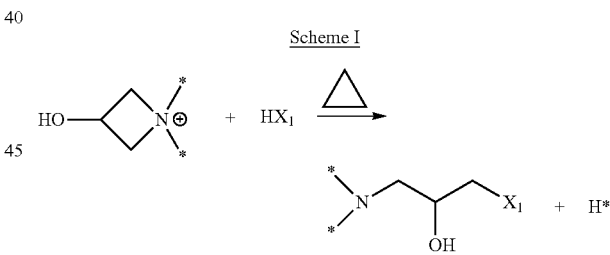

in which $X_1$ is —S—*, —OC(=O)—*, or —NR'—* in which R' is hydrogen or a $C_1$-$C_{20}$ unsubstituted or substituted alkyl group, and * represents an organic radical.

Examples of preferred water-soluble and thermally-crosslinkable hydrophilic polymeric materials comprising epoxy groups include without limitation: one or more multi-armed polyethylene glycols each having terminal epoxy groups; a mixture of a multi-armed polyethylen glycol having terminal epoxy group and one or more polyethylene glycol each having terminal functional groups selected from the group consisting of primary amine groups, secondary amine groups, carboxyl groups, thiol groups, and combinations thereof; a partial reaction product of a multi-armed polyethylene having terminal epoxy groups and a hydrophilicity-enhancing agent having at least one reactive functional group selected from the group consisting of amino group, carboxyl group, thiol group, and combination thereof (as disclosed in U.S. Pat. No. 9,505,184, hydrophilic polymers disclosed in U.S. Pat. No. 6,440,571), or combinations thereof.

Examples of preferred water-soluble and thermally-crosslinkable hydrophilic polymeric materials comprising azetidinium groups include without limitation poly(2-oxazoline-co-ethyleneimine)-epichlorohydrin copolymers which are disclosed in U.S. Pat. No. 9,720,138, chemically-modified poly(2-oxazoline-co-ethyleneimine)-epichlorohydrin copolymers which are disclosed in U.S. Pat. No. 9,720,138, chemically-modified polyamidoamine-epichlorohydrins as disclosed in U.S. Pat. No. 8,529,057, copolymers of an azetidinium-containing vinylic monomer with one or more hydrophilic vinylic monomers disclosed in U.S. Pat. No. 9,422,447, chemically-modified copolymers of an azetidinium-containing vinylic monomer with one or more hydrophilic vinylic monomers disclosed in U.S. Pat. No. 9,422,447, or combinations thereof.

In accordance with the invention, the term "chemically-modified" in reference with a water-soluble and thermally crosslinkable hydrophilic polymeric material having azetidinium groups means that a poly(2-oxazoline-co-ethyleneimine)-epichlorohydrin copolymer, a polyamidoamine-epichlorohydrin or a copolymer of an azetidinium-containing vinylic monomer is reacted partially (i.e., not consuming all of the azetidinium groups) with a hydrophilicity-enhancing agent having at least one reactive functional group selected from the group consisting of amino group, carboxyl group, thiol group, and combination thereof. A chemically-modified poly(2-oxazoline-co-ethyleneimine)-epichlorohydrin copolymer or polyamidoamine-epichlorohydrin or copolymer of an azetidinium-containing vinylic monomer can be especially useful for forming relatively-thick and soft non-silicone hydrogel coatings on silicone hydrogel contact lenses.

Any suitable hydrophilicity-enhancing agents can be used in the invention so long as they contain at least one amino group, at least one carboxyl group, and/or at least one thiol group.

A preferred class of hydrophilicity-enhancing agents include without limitation: primary amino-, secondary amino-, carboxyl- or thiol-containing monosaccharides (e.g., 3-amino-1,2-propanediol, 1-thiolglycerol, 5-keto-D-gluconic acid, galactosamine, glucosamine, galacturonic acid, gluconic acid, glucosaminic acid, mannosamine, saccharic acid 1,4-lactone, saccharide acid, Ketodeoxynonulosonic acid, N-methyl-D-glucamine, 1-amino-1-deoxy-β-D-galactose, 1-amino-1-deoxysorbitol, 1-methylamino-1-deoxysorbitol, N-aminoethyl gluconamide); primary amino-, secondary amino-, carboxyl- or thiol-containing disaccharides (e.g., chondroitin disaccharide sodium salt, di(β-D-xylopyranosyl)amine, digalacturonic acid, heparin disaccharide, hyaluronic acid disaccharide, Lactobionic acid); and primary amino-, secondary amino-, carboxyl- or thiol-containing oligosaccharides (e.g., carboxymethyl-β-cyclodextrin sodium salt, trigalacturonic acid); and combinations thereof.

Another preferred class of hydrophilicity-enhancing agents is hydrophilic polymers having one or more (primary or secondary) amino, carboxyl and/or thiol groups. More preferably, the content of the amino (—NHR' with R' as defined above), carboxyl (—COOH) and/or thiol (—SH) groups in a hydrophilic polymer as a hydrophilicity-enhancing agent is less than about 40%, preferably less than about 30%, more preferably less than about 20%, even more preferably less than about 10%, by weight based on the total weight of the hydrophilic polymer.

One preferred class of hydrophilic polymers as hydrophilicity-enhancing agents are (primary or secondary) amino- or carboxyl-containing polysaccharides, for example, such as, carboxymethylcellulose (having a carboxyl content of about 40% or less, which is estimated based on the composition of repeating units, —[$C_6H_{10-m}O_5(CH_2CO_2H)_m$]— in which m is 1 to 3), carboxyethylcellulose (having a carboxyl content of about 36% or less, which is estimated based on the composition of repeating units, —[$C_6H_{10-m}O_5(C_2H_4CO_2H)_m$]— in which m is 1 to 3) carboxypropylcellulose (having a carboxyl content of about 32% or less, which is estimated based on the composition of repeating units, —[$C_6H_{10-m}O_5(C_3H_6CO_2H)_m$]—, in which m is 1 to 3), hyaluronic acid (having a carboxyl content of about 11%, which is estimated based on the composition of repeating units, —($C_{13}H_2O_9NCO_2H$)—), chondroitin sulfate (having a carboxyl content of about 9.8%, which is estimated based on the composition of repeating units, —($C_{12}H_{18}O_{13}NS\ CO_2H$)—), or combinations thereof.

Another preferred class of hydrophilic polymers as hydrophilicity-enhancing agents include without limitation: poly(ethylene glycol) (PEG) with mono-amino (primary or secondary amino), carboxyl or thiol group (e.g., PEG-NH$_2$, PEG-SH, PEG-COOH); H$_2$N-PEG-NH$_2$; HOOC-PEG-COOH; HS-PEG-SH; H$_2$N-PEG-COOH; HOOC-PEG-SH; H$_2$N-PEG-SH; multi-arm PEG with one or more amino (primary or secondary), carboxyl or thiol groups; PEG dendrimers with one or more amino (primary or secondary), carboxyl or thiol groups; a diamino-(primary or secondary) or dicarboxyl-terminated homo- or co-polymer of a non-reactive hydrophilic vinylic monomer; a monoamino- (primary or secondary) or monocarboxyl-terminated homo- or co-polymer of a non-reactive hydrophilic vinylic monomer; a copolymer which is a polymerization product of a composition comprising (1) about 60% by weight or less, preferably from about 0.1% to about 30%, more preferably from about 0.5% to about 20%, even more preferably from about 1% to about 15%, by weight of one or more reactive vinylic monomers and (2) at least one non-reactive hydrophilic vinylic monomer; and combinations thereof. Reactive vinylic monomer(s) and non-reactive hydrophilic vinylic monomer(s) are those described previously.

In accordance with the invention, reactive vinylic monomers for making hydrophilicity-enhancing agents can be carboxyl-containing vinylic monomers, primary amino-containing vinylic monomers, or secondary amino-containing vinylic monomers. Examples of preferred carboxyl-containing vinylic monomers include without limitation acrylic acid, methacrylic ethylacrylic acid, N-2-(meth)acrylamidoglycolic acid, and combinations thereof. Examples of preferred primary and secondary amino-containing vinylic monomers include without limitation N-2-aminoethyl (meth)acrylamide, N-2-methylaminoethyl (meth)acrylamide, N-2-ethylaminoethyl (meth)acrylamide, N-3-aminopropyl (meth)acrylamide, N-3-methylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, and combinations thereof.

In accordance with the invention, a non-reactive vinylic monomer for making hydrophilicity-enhancing agents is a vinylic monomer free of any carboxyl group, primary amino group, secondary amino group, epoxide group, isocyanate group, azlactone group, or aziridine group. Non-reactive vinylic monomers preferably are non-charged hydrophilic vinylic monomers which are free of carboxyl or amino group (any those described above can be used here), phosphorylcholine-containing vinylic monomers (any those described above can be used here), or combinations thereof.

More preferably, a hydrophilic polymer as a hydrophilicity-enhancing agent is:
- a poly(ethylene glycol) having one sole functional group of —NH$_2$, —SH or —COOH;
- a poly(ethylene glycol) having two terminal functional groups selected from the group consisting of —NH$_2$, —COOH, —SH, and combinations thereof;
- a multi-arm poly(ethylene glycol) having one or more functional groups selected from the group consisting of —NH$_2$, —COOH, —SH, and combinations thereof;
- a monoamino-, monocarboxyl-, diamino- or dicarboxyl-terminated homo- or copolymer of a non-reactive hydrophilic vinylic monomer;
- a copolymer which is a polymerization product of a composition comprising (1) from about 0.1% to about 30%, preferably from about 0.5% to about 20%, more preferably from about 1% to about 15%, by weight of a reactive vinylic monomer and (2) at least one non-reactive vinylic monomer, Examples of preferred reactive vinylic monomers include without limitation acrylic acid, methacrylic acid, ethylacrylic acid, 2-(meth)acrylamidoglycolic acid, N-2-aminoethyl (meth)acrylamide, N-2-methylaminoethyl (meth)acrylamide, N-2-ethylaminoethyl (meth)acrylamide, N-3-aminopropyl (meth)acrylamide, N-3-methylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-amino-2-hydroxypropyl (meth)acrylate, and combinations thereof.

Example of preferred non-reactive hydrophilic vinylic monomers include without limitaiton alkyl (meth)acrylamides (any one described above), N-2-dimethylaminoethyl (meth)acrylamide, dimethylaminoethyl (meth)acrylate, hydroxyl-containing acrylic monomers (any one described above), N-vinyl amide monomers (any one described above), methylene-containing pyrrolidone monomers (i.e., pyrrolidone derivatives each having a methylene group connected to the pyrrolidone ring at 3- or 5-position) (any one described above), acrylic monomers having a $C_1$-$C_4$ alkoxyethoxy group (any one described above), vinyl ether monomers (any one described above), allyl ether monomers (any one described above), a phosphorylcholine-containing vinylic monomer (any one described above), and combinations thereof.

Preferably, the non-reactive hydrophilic vinylic monomer is selected from the group consisting of (meth)acryloyloxyethyl phosphorylcholine, (meth)acryloyloxypropyl phosphorylcholine, 4-((meth)acryloyloxy)butyl-2'(trimethylammonio)ethylphosphate, 2-[(meth)acryloylamino]ethyl-2-(trimethylammonio)ethylphosphate, 3-[(meth)acryloylamino]propyl-2'(trimethylammonio)ethylphosphate, 4-[(meth)acryloylamino]butyl-2'-(trimethylammonio)ethylphosphate, (meth)acrylamide, dimethyl (meth)acrylamide, N-2-hydroxylethyl (meth)acrylamide, N,N-bis(hydroxyethyl) (meth)acrylamide, N-2,3-dihydroxypropyl (meth)acrylamide, N-tris(hydroxymethyl) methyl (meth)acrylamide, 2-hydroxyethyl (meth)acrylate, glycerol methacrylate (GMA), tetra(ethylene glycol) (meth)acrylate, poly(ethylene glycol)ethyl (meth)acrylamide having a number average molecular weight of up to 1500, poly(ethylene glycol) (meth)acrylate having a number average molecular weight of up to 1500, N-vinylpyrrolidone, N-vinyl-N-methyl acetamide, N-vinyl formamide, N-vinyl acetamide, 1-methyl-3-methylene-2-pyrrolidone, 1-methyl-5-methylene-2-pyrrolidone, 5-methyl-3-methylene-2-pyrrolidone, tetra(ethylene glycol) methyl ether (meth)acrylate, methoxypoly(ethylene glycol)ethyl (meth)acrylamide having a number average molecular weight of up to 1500, $C_1$-$C_4$-alkoxy polyethylene glycol (meth)acrylate having a weight average molecular weight of up to 1500, tetra(ethylene glycol) monovinyl ether, poly(ethylene glycol) monovinyl ether, tetra(ethylene glycol) methyl vinyl ether, poly (ethylene glycol) methyl vinyl ether, tetra(ethylene glycol) monoallyl ether, poly(ethylene glycol) monoallyl ether, tetra (ethylene glycol) methyl allyl ether, poly(ethylene glycol) methyl allyl ether, vinyl alcohol, allyl alcohol, and combinations thereof, more preferably selected from the group consisting of (meth)acryloyloxyethyl phosphorylcholine, (meth)acryloyloxypropyl phosphorylcholine, 4-((meth)acryloyloxy)butyl-2-(trimethylammonio)ethylphosphate, 2-[(meth)acryloylamino]ethyl-2'-(trimethylammonio)-ethylphosphate, 3-[(meth)acryloylamino]propyl-2'-(trimethylammonio)ethylphosphate, 4-[(meth)acryloylamino]butyl-2' (trimethylammonio)ethylphosphate, (meth)acrylamide, dimethyl (meth)acrylamide, N-2-hydroxylethyl (meth)acrylamide, N,N-bis(hydroxyethyl) (meth)acrylamide, N-2,3-dihydroxypropyl (meth)acrylamide, N-tris(hydroxymethyl) methyl (meth)acrylamide, 2-hydroxyethyl (meth)acrylate, glycerol methacrylate (GMA), poly(ethylene glycol)ethyl (meth)acrylamide having a number average molecular weight of up to 1500, poly(ethylene glycol) (meth)acrylate having a number average molecular weight of up to 1500, N-vinylpyrrolidone, N-vinyl-N-methyl acetamide, methoxypoly(ethylene glycol)ethyl (meth)acrylamide having a number average molecular weight of up to 1500, methoxy polyethylene glycol (meth)acrylate having a weight average molecular weight of up to 1500, poly(ethylene glycol) monovinyl ether, poly(ethylene glycol) methyl vinyl ether, poly(ethylene glycol) monoallyl ether, poly (ethylene glycol) methyl allyl ether, vinyl alcohol, allyl alcohol, and combinations thereof, even more preferably selected from the group consisting of (meth)acryloyloxyethyl phosphorylcholine, (meth)acryloyloxypropyl phosphorylcholine, 2-[(meth)acryloylamino]ethyl-2-(trimethylammonio)ethylphosphate, 3-[(meth)acryloylamino]propyl-2'-(trimethylammonio)ethylphosphate, (meth)acrylamide, dimethyl (meth)acrylamide, N-2-hydroxylethyl (meth)acrylamide, N,N-bis(hydroxyethyl) (meth)acrylamide, N-2,3-dihydroxypropyl (meth)acrylamide, N-tris(hydroxymethyl) methyl (meth)acrylamide, poly(ethylene glycol)ethyl (meth) acrylamide having a number average molecular weight of up to 1500, poly(ethylene glycol) (meth)acrylate having a number average molecular weight of up to 1500, N-vinylpyrrolidone, N-vinyl-N-methyl acetamide, methoxypoly(ethylene glycol)ethyl (meth)acrylamide having a number average molecular weight of up to 1500, methoxy polyethylene glycol (meth)acrylate having a weight average molecular weight of up to 1500, and combinations thereof.

PEGs with functional groups and multi-arm PEGs with functional groups can be obtained from various commercial suppliers, e.g., Polyscience, and Shearwater Polymers, inc., etc.

Monoamino-, monocarboxyl-, diamino- or dicarboxyl-terminated homo- or copolymers of one or more non-reactive hydrophilic vinylic monomers or of a phosphorylcholine-containing vinylic monomer can be prepared according to procedures described in U.S. Pat. No. 6,218,508, herein incorporated by reference in its entirety. For example, to prepare a diamino- or dicarboxyl-terminated homo- or co-polymer of a non-reactive hydrophilic vinylic monomer, the non-reactive vinylic monomer, a chain transfer agent with an amino or carboxyl group (e.g., 2-aminoethanethiol, 2-mercaptopropinic acid, thioglycolic acid, thiolactic acid, or other hydroxymercaptanes, aminomercaptans, or carboxyl-containing mercaptanes) and optionally other vinylic monomer are copolymerized (thermally or actinically) with a reactive vinylic monomer (having an amino or carboxyl group), in the presence of an free-radical initiator. Generally, the molar ratio of chain transfer agent to that of all of vinylic monomers other than the reactive vinylic monomer is from about 1:5 to about 1:100, whereas the molar ratio of chain transfer agent to the reactive vinylic monomer is 1:1. In such preparation, the chain transfer agent with amino or carboxyl group is used to control the molecular weight of the resultant hydrophilic polymer and forms a terminal end of the resultant hydrophilic polymer so as to provide the resultant hydrophilic polymer with one terminal amino or carboxyl group, while the reactive vinylic monomer provides the other terminal carboxyl or amino group to the resultant hydrophilic polymer. Similarly, to prepare a monoamino- or monocarboxyl-terminated homo- or copolymer of a non-reactive hydrophilic vinylic monomer, the non-reactive vinylic monomer, a chain transfer agent with an amino or carboxyl group (e.g., 2-aminoethanethiol, 2-mercaptopropinic acid, thioglycolic acid, thiolactic acid, or other hydroxymercaptanes, aminomercaptans, or carboxyl-containing mercaptanes) and optionally other vinylic monomers are copolymerized (thermally or actinically) in the absence of any reactive vinylic monomer.

Copolymers comprising a non-reactive hydrophilic vinylic monomer and a reactive vinylic monomer (e.g., a carboxyl-containing vinylic monomer, a primary amino group-containing vinylic monomer or a secondary amino group-containing vinylic monomer) can be prepared according to any well-known radical polymerization methods or obtained from commercial suppliers. Copolymers containing methacryloyloxyethyl phosphorylcholine and carboxyl-containing vinylic monomer (or amino-containing vinylic monomer) can be obtained from NOP Corporation (e.g., LIPIDURE®-AC01, and AE).

The weight average molecular weight $M_w$ of the hydrophilic polymer having at least one amino, carboxyl or thiol group (as a hydrophilicity-enhancing agent) is preferably from about 500 to about 2,000,000, more preferably from about 1,000 to about 500,000, even more preferably from about 5,000 to about 250,000 Daltons.

Water-soluble and thermally-crosslinkable hydrophilic polymeric materials can be prepared according to the processes disclosed in U.S. Pat. Appl. Pub. No. US 2019/0179055 A1 and in U.S. Pat. Nos. 8,529,057, and 9,422,447, 9,720,138.

In a preferred embodiment, a water-soluble thermally-crosslinkable polymeric material can be obtained by heating an aqueous reactive solution, which comprises at least one azetidinium-containing polymer and at least one hydrophilicity-enhancing agent (i.e., a wetting agent) having at least one reactive functional group selected from the group consisting of amino group, carboxyl group, thiol group, and a combination thereof, to a temperature of from about 35° C. to about 85° C. and maintaining the temperature for a period of time sufficient (about 8 hours or less, preferably about 5 hours, more preferably from about 2 hour to about 4 hours). The aqueous reactive solution preferably comprises from about 70 mM to about 170 mM (preferably about 90 mM to about 150 mM, more preferably from about 100 mM to about 130 mM) of one or more ionic compounds and a pH of at least 8.0 (preferably at least 8.5, more preferably at least 9.0, even more preferably at least 9.5). It should be understood that the reaction time should be long enough to covalently attach the hydrophilicity-enhancing agent onto the polymer chain of the azetidinium-containing polymer, but should be short enough not to consume all the azetidinium groups of the azetidinium-containing polymer and not to form a gel (i.e., not water-soluble) due to the too many crosslinkages formed between the azetidinium-containing polymer and the hydrophilicity-enhancing agent. A resultant polymeric material is a lightly-crosslinked polymeric material which has a highly-branched structure and still comprises thermally-crosslinkable azetidinium groups.

A person skilled in the art understands well how to adjust the pH of the reactive mixture, e.g., by adding a base (e.g., NaOH, KOH, NH$_4$OH, or mixture thereof) or an acid (e.g., HCl, H$_2$SO$_4$, H$_3$PO$_4$, citric acid, acetic acid, boric acid, or mixture thereof).

In accordance with the invention, any ionic compounds can be used in the reactive mixture. Preferably, ionic compounds are those used as ionic tonicity-adjusting agents and ionic buffering agents used in an ophthalmic solutions. Examples of preferred ionic tonicity-adjusting agents includes without limitation sodium chloride, potassium chloride, and combinations thereof. Examples of preferred ionic buffering agents includes various salts of phosphoric acid (e.g. NaH$_2$PO$_4$, Na$_2$HPO$_4$, Na$_3$PO$_4$, KH$_2$PO$_4$, K$_2$HPO$_4$, K$_3$PO$_4$, or mixtures thereof), various salts of boric acid (e.g., sodium borate, potassium borate, or mixture thereof), various salts of citric acid (e.g., monosodium citrate, disodium citrate, trisodium citrate, monopotassium citrate, dipotassium citrate, tripotassium citrate, or mixtures thereof), various salts of carbonic acid (e.g., Na$_2$CO$_3$, NaHCO$_3$, K$_2$CO$_3$, KHCO$_3$, or mixture thereof).

The aqueous reactive solution for preparing a water-soluble thermally-crosslinkable polymeric material can be prepared by dissolving a desired amount of an azetidinium-containing polymer, a desired amount of a hydrophilicity-enhancing agent with at least one reactive functional group, and desired amounts of other components (e.g., ionic buffering agents, ionic tonicity-adjusting agents, etc.) in water (or a mixture of water and a minority amount of a water-soluble organic solvent) to form an aqueous solution and then adjusting the pH of the aqueous solution if necessary.

In accordance with the invention, the concentration ratio of a hydrophilicity-enhancing agent relative to an azetidinium-containing polymer in the aqueous reactive solution must be selected not to render a resultant water-soluble thermally-crosslinkable polymeric material water-insoluble (i.e., a solubility of less than 0.005 g per 100 ml of water at room temperature) and not to consume more than about 99%, preferably about 98%, more preferably about 97%, even more preferably about 96% of the azetidinium groups of the azetidinium-containing polymer.

In a preferred embodiment, the aqueous reactive solution comprises from 0.01% to about 10% by weight (preferably from 0.05% to about 5% by weight, more preferably from 0.08% to about 1% by weight, even more preferably from 0.1% to about 0.4% by weight) of an azetidinium-containing polymer and from about 0.01% to about 10% by weight (preferably from 0.02% to about 5% by weight, more preferably from 0.05% to about 2% by weight, even more preferably from 0.08% to about 1.0% by weight) of a hydrophilicity-enhancing agent having at least one reactive function group (carboxyl, primary amino, secondary amino group), the concentration ratio of the azetidinium-containing polymer to the hydrophilicity-enhancing agent is from about 1000:1 to 1:1000 (preferably from about 500:1 to about 1:500, more preferably from about 250:1 to about 1:250, even more preferably from about 100:1 to about 1:100).

In a preferred embodiment, the water-soluble thermally-crosslinkable polymeric material comprises (i) from about 20% to about 95% by weight of first polymer chains derived from a polyamidoamine-epichlorohydrin or a poly(2-oxazoline-co-ethyleneimine)-epichlorohydrin, (ii) from about 5% to about 80% by weight of hydrophilic moieties or second polymer chains derived from at least one hydrophilicity-enhancing agent having at least one reactive functional group selected from the group consisting of amino group, carboxyl group, thiol group, and combination thereof (preferably carboxyl or thiol groups), wherein the hydrophilic moieties or second polymer chains are covalently attached to the first polymer chains through one or more covalent linkages each formed between one azetitdinium group of the polyamidoamine-epichlorohydrin or the poly(2-oxazoline-co-ethyleneimine)-epichlorohydrin and one amino, carboxyl or thiol group of the hydrophilicity-enhancing agent, and (iii) azetidinium groups which are parts of the first polymer chains or pendant or terminal groups covalently attached to the first polymer chains. The composition of a chemically-modified poly(2-oxazoline-co-ethyleneimine)-epichlorohydrin or a chemically-modified polyamidoamine-epichlorohydrin is determined by the composition (based on the total weight of the reactants) of a reactant mixture used for such a polymer according to the crosslinking reactions shown in Scheme I above. For example, if a reactant mixture comprises about 75% by weight of a polyamidoamine-epichlorohydrin and about 25% by weight of at least one hydrophilicity-enhancing agent based on the total weight of the reactants, then the resultant chemically-modified polyamidoamine-epichlorohydrin comprises about 75% by weight of first polymer chains derived from the polyamioamine-epichlorohydrin and about 25% by weight of hydrophilic moieties or second polymer chains derived from said at least one hydrophilicity-enhancing agent.

In accordance with the invention, the step of heating is performed preferably by autoclaving the silicone hydrogel lens precursor immersed in a packaging solution (i.e., a buffered aqueous solution) in a sealed lens package at a temperature of from about 115° C. to about 125° C. for approximately 20-90 minutes. In accordance with this embodiment of the invention, the packaging solution is a buffered aqueous solution which is ophthalmically safe after autoclave.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

In accordance with the invention, a packaging solution contains at least one buffering agent and one or more other ingredients known to a person skilled in the art. Examples of other ingredients include without limitation, tonicity agents, surfactants, antibacterial agents, preservatives, and lubricants (e.g., cellulose derivatives, polyvinyl alcohol, polyvinyl pyrrolidone).

The packaging solution contains a buffering agent in an amount sufficient to maintain a pH of the packaging solution in the desired range, for example, preferably from about 6.8 to about 8.5, more preferably from about 7.0 to 8.2, even more preferably from about 7.2 to about 8.0. It is found that a higher pH is desirable for ensuring that all or a significant portion of the carboxyl groups of the bulk silicone hydrogel material are ionized. As a result, the resultant silicone hydrogel contact lenses become dimensionally stable in the packaging solution during autocleve and storage and can have improved lubricity.

Any known, physiologically compatible buffering agents can be used. Suitable buffering agents as a constituent of the contact lens care composition according to the invention are known to a person skilled in the art. Preferably, a phosphate buffer (consisting essentially of a mixture of a monobasic dihydrogen phosphate (e.g., $NaH_2PO_4$, $KH_2PO_4$, or mixtures thereof) and dibasic monohydrogen phosphate (e.g., $Na_2HPO_4$, $K_2HPO_4$, or mixtures thereof) are used for maintaining the pH of the the packaging solution. In various preferred embodiments, the total concentration of the monobasic dihydrogen phosphate and the dibasic monohydrogen phosphate is at least 30 mM (preferably at least 35 mM, more preferably at least 40 mM, even more preferably at least 45 mM).

The solutions according to the invention are preferably formulated in such a way that they are isotonic with the lachrymal fluid. A solution which is isotonic with the lachrymal fluid is generally understood to be a solution whose concentration corresponds to the concentration of a 0.9% sodium chloride solution (308 mOsm/kg). Deviations from this concentration are possible throughout.

The isotonicity with the lachrymal fluid, or even another desired tonicity, may be adjusted by adding organic or inorganic substances that affect the tonicity. Suitable occularly acceptable tonicity agents include, but are not limited to sodium chloride, potassium chloride, glycerol, propylene glycol, polyols, mannitols, sorbitol, xylitol and mixtures thereof. The tonicity of the packaging solution is typically adjusted to be from about 200 to about 450 milliosmol (mOsm), preferably from about 250 to 350 mOsm.

In a preferred embodiment, one or more organic tonicity agents (e.g., glycerol, propylene glycol, polyethylene glycol having a number average molecular weigh of from 200 to 800 daltons), mannitols, sorbitol, xylitol, and mixtures thereof) are present in an amount of at least 70 mM (preferably at least 90 mM, more preferably at least 110 mM, even more preferably at least 130 mM) for adjusting the tonicity of the packaging solution. It is found that the resultant silicone hydrogel contact lenses can have improved lubricity when the ionic strength of the packaging solution is lowered (e.g., by replacing a portion of NaCl with an organic tonicity agent, e.g., propylene glycol).

In a preferred embodiment, the packaging solution comprises preferably from about 0.01% to about 2%, more preferably from about 0.05% to about 1.5%, even more preferably from about 0.1% to about 1%, most preferably from about 0.2% to about 0.5%, by weight of a water-soluble thermally-crosslinkable hydrophilic polymeric material having azetidinium groups.

In another aspect, the invention provides a coated silicone hydrogel contact lens, comprising a bulk silicone hydrogel material and a layer of a non-silicone hydrogel material (i.e., a crosslinked hydrophilic polymeric material) thereon, wherein the bulk silicone hydrogel material comprises (a) repeating units of at least one hydrophilized polysiloxane vinylic crosslinker, (b) repeating units of hydroxyethyl methacrylate, (c) repeating units of at least one $C_1$-$C_2$ alkoxyethyl (meth)acrylate, (d) carboxyl-containing repeating units of at least one carboxyl-containing (meth)acryloxy monomer, and (e) optionally repeating units of at least one polymerizable component selected from the group consisting of a non-silicone vinylic crosslinker, a UV-absorbing vinylic monomer, a polymerizable UV/high-energy-violet-light absorbing compound, a polymerizable photochromic compound, a polymerizable tinting agent, and combinations thereof, provided the amount of the component (e) is less than 10% by weight relative to the total weight of the bulk silicone hydrogel material in dry state, wherein the layer of the non-silicone hydrogel material is covalently attached to the bulk silicone hydrogel material through the carboxyl groups of the carboxyl-containing repeating units, wherein the silicone hydrogel contact lens has a water-break-up-time (WBUT) of at least about 5 seconds (preferably at least about 10 second, more preferably at least about 15 seconds, even more preferably at least about 20 seconds), an oxygen permeability (Dk) of at least about 50 barrers (preferably at least about 60 barrers, more preferably at least about 70 barrers, and even more preferably at least about 80 barrers), and an elastic modulus of from 0.2 MPa to 1.8 MPa (preferably from about 0.2 MPa to about 1.5 MPa, more preferably from about 0.3 MPa to about 1.2 MPa, even more preferably from about 0.4 MPa to about 1.0 MPa).

It is understood that the amount of the component (e) relative to the total weight of the bulk silicone hydrogel material in dry state can be calculated based on the weight percentage of the component (e) relative to the total weight of all polymerizable components in a polymerizable composition for forming the bulk silicone hydrogel material.

In various preferred embodiment, the bulk silicone hydrogel material further comprises: repeating units of at least one non-silicone vinylic crosslinker; repeating units of at least one UV-absorbing vinylic monomer; repeating units of at least one polymerizable UV/HEVL-absorbing compound; repeating units of at least polymerizable photocromic compound; or combinations thereof.

In various preferred embodiments, the non-silicone hydrogel material is:

(1) a crosslinked polymeric material which comprises at least 25% by mole (preferably at least 35% by mole, more preferably at least 45% by mole, even more preferably at least 55% by mole) of repeating monomeric units of at least one hydrophilic vinylic monomer selected from the group consisting of alkyl (meth)acrylamides (any one described below), N-2-dimethylaminoethyl (meth)acrylamide, dimethylaminoethyl (meth)acrylate, hydroxyl-containing acrylic monomers (any one described below), N-vinyl amide monomers (any one described below), methylene-containing pyrrolidone monomers (i.e., pyrrolidone derivatives each having a methylene group connected to the pyrrolidone ring at 3- or 5-position) (any one described below), acrylic monomers having a $C_1$-$C_4$ alkoxyethoxy group (any one described below), vinyl ether monomers (any one described below), allyl ether monomers (any one described below), and combinations thereof (preferably selected from the group consisting of (meth)acrylamide, dimethyl (meth)acrylamide, N-2-hydroxylethyl (meth)acrylamide, N,N-bis(hydroxyethyl) (meth)acrylamide, N-2,3-dihydroxypropyl (meth)acrylamide, N-tris(hydroxymethyl)methyl (meth) acrylamide, 2-hydroxyethyl (meth)acrylate, glycerol methacrylate (GMA), tetra(ethylene glycol) (meth)acrylate, poly(ethylene glycol)ethyl (meth)acrylamide having a number average molecular weight of up to 1500, poly(ethylene glycol) (meth)acrylate having a number average molecular weight of up to 1500, N-vinylpyrrolidone, N-vinyl-N-methyl acetamide, N-vinyl formamide, N-vinyl acetamide, 1-methyl-3-methylene-2-pyrrolidone, 1-methyl-5-methylene-2-pyrrolidone, 5-methyl-3-methylene-2-pyrrolidone, tetra(ethylene glycol) methyl ether (meth)acrylate, methoxypoly(ethylene glycol)ethyl (meth)acrylamide having a number average molecular weight of up to 1500, $C_1$-$C_4$-alkoxy polyethylene glycol (meth)acrylate having a weight average molecular weight of up to 1500, tetra(ethylene glycol) monovinyl ether, poly(ethylene glycol) monovinyl ether, tetra(ethylene glycol) methyl vinyl ether, poly (ethylene glycol) methyl vinyl ether, tetra(ethylene glycol) monoallyl ether, poly(ethylene glycol) monoallyl ether, tetra (ethylene glycol) methyl allyl ether, poly(ethylene glycol) methyl allyl ether, vinyl alcohol, allyl alcohol, and combinations thereof, more preferably selected from the group consisting of (meth)acrylamide, dimethyl (meth)acrylamide, N-2-hydroxylethyl (meth)acrylamide, N,N-bis(hydroxyethyl) (meth)acrylamide, N-2,3-dihydroxypropyl (meth)acrylamide, N-tris(hydroxymethyl)methyl (meth)acrylamide, 2-hydroxyethyl (meth)acrylate, glycerol methacrylate (GMA), poly(ethylene glycol)ethyl (meth)acrylamide having a number average molecular weight of up to 1500, poly(ethylene glycol) (meth)acrylate having a number average molecular weight of up to 1500, N-vinylpyrrolidone, N-vinyl-N-methyl acetamide, methoxypoly(ethylene glycol)ethyl (meth)acrylamide having a number average molecular weight of up to 1500, methoxy polyethylene glycol (meth)acrylate having a weight average molecular weight of up to 1500, poly(ethylene glycol) monovinyl ether, poly (ethylene glycol) methyl vinyl ether, poly(ethylene glycol) monoallyl ether, poly(ethylene glycol) methyl allyl ether, vinyl alcohol, allyl alcohol, and combinations thereof, even more preferably selected from the group consisting of (meth)acrylamide, dimethyl (meth)acrylamide, N-2-hydroxylethyl (meth)acrylamide, N,N-bis(hydroxyethyl) (meth)acrylamide, N-2,3-dihydroxypropyl (meth)acrylamide, N-tris(hydroxymethyl)methyl (meth)acrylamide, poly(ethylene glycol)ethyl (meth)acrylamide having a number average molecular weight of up to 1500, poly(ethylene glycol) (meth)acrylate having a number average molecular weight of up to 1500, N-vinylpyrrolidone, N-vinyl-N-methyl acetamide, methoxypoly(ethylene glycol)ethyl (meth)acrylamide having a number average molecular weight of up to 1500, methoxy polyethylene glycol (meth) acrylate having a weight average molecular weight of up to 1500, and combinations thereof;

(2) a crosslinked polymeric material which comprises at least 25% by mole (preferably at least 35% by mole, more preferably at least 45% by mole, even more preferably at least 55% by mole) of repeating monomeric units of at least one phosphrylcholine-containing vinylic monomer (any one described below), preferably selected from the group consisting of (meth)acryloyloxyethyl phosphorylcholine, (meth)acryloyloxypropyl phosphorylcholine, 4-((meth) acryloyloxy)butyl-2'-(trimethylammonio)ethylphosphate, 2-[(meth)acryloylamino]ethyl-2'-(trimethylammonio)ethylphosphate, 3-[(meth)acryloylamino]propyl-2'-(trimethylammonio)ethylphosphate, 4-[(meth)acryloylamino]butyl-2'-(trimethylammonio)ethylphosphate, and combinations thereof;

(3) a crosslinked polymeric material which comprises poly(ethylene glycol) chains, preferably derived directly from (a) a pol(ethylene glycol) having one sole functional group of —$NH_2$, —SH or —COOH, (b) a pol(ethylene glycol) having two terminal functional groups selected from the group consisting of —$NH_2$, —COOH, —SH, and combinations thereof, (c) a multi-arm poly(ethylene glycol) having one or more functional groups selected from the group consisting of —NH$_2$, —COOH, —SH, and combinations thereof, and (d) combinations thereof.

Examples of alkyl (meth)acrylamides includes without limitation (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof.

Examples of hydroxyl-containing acrylic monomers include without limitation N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol) ethyl (meth)acrylamide having a number average molecular weight of up to 1500, and combinations thereof.

Examples of preferred N-vinyl amide monomers include without limitation N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof. Preferably, the N-vinyl amide monomer is N-vinylpyrrolidone, N-vinyl-N-methyl acetamide, or combinations thereof.

Examples of preferred methylene-containing (=CH$_2$) pyrrolidone monomers include without limitations 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof.

Examples of preferred acrylic monomers having a C$_1$-C$_4$ alkoxyethoxy group include without limitation ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, C$_1$-C$_4$-alkoxy poly(ethylene glycol) (meth) acrylate having a weight average molecular weight of up to 1500, methoxy-poly(ethylene glycol)ethyl (meth)acrylamide having a number average molecular weight of up to 1500, and combinations thereof.

Examples of preferred vinyl ether monomers include without limitation ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof.

Examples of preferred allyl ether monomers include without limitation allyl alcohol, ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof.

Examples of preferred phosphorylcholine-containing vinylic monomers include without limitation (meth)acryloyloxyethyl phosphorylcholine (aka, MPC, or 2-((meth)acryloyloxy)ethyl-2'-(trimethylammonio)ethylphosphate), (meth)acryloyloxypropyl phosphorylcholine (aka, 3-((meth)acryloyloxy)propyl-2'-(trimethylammonio)ethylphosphate), 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio)ethylphosphate, 4-[(meth)acryloylamino]butyl-2'-(trimethylammonio)ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)pentyl-2'-(trimethylammonio)ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)ethylphosphate, 2-(allyloxycarbonylamino)ethyl-2'-(trimethylammonio)ethyl phosphate, 2-(butenoyloxy)ethyl-2-(trimethylammonio)ethylphosphate, and combinations thereof.

Various embodiments of hydrophilized polysiloxane vinylic crosslinkers, carboxyl-containing (meth)acryloxy monomers, non-silicone vinylic crosslinkers, UV-absorbing vinylic monomers; polymerizable UV/HEVL-absorbing compounds; polymerizable photocromic compounds, free radical initiators, other polymerizable components known to be suitable for making silicone hydrogel contact lenses, water-soluble and thermally-crosslinkable hydrophilic polymeric materials for forming non-silicone hydrogel coatings on silicone hydrogel contact lenses are described above and can be used in this aspect of the invention.

A coated silicone hydrogel contact lens of the invention further has: an equilibrium water content of from about 20% to about 75% (preferably from about 25% to about 70%, more preferably from about 30% to about 65%) by weight (i.e., when being fully hydrated), a friction rating of about 3.0 or lower (preferably about 2.5 or lower, more preferably about 2 or lower, even more preferably about 1.5 or lower);

an average water contact angle of about 90 degrees or lower (preferably about 80 degrees or lower, more preferably about 70 degrees or lower, even more preferably about 60 degrees or lower) by sessile drop; or combinations thereof.

Although various embodiments of the invention have been described using specific terms, devices, and methods, such description is for illustrative purposes only. The words used are words of description rather than of limitation. As would be obvious to one skilled in the art, many variations and modifications of the invention may be made by those skilled in the art without departing from the spirit and scope of the novel concepts of the disclosure. In addition, it should be understood that aspects of the various embodiments of the invention may be interchanged either in whole or in part or can be combined in any manner and/or used together, as illustrated below:

1. A method for producing coated silicone hydrogel contact lenses, comprising the steps of:
  (1) introducing a polymerizable composition into a lens mold, wherein the polymerizable composition comprises (a) at least one hydrophilized polysiloxane vinylic crosslinker, (b) optionally hydroxyethyl methacrylate, (c) at least one $C_1$-$C_2$ alkoxyethyl (meth)acrylate, (d) from about 2% to about 10% by weight of at least one carboxyl-containing (meth)acryloxy monomer relative to the total amount of all polymerizable components, (e) at least one free-radical, and (f) optionally at least one solvent selected from the group consisting of water, propylene glycol, a polyethyleneglycol having a molecular weight of about 400 Daltons or less, and combinations thereof;
  (2) curing thermally or actinically the polymerizable composition in the lens mold to form a silicone hydrogel lens precursor comprising a bulk silicone hydrogel material that comprises carboxyl groups;
  (3) optionally hydrating the silicone hydrogel lens precursor obtained in step (2) in water or an aqueous solution to obtain a hydrated silicone hydrogel contact lens; and
  (4) heating the silicone hydrogel lens precursor obtained in step (2) or the hydrated silicone hydrogel contact lens obtained in step (3) directly in an aqueous solution having a pH from about 6.8 to about 8.5 and including at least one water-soluble, thermally-crosslinkable hydrophilic polymeric material at a temperature from about 60° C. to about 140° C. to form a coated silicone hydrogel contact lens comprising the bulk silicone hydrogel material and a layer of a crosslinked hydrophilic polymeric material that is covalently attached onto the bulk silicone hydrogel material,
  wherein the coated silicone hydrogel contact lens exhibits a water-break-up-time (WBUT) of at least about 5 seconds and an oxygen permeability of at least about 50 barrers.

2. The method of embodiment 1, wherein the the sum of the amounts of components (a) to (e) is at least about 90% by weight, relative to the total amount of all polymerizable components in the polymerizable composition.

3. The method of embodiment 1, wherein the the sum of the amounts of components (a) to (e) is at least about 92% by weight, relative to the total amount of all polymerizable components in the polymerizable composition.

4. The method of embodiment 1, wherein the the sum of the amounts of components (a) to (e) is at least about 94% by weight, even more preferably at least about 96% by weight relative to the total amount of all polymerizable components in the polymerizable composition.

5. The method of embodiment 1, wherein the the sum of the amounts of components (a) to (e) is at least about 96% by weight relative to the total amount of all polymerizable components in the polymerizable composition.

6. The method of any one of embodiments 1 to 5, wherein the polymerizable composition comprises from about 30% to about 65% by weight of component (a), relative to the total amount of all polymerizable components.

7. The method of any one of embodiments 1 to 5, wherein the polymerizable composition comprises from about 35% to about 60% by weight of component (a), relative to the total amount of all polymerizable components.

8. The method of any one of embodiments 1 to 5, wherein the polymerizable composition comprises from about 40% to about 60% by weight of component (a), relative to the total amount of all polymerizable components.

9. The method of any one of embodiments 1 to 8, wherein the polymerizable composition comprises from about 30% to about 65% by weight of components (b) and (c), relative to the total amount of all polymerizable components.

10. The method of any one of embodiments 1 to 8, wherein the polymerizable composition comprises from about 35% to about 60% by weight of components (b) and (c), relative to the total amount of all polymerizable components.

11. The method of any one of embodiments 1 to 8, wherein the polymerizable composition comprises from about 40% to about 60% by weight of components (b) and (c), relative to the total amount of all polymerizable components.

12. The method of any one of embodiments 1 to 11, wherein the polymerizable composition comprises from about 2% to about 10% by weight of component (d), relative to the total amount of all polymerizable components.

13. The method of any one of embodiments 1 to 11, wherein the polymerizable composition comprises from about 3% to about 9% by weight of component (d), relative to the total amount of all polymerizable components.

14. The method of any one of embodiments 1 to 11, wherein the polymerizable composition comprises from about 4% to about 8% by weight of component (d), relative to the total amount of all polymerizable components.

15. The method of any one of embodiments 1 to 14, wherein the weight ratio of component (c) to component (b) in the polymerizable composition is about 40 to about 20.

16. The method of any one of embodiments 1 to 14, wherein the weight ratio of component (c) to component (b) in the polymerizable composition is about 35 to about 15.

17. The method of any one of embodiments 1 to 14, wherein the weight ratio of component (c) to component (b) in the polymerizable composition is about 30 to about 15.

18. The method of any one of embodiments 1 to 17, wherein the polymerizable composition further comprises one or more polymerizable components selected from the group consisting of (g) a non-silicone vinylic crosslinker, (h) a UV-absorbing vinylic monomer, (i) a polymerizable UV/high-energy-violet-light absorbing compound, (j) a polymerizable photochromic compound, (k) a polymerizable tinting agent, and (l) combinations thereof, provided the sum of the components (g) to (l) is less than 10% by weight relative to the amount of all polymerizable components.

19. The method of embodiment 18, wherein the polymerizable composition further comprises a non-silicone vinylic crosslinker selected from the group consisting of ethyleneglycol di-(meth)acrylate, diethyleneglycol di-(meth)acrylate, triethyleneglycol di-(meth)acrylate, tetraethyleneglycol di-(meth)acrylate, polyethylene glycol di-(meth)acrylate having a number averaged molecular weight of from 200 to 10,000 daltons, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)]di-(meth)acrylate, bis[2-(meth)acryloxyethyl]phosphate, trimethylolpropane di-(meth)acrylate, and 3,4-bis[(meth)acryloyl]tetrahydrofuan, diacrylamide (i.e., N-(1-oxo-2-propenyl)-2-propenamide), dimethacrylamide (i.e., N-(1-oxo-2-methyl-2-propenyl)-2-methyl-2-propenamide), N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamide-propane-2-yl dihydrogen phosphate (i.e., N,N'-2-phophonyloxypropylene bis(meth)acrylamide), piperazine diacrylamide (or 1,4-bis(meth)acryloyl piperazine), triallyl isocyanurate, triallyl cyanurate, and combinations thereof.

20. The method of embodiment 19, wherein the non-silicone vinylic crosslinker is selected from the group consisting of ethyleneglycol di-(meth)acrylate, diethyleneglycol di-(meth)acrylate, triethyleneglycol di-(meth)acrylate, tetraethyleneglycol di-(meth)acrylate, polyethylene glycol di-(meth)acrylate having a number averaged molecular weight of from 200 to 10,000 daltons, and combinations thereof.

21. The method of any one of embodiments 1 to 20, wherein the step of heating is performed preferably by autoclaving the silicone hydrogel lens precursor immersed in a packaging solution (i.e., a buffered aqueous solution) in a sealed lens package at a temperature of from about 115° C. to about 125° C. for approximately 20-90 minutes.

22. The method of any one of embodiments 1 to 21, wherein said at least one water-soluble and thermally crosslinkable hydrophilic polymeric material comprises azetidinium groups, epoxy groups or combinations thereof.

23. The method of embodiment 22, wherein said at least one water-soluble and thermally crosslinkable hydrophilic polymeric material has a three-dimensional network and thermally-crosslinkable groups within the network or being attached to the network.

24. The method of embodiment 22, wherein said at least one water-soluble and thermally crosslinkable hydrophilic polymeric material is: one or more multi-armed polyethylene glycols each having terminal epoxy groups; a mixture of a multi-armed polyethylen glycol having terminal epoxy group and one or more polyethylene glycol each having terminal functional groups selected from the group consisting of primary amine groups, secondary amine groups, carboxyl groups, thiol groups, and combinations thereof; a partial reaction product of a multi-armed polyethylene having terminal epoxy groups and a hydrophilicity-enhancing agent having at least one reactive functional group selected from the group consisting of amino group, carboxyl group, thiol group; or combinations thereof.

25. The method of embodiment 22, wherein said at least one water-soluble and thermally crosslinkable hydrophilic polymeric material comprises azetidinium groups and is a partial reaction product of an azetidinium-containing polymer and a hydrophilicity-enhancing agent having at least one reactive functional group selected from the group consisting of a primary amine group, a secondary amine group, a carboxyl group, a thiol group, and combinations thereof.

26. The method of embodiment 25, wherein the azetidinium-containing polymer is a poly(2-oxazoline-co-ethyleneimine)-epichlorohydrin copolymer, a polyamidoamine-epichlorohydrin, a copolymer of an azetidinium-containing vinylic monomer with one or more hydrophilic vinylic monomers, or combinations thereof.

27. The method of embodiment 25 or 26, wherein the hydrophilicity-enhancing agent is: a primary amino-, secondary amino-, carboxyl- or thiol-containing monosaccharide; a primary amino-, secondary amino-, carboxyl- or thiol-containing disaccharide; a primary amino-, secondary amino-, carboxyl- or thiol-containing oligosaccharide; or combinations thereof.

28. The method of embodiment 25 or 26, wherein the hydrophilicity-enhancing agent is a hydrophilic polymer having one or more primary or secondary amino groups, one or more carboxyl groups, one or more thiol groups, or combinations thereof.

29. The method of embodiment 28, wherein the hydrophilicity-enhancing agent is a polysaccharide having primary amine groups, secondary amine groups, carboxyl groups, or combinations thereof.

30. The method of embodiment 28, wherein the hydrophilicity-enhancing agent is:
  a poly(ethylene glycol) having one sole functional group of —$NH_2$, —SH or —COOH;
  a poly(ethylene glycol) having two terminal functional groups selected from the group consisting of —$NH_2$, —COOH, —SH, and combinations thereof;
  a multi-arm poly(ethylene glycol) having one or more functional groups selected from the group consisting of —$NH_2$, —COOH, —SH, and combinations thereof;
  a monoamino-, monocarboxyl-, diamino- or dicarboxyl-terminated homo- or copolymer of a non-reactive hydrophilic vinylic monomer;
  a copolymer which is a polymerization product of a composition comprising (1) from about 0.1% to about 30% (preferably from about 0.5% to about 20%, more preferably from about 1% to about 15%) of a reactive vinylic monomer and and (2) at least one non-reactive hydrophilic vinylic monomer,
  wherein the reactive vinylic monomer is a vinylic monomer having a functional group selected from the group consisting of carboxyl group, a primary amine group, and a secondary amine group,
  wherein the non-reactive hydrophilic monomer is a hydrophilic vinylic monomer free of any free of any carboxyl group, primary amine group, secondary amine group, epoxide group, isocyanate group, azlactone group, or aziridine group.

31. The method of embodiment 30, wherein the reactive vinylic monomer is acrylic acid, methacrylic acid, ethylacrylic acid, 2-(meth)acrylamidoglycolic acid, N-2-aminoethyl (meth)acrylamide, N-2-methylaminoethyl (meth)acrylamide, N-2-ethylaminoethyl (meth)acrylamide, N-3-aminopropyl (meth)acrylamide, N-3-methylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-amino-2-hydroxypropyl (meth)acrylate, or a combination thereof, wherein the non-reactive hydrophilic vinylic monomer selected from the group consisting of selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)ethylphosphate, 3-[(meth)

acryloylamino]propyl-2'-(trimethylammonio) ethylphosphate, 4-[(meth)acryloylamino]butyl-2'-(trimethylammonio)ethylphosphate, (meth)acrylamide, dimethyl (meth)acrylamide, N-2-hydroxylethyl (meth)acrylamide, N,N-bis(hydroxyethyl) (meth)acrylamide, N-2,3-dihydroxypropyl (meth)acrylamide, N-tris(hydroxymethyl) methyl (meth)acrylamide, 2-hydroxyethyl (meth)acrylate, glycerol methacrylate (GMA), tetra(ethylene glycol) (meth)acrylate, poly(ethylene glycol)ethyl (meth)acrylamide having a number average molecular weight of up to 1500, poly(ethylene glycol) (meth)acrylate having a number average molecular weight of up to 1500, N-vinylpyrrolidone, N-vinyl-N-methyl acetamide, N-vinyl formamide, N-vinyl acetamide, 1-methyl-3-methylene-2-pyrrolidone, 1-methyl-5-methylene-2-pyrrolidone, 5-methyl-3-methylene-2-pyrrolidone, tetra(ethylene glycol) methyl ether (meth)acrylate, methoxypoly(ethylene glycol)ethyl (meth)acrylamide having a number average molecular weight of up to 1500, $C_1$-$C_4$-alkoxy polyethylene glycol (meth)acrylate having a weight average molecular weight of up to 1500, tetra(ethylene glycol) monovinyl ether, poly(ethylene glycol) monovinyl ether, tetra(ethylene glycol) methyl vinyl ether, poly(ethylene glycol) methyl vinyl ether, tetra(ethylene glycol) monoallyl ether, poly(ethylene glycol) monoallyl ether, tetra(ethylene glycol) methyl allyl ether, poly(ethylene glycol) methyl allyl ether, vinyl alcohol, allyl alcohol, and combinations thereof.

32. The method of any one of embodiments 1 to 31, wherein the aqueous solution has a pH of from about 7.0 to about 8.2, wherein the aqueous solution comprises from about 0.01% to about 2% (preferably from about 0.05% to about 1.5%, more preferably from about 0.1% to about 1%, even more preferably from about 0.2% to about 0.5%) by weight of said at least one water-soluble thermally-crosslinkable hydrophilic polymeric material.

33. The method of any one of embodiments 1 to 31, wherein the aqueous solution has a pH of from about 7.2 to about 8.0, wherein the aquesous solution comprises from about 0.01% to about 2% (preferably from about 0.05% to about 1.5%, more preferably from about 0.1% to about 1%, even more preferably from about 0.2% to about 0.5%) by weight of said at least one water-soluble thermally-crosslinkable hydrophilic polymeric material.

34. The method of any one of embodiments 1 to 33, wherein the aqueous solution comprises a mixture of a monobasic dihydrogen phosphate and dibasic monohydrogen phosphate for maintaining the pH of the aqueous solution, wherein the the total concentration of the monobasic dihydrogen phosphate and the dibasic monohydrogen phosphate is at least 30 mM.

35. The method of embodiment 34, wherein the the total concentration of the monobasic dihydrogen phosphate and the dibasic monohydrogen phosphate is at least 35 mM.

36. The method of embodiment 34, wherein the the total concentration of the monobasic dihydrogen phosphate and the dibasic monohydrogen phosphate is at least 40 mM.

37. The method of embodiment 34, wherein the the total concentration of the monobasic dihydrogen phosphate and the dibasic monohydrogen phosphate is at least 45 mM.

38. The method of any one of embodiments 1 to 37, wherein the tonicity of the aqueous solution is adjusted to be about 200 to about 450 milliosmol (mOsm), wherein the aqueous solution comprises one or more organic tonicity agents selected from the group consisting of glycerol, propylene glycol, polyethylene glycol having a number average molecular weigh of from 200 to 800 daltons, mannitols, sorbitol, xylitol, and mixtures thereof, wherein the total concentration of said one or more organic tonicity agents is at least 70 mM.

39. The method of embodiment 38, wherein the the total concentration of said one or more organic tonicity agents is at least 90 mM.

40. The method of embodiment 38, wherein the the total concentration of said one or more organic tonicity agents is at least 110 mM.

41. The method of embodiment 38, wherein the the total concentration of said one or more organic tonicity agents is at least 130 mM.

42. A coated silicone hydrogel contact lens, comprising: a bulk silicone hydrogel material; and a layer of a non-silicone hydrogel material thereon, wherein the bulk silicone hydrogel material comprises (a) repeating units of at least one hydrophilized polysiloxane vinylic crosslinker, (b) optionally (but preferably) repeating units of hydroxyethyl methacrylate, (c) repeating units of at least one $C_1$-$C_2$ alkoxyethyl (meth)acrylate, (d) carboxyl-containing repeating units of at least one carboxyl-containing (meth)acryloxy monomer, and (e) optionally repeating units of at least one polymerizable component selected from the group consisting of a non-silicone vinylic crosslinker, a UV-absorbing vinylic monomer, a polymerizable UV/high-energy-violet-light absorbing compound, a polymerizable photochromic compound, a polymerizable tinting agent, and combinations thereof, provided the amount of the component (e) is less than 10% by weight relative to the total weight of the bulk silicone hydrogel material in dry state, wherein the layer of the non-silicone hydrogel material is covalently attached to the bulk silicone hydrogel material through the carboxyl groups of the carboxyl-containing repeating units, wherein the silicone hydrogel contact lens has a water-break-up-time (WBUT) of at least 5 seconds, an oxygen permeability (Dk) of at least 50 barrers, and an elastic modulus of from about 0.2 MPa to about 1.8 MPa.

43. The coated silicone hydrogel contact lens of embodiment 42 or the method of any one of embodiments 1 to 41, wherein the coated silicone hydrogel contact lens has a water-break-up-time (WBUT) of at least about 10 seconds.

44. The coated silicone hydrogel contact lens of embodiment 42 or the method of any one of embodiments 1 to 41, wherein the coated silicone hydrogel contact lens has a water-break-up-time (WBUT) of at least about 15 seconds.

45. The coated silicone hydrogel contact lens of embodiment 42 or the method of any one of embodiments 1 to 41, wherein the coated silicone hydrogel contact lens has a water-break-up-time (WBUT) of at least about 20 seconds.

46. The coated silicone hydrogel contact lens of any one of embodiments 42 to 45 or the method of any one of embodiments 1 to 41 and 43 to 45, wherein the coated silicone hydrogel contact lens has an oxygen permeability (Dk) of at least about 60 barrers.

47. The coated silicone hydrogel contact lens of any one of embodiments 42 to 45 or the method of any one of embodiments 1 to 41 and 43 to 45, wherein the coated silicone hydrogel contact lens has an oxygen permeability (Dk) of at least about 70 barrers.

48. The coated silicone hydrogel contact lens of any one of embodiments 42 to 45 or the method of any one of embodiments 1 to 41 and 43 to 45, wherein the coated silicone hydrogel contact lens has an oxygen permeability (Dk) of at least about 80 barrers.

49. The coated silicone hydrogel contact lens of any one of embodiments 42 to 48 or the method of any one of embodiments 1 to 41 and 43 to 48, wherein the coated silicone hydrogel contact lens has an elastic modulus of from about 0.2 MPa to about 1.5 MPa.

50. The coated silicone hydrogel contact lens of any one of embodiments 42 to 48 or the method of any one of embodiments 1 to 41 and 43 to 48, wherein the coated silicone hydrogel contact lens has an elastic modulus of from about 0.3 MPa to about 1.2 MPa.

51. The coated silicone hydrogel contact lens of any one of embodiments 42 to 48 or the method of any one of embodiments 1 to 41 and 43 to 48, wherein the coated silicone hydrogel contact lens has an elastic modulus of from about 0.4 MPa to about 1.0 MPa.

52. The coated silicone hydrogel contact lens of any one of embodiments 42 to 51 or the method of any one of embodiments 1 to 41 and 43 to 51, wherein the coated silicone hydrogel contact lens has an equilibrium water content of from about 20% to about 75% by weight (i.e., when being fully hydrated).

53. The coated silicone hydrogel contact lens of any one of embodiments 42 to 51 or the method of any one of embodiments 1 to 41 and 43 to 51, wherein the coated silicone hydrogel contact lens has an equilibrium water content of from about 25% to about 70%, by weight (i.e., when being fully hydrated).

54. The coated silicone hydrogel contact lens of any one of embodiments 42 to 51 or the method of any one of embodiments 1 to 41 and 43 to 51, wherein the coated silicone hydrogel contact lens has an equilibrium water content of from about 30% to about 65% by weight (i.e., when being fully hydrated).

55. The coated silicone hydrogel contact lens of any one of embodiments 42 to 54 or the method of any one of embodiments 1 to 41 and 43 to 54, wherein the coated silicone hydrogel contact lens has friction rating of about 3.0 or lower.

56. The coated silicone hydrogel contact lens of any one of embodiments 42 to 54 or the method of any one of embodiments 1 to 41 and 43 to 54, wherein the coated silicone hydrogel contact lens has a friction rating of about 2.5 or lower.

57. The coated silicone hydrogel contact lens of any one of embodiments 42 to 54 or the method of any one of embodiments 1 to 41 and 43 to 54, wherein the coated silicone hydrogel contact lens has a friction rating of about 2 or lower.

58. The coated silicone hydrogel contact lens of any one of embodiments 42 to 54 or the method of any one of embodiments 1 to 41 and 43 to 54, wherein the coated silicone hydrogel contact lens has a friction rating of about 1.5 or lower.

59. The coated silicone hydrogel contact lens of any one of embodiments 42 to 58 or the method of any one of embodiments 1 to 41 and 43 to 58, wherein the coated silicone hydrogel contact lens has an average water contact angle of about 90 degrees or lower by sessile drop.

60. The coated silicone hydrogel contact lens of any one of embodiments 42 to 58 or the method of any one of embodiments 1 to 41 and 43 to 58, wherein the coated silicone hydrogel contact lens has an average water contact angle of about 80 degrees or lower by sessile drop.

61. The coated silicone hydrogel contact lens of any one of embodiments 42 to 58 or the method of any one of embodiments 1 to 41 and 43 to 58, wherein the coated silicone hydrogel contact lens has an average water contact angle of about 70 degrees or lower, even more preferably about 60 degrees or lower) by sessile drop.

62. The coated silicone hydrogel contact lens of any one of embodiments 42 to 58 or the method of any one of embodiments 1 to 41 and 43 to 58, wherein the coated silicone hydrogel contact lens has an average water contact angle of about 60 degrees or lower by sessile drop.

63. The coated silicone hydrogel contact lens of any one of embodiments 42 to 62 or the method of any one of embodiments 1 to 41 and 43 to 62, wherein said at least one hydrophilized polysiloxane vinylic crosslinker comprises at least about 1.50 milliequivalent/gram ("meq/g") of hydrophilic moieties, which preferably are hydroxyl groups (—OH), carboxyl groups (—COOH), amino groups (—NHR$_{N1}$ in which R$_{N1}$ is H or C$_1$-C$_2$alkyl), amide moieties (—CO—NR$_{N1}$R$_{N2}$ in which R$_{N1}$ is H or C$_1$-C$_2$ alkyl and R$_{N2}$ is a covalent bond, H, or C$_1$-C$_2$ alkyl), N—C$_1$-C$_3$ acylamino groups, urethane moieties (—NH—CO—O—), urea moieties (—NH—CO—NH—), a polyethylene glycol chain of —(C$_2$H$_4$O—)$_n$T$_1$ in which n is an integer of 2 to 20 and T$_1$ is H, methyl or acetyl or a phosphorylcholine group, or combinations thereof.

64. The coated silicone hydrogel contact lens or method of embodiment 63, wherein said at least one hydrophilized polysiloxane vinylic crosslinker comprises at least about 2.0 meq/g of the hydrophilic moieties.

65. The coated silicone hydrogel contact lens or method of embodiment 63, wherein said at least one hydrophilized polysiloxane vinylic crosslinker comprises at least about 2.5 meq/g of the hydrophilic moieties.

66. The coated silicone hydrogel contact lens or method of embodiment 63, wherein said at least one hydrophilized polysiloxane vinylic crosslinker comprises at least about 3.0 meq/g of the hydrophilic moieties.

67. The coated silicone hydrogel contact lens of any one of embodiments 42 to 66 or the method of any one of embodiments 1 to 41 and 43 to 66, wherein said at least one hydrophilized polysiloxane vinylic crosslinker a polysiloxane vinylic crosslinker that comprises (1) a polysiloxane segment comprising dimethylsiloxane units and hydrophilized siloxane units each having one methyl substituent and one monovalent C$_4$-C$_{40}$ organic radical substituent having 2 to 6 hydroxyl groups and (2) two terminal (meth)acryloyl groups.

68. The coated silicone hydrogel contact lens or the method of embodiment 67, wherein said at least one hydrophilized polysiloxane vinylic crosslinker comprises a polysiloxane vinylic crosslinker of formula (1)

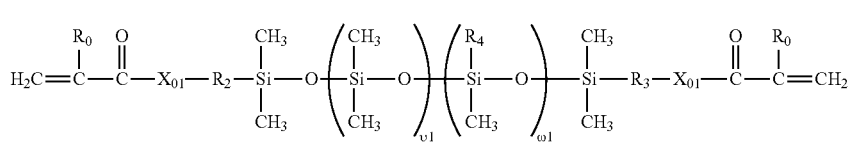 (I)

in which:

υ1 is an integer of from 30 to 500 and ω1 is an integer of from 1 to 75, provided that ω1/υ1 is from about 0.035 to about 0.15;

$X_{01}$ is O or $NR_n$ in which $R_n$ is hydrogen or $C_1$-$C_{10}$-alkyl;

$R_o$ is hydrogen or methyl;

$R_2$ and $R_3$ independently of each other are a substituted or unsubstituted $C_1$-$C_{10}$ alkylene divalent radical or a divalent radical of —$R_5$—O—$R_6$— in which $R_5$ and $R_6$ independently of each other are a substituted or unsubstituted $C_1$-$C_{10}$ alkylene divalent radical;

$R_4$ is a monovalent radical of any one of formula (2) to (7)

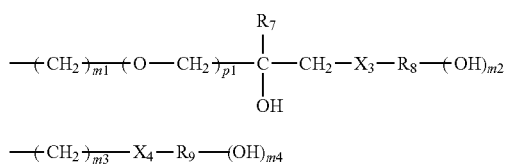 (2)

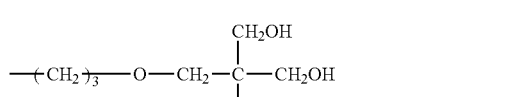 (3)

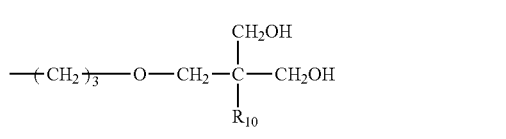 (4)

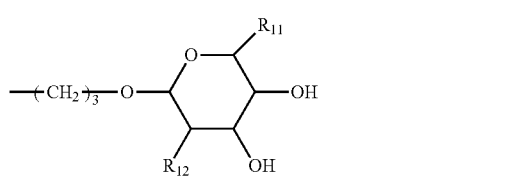 (5)

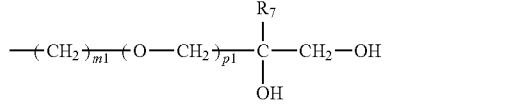 (6)

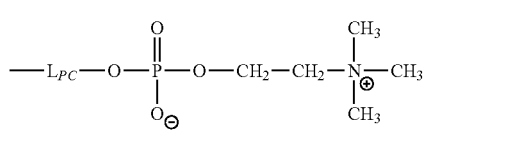 (7)

p1 is zero or 1; m1 is an integer of 2 to 4; m2 is an integer of 1 to 5; m3 is an integer of 3 to 6; m4 is an integer of 2 to 5;

$R_7$ is hydrogen or methyl;

$R_8$ is a $C_2$-$C_6$ hydrocarbon radical having (m2+1) valencies;

$R_9$ is a $C_2$-$C_6$ hydrocarbon radical having (m4+1) valencies;

$R_{10}$ is ethyl or hydroxymethyl;

$R_{11}$ is methyl or hydromethyl;

$R_{12}$ is hydroxyl or methoxy;

$X_3$ is a sulfur linkage of —S— or a teriary amino linkage of —$NR_{13}$— in which $R_{13}$ is $C_1$-$C_1$ alkyl, hydroxyethyl, hydroxypropyl, or 2,3-dihydroxypropyl;

$X_4$ is an amide linkage of

in which $R_{14}$ is hydrogen or $C_1$-$C_{10}$ alkyl;

$L_{PC}$ is a divalent radical of —$CH_2$—$CHR_0$—$R_{15}$—, —$C_3H_6$—O—$R_{16}$—,

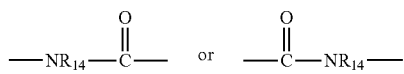

in which q1 is an integer of 1 to 20, $R_{15}$ is a linear or branched $C_1$-$C_{10}$ alkylene divalent radical, $R_{16}$ is a linear or branched $C_3$-$C_{10}$ alkylene divalent radical, and $R_{17}$ is a direct bond or a linear or branched $C_1$-$C_4$ alkylene divalent radical.

69. The coated silicone hydrogel contact lens or the method of embodiment 68, wherein in formula (1), $R_4$ is a monovalent radical of any one of formula (2a) to (2y)

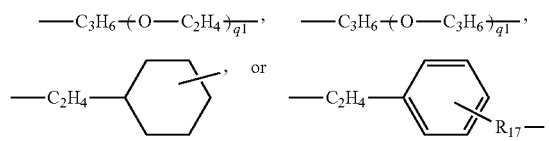 (2a)

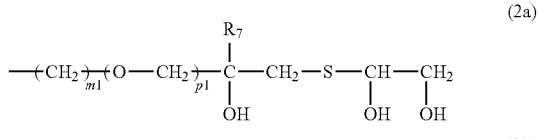 (2b)

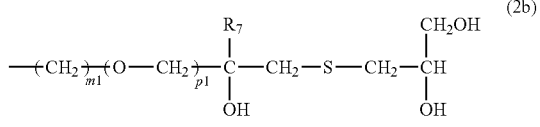 (2c)

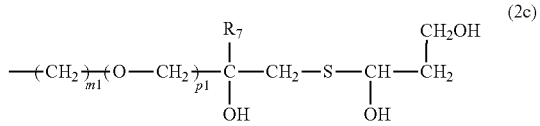 (2d)

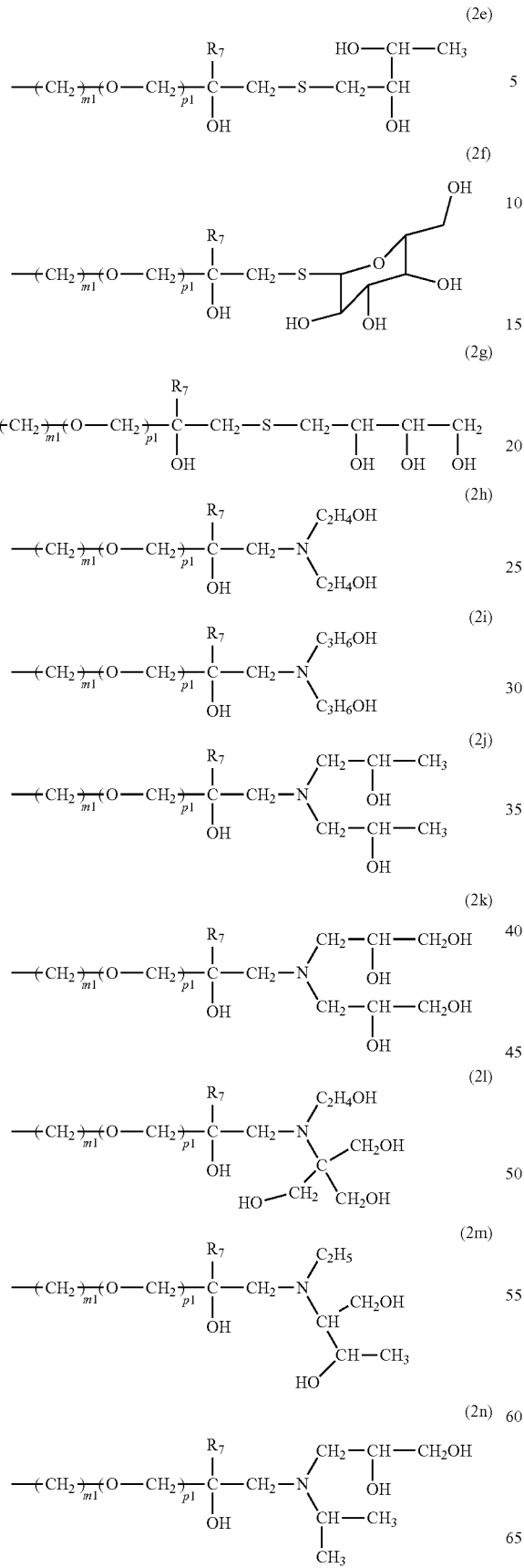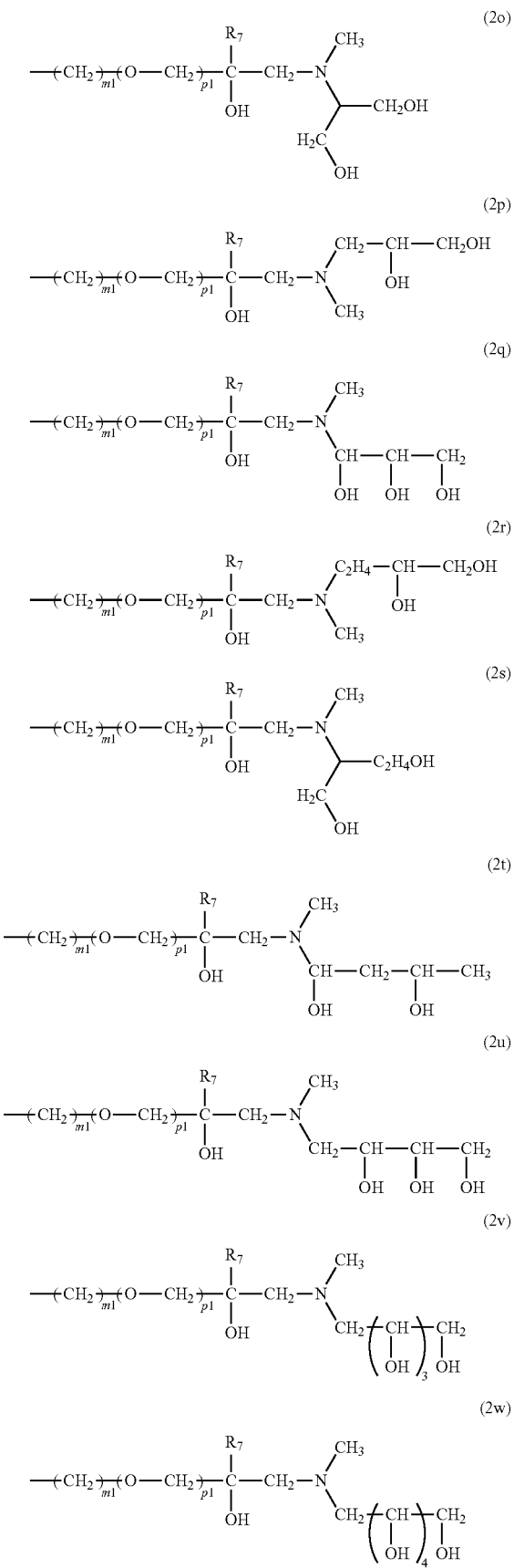

(2x)
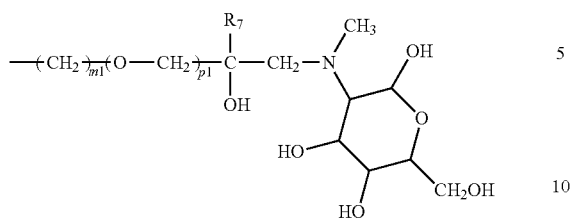
(2y)
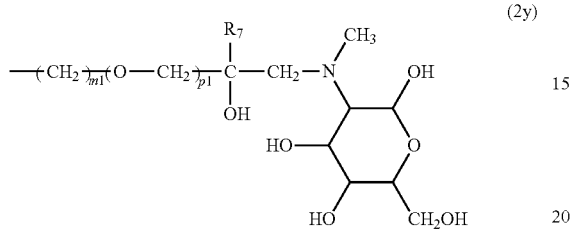
in which p1 is zero or 1, m1 is an integer of 2 to 4, $R_7$ is hydrogen or methyl.
70. The coated silicone hydrogel contact lens or the method of embodiment 68, wherein in formula (1), $R_4$ is a monovalent radical of any one of formula (3a) to (3y)
(3a)
(3b)
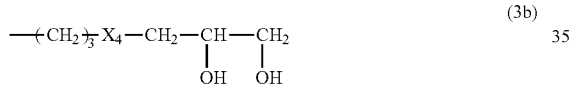
(3c)
(3d)
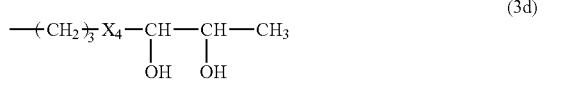
(3e)
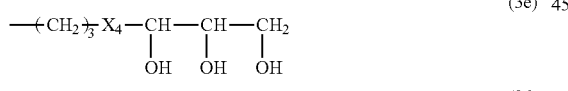
(3f)
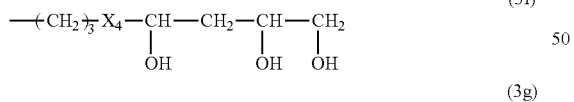
(3g)
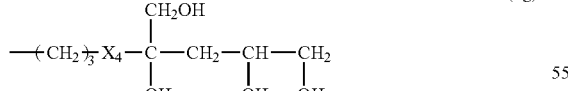
(3h)
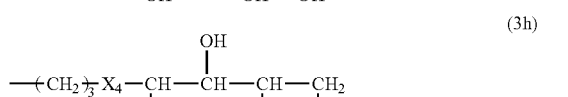
(3i)
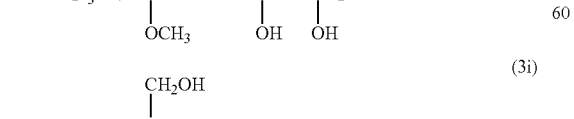
(3j)
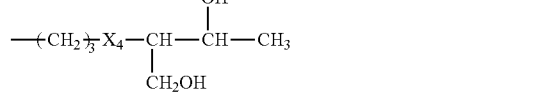
(3k)
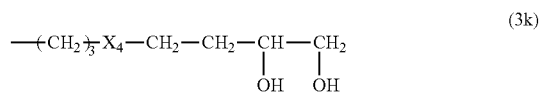
(3l)
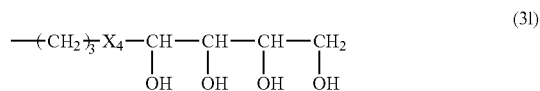
(3m)
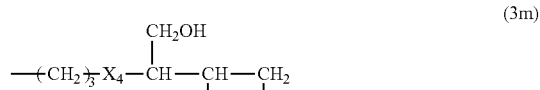
(3n)
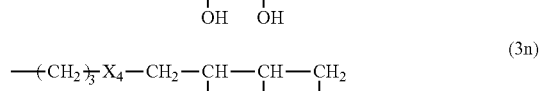
(3o)
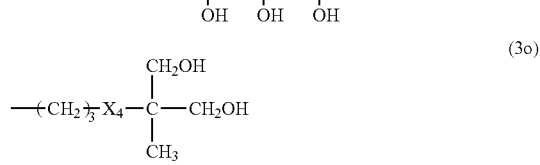
(3p)
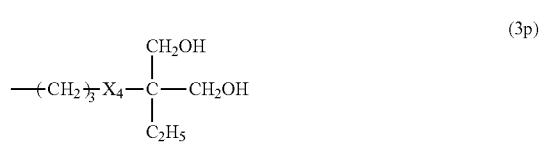
(3q)
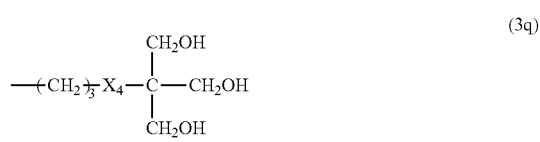
(3r)
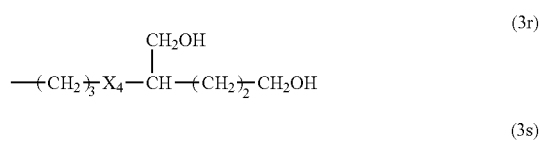
(3s)
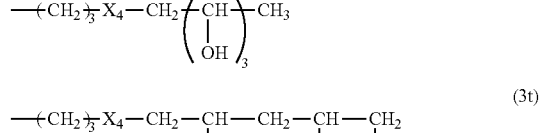
(3t)
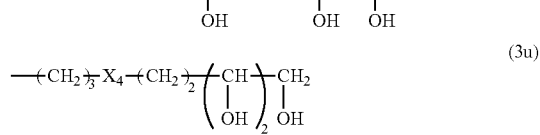
(3u)
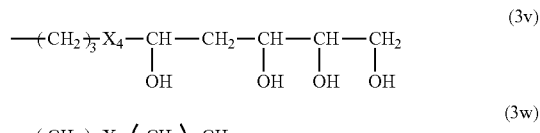
(3v)
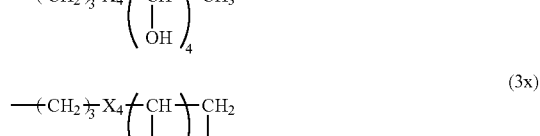
(3w)
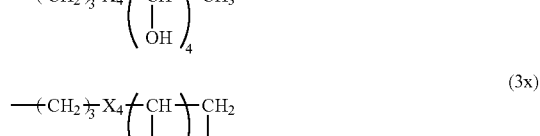
(3x)

-continued

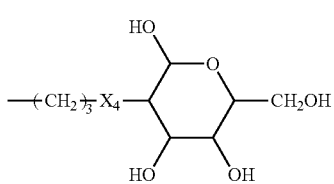
(3y)

in which $X_4$ is an amide linkage of

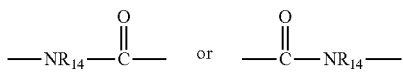

in which $R_{14}$ is hydrogen or $C_1$-$C_{10}$ alkyl.

71. The coated silicone hydrogel contact lens or the method of embodiment 68, wherein in formula (1), $R_4$ is a monovalent radical of formula (4a) or (4b)

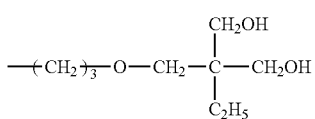
(4a)

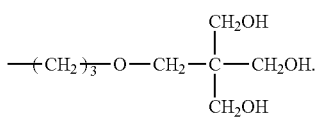
(4b)

72. The coated silicone hydrogel contact lens or the method of embodiment 68, wherein in formula (1), $R_4$ is a monovalent radical of any one of formula (5a) or (5c)

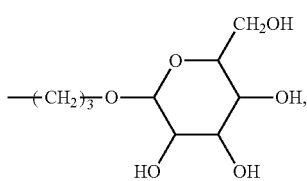
(5a)

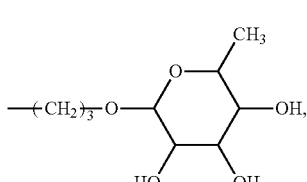
(5b)

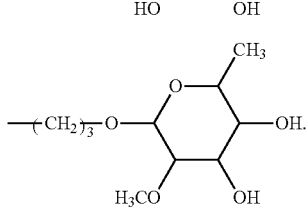
(5c)

73. The coated silicone hydrogel contact lens or the method of embodiment 68, wherein in formula (1), $R_4$ is a monovalent radical of formula (6) in which m1 is 3, p1 is 1, and $R_7$ is hydrogen.

74. The coated silicone hydrogel contact lens or the method of embodiment 68, wherein in formula (1), $R_4$ is a monovalent radical of formula (7) in which $L_{PC}$ is a divalent radical of —$C_3H_6$—O—$C_2H_4$—.

75. The coated silicone hydrogel contact lens of any one of embodiments 42 to 74, wherein the non-silicone hydrogel material is a crosslinked polymeric material which comprises at least 25% by mole (preferably at least 35% by mole, more preferably at least 45% by mole, even more preferably at least 55% by mole) of repeating monomeric units of at least one hydrophilic vinylic monomer selected from the group consisting of N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, N-2-dimethylaminoethyl (meth)acrylamide, dimethylaminoethyl (meth)acrylate, N-2-hydroxyethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, N-vinylpyrrolidone, N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone, N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam, N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a weight average molecular weight of up to 1500, methoxy-poly(ethylene glycol)ethyl (meth)acrylamide having a number average molecular weight of up to 1500, ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof.

76. The coated silicone hydrogel contact lens of any one of embodiments 42 to 74, wherein the non-silicone hydrogel material is a crosslinked polymeric material which comprises at least 25% by mole (preferably at least 35% by mole, more preferably at least 45% by mole, even more preferably at least 55% by mole) of repeating monomeric units of at least one hydrophilic vinylic monomer selected from the group consisting of (meth)acrylamide, dimethyl (meth)acrylamide, N-2-hydroxyethyl (meth)acrylamide, N,N-bis(hydroxyethyl) (meth)acrylamide, N-2,3-dihydroxypropyl (meth)acrylamide, N-tris(hydroxymethyl)methyl (meth) acrylamide, 2-hydroxyethyl (meth)acrylate, glycerol methacrylate (GMA), tetra(ethylene glycol) (meth)acrylate, poly(ethylene glycol)ethyl (meth)acrylamide having a number average molecular weight of up to 1500, poly(ethylene glycol) (meth)acrylate having a number average molecular weight of up to 1500, N-vinylpyrrolidone, N-vinyl-N-methyl acetamide, N-vinyl formamide, N-vinyl acetamide, 1-methyl-3-methylene-2-pyrrolidone, 1-methyl-5-methylene-2-pyrrolidone, 5-methyl-3-methylene-2-pyrrolidone, tetra(ethylene glycol) methyl ether (meth)acrylate, methoxypoly(ethylene glycol)ethyl (meth)acrylamide having a number average molecular weight of up to 1500, $C_1$-$C_4$-alkoxy polyethylene glycol (meth)acrylate having a weight average molecular weight of up to 1500, tetra(ethylene glycol) monovinyl ether, poly(ethylene glycol) monovinyl ether, tetra(ethylene glycol) methyl vinyl ether, poly(ethylene glycol) methyl vinyl ether, tetra(ethylene glycol) monoallyl ether, poly(ethylene glycol) monoallyl ether, tetra(ethylene glycol) methyl allyl ether, poly(ethylene glycol) methyl allyl ether, vinyl alcohol, allyl alcohol, and combinations thereof.

77. The coated silicone hydrogel contact lens of any one of embodiments 42 to 74, wherein the non-silicone hydrogel material is a crosslinked polymeric material which comprises at least 25% by mole (preferably at least 35% by mole, more preferably at least 45% by mole, even more preferably at least 55% by mole) of repeating monomeric units of at least one hydrophilic vinylic monomer selected from the group consisting of (meth)acrylamide, dimethyl (meth)acrylamide, N-2-hydroxyethyl (meth)acrylamide, N,N-bis(hydroxyethyl) (meth)acrylamide, N-2,3-dihydroxypropyl (meth)acrylamide, N-tris(hydroxymethyl)methyl (meth) acrylamide, 2-hydroxyethyl (meth)acrylate, glycerol methacrylate (GMA), poly(ethylene glycol)ethyl (meth)acrylamide having a number average molecular weight of up to 1500, poly(ethylene glycol) (meth)acrylate having a number average molecular weight of up to 1500, N-vinylpyrrolidone, N-vinyl-N-methyl acetamide, methoxypoly(ethylene glycol)ethyl (meth)acrylamide having a number average molecular weight of up to 1500, methoxy polyethylene glycol (meth)acrylate having a weight average molecular weight of up to 1500, poly(ethylene glycol) monovinyl ether, poly(ethylene glycol) methyl vinyl ether, poly(ethylene glycol) monoallyl ether, poly(ethylene glycol) methyl allyl ether, vinyl alcohol, allyl alcohol, and combinations thereof.

78. The coated silicone hydrogel contact lens of any one of embodiments 42 to 74, wherein the non-silicone hydrogel material is a crosslinked polymeric material which comprises at least 25% by mole (preferably at least 35% by mole, more preferably at least 45% by mole, even more preferably at least 55% by mole) of repeating monomeric units of at least one hydrophilic vinylic monomer selected from the group consisting of (meth)acrylamide, dimethyl (meth)acrylamide, N-2-hydroxyethyl (meth)acrylamide, N,N-bis(hydroxyethyl) (meth)acrylamide, N-2,3-dihydroxypropyl (meth)acrylamide, N-tris(hydroxymethyl)methyl (meth) acrylamide, poly(ethylene glycol)ethyl (meth)acrylamide having a number average molecular weight of up to 1500, poly(ethylene glycol) (meth)acrylate having a number average molecular weight of up to 1500, N-vinylpyrrolidone, N-vinyl-N-methyl acetamide, methoxypoly(ethylene glycol)ethyl (meth)acrylamide having a number average molecular weight of up to 1500, methoxy polyethylene glycol (meth)acrylate having a weight average molecular weight of up to 1500, and combinations thereof.

79. The coated silicone hydrogel contact lens of any one of embodiments 42 to 78, the non-silicone hydrogel material is a crosslinked polymeric material which comprises at least 25% by mole (preferably at least 35% by mole, more preferably at least 45% by mole, even more preferably at least 55% by mole) of repeating monomeric units of at least one phosphrylcholine-containing vinylic monomer.

80. The coated silicone hydrogel contact lens of embodiment 79, wherein said at least one phosphrylcholine-containing vinylic monomer is selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]-ethyl-2'-(trimethylammonio)ethylphosphate, 3-[(meth)acryloylamino]propyl-2'-(trimethylammonio)ethylphosphate, 4-[(meth)acryloylamino]butyl-2'-(trimethylammonio)-ethylphosphate, and combinations thereof.

81. The coated silicone hydrogel contact lens of any one of embodiments 42 to 80, wherein the non-silicone hydrogel material is a crosslinked polymeric material which comprises poly(ethylene glycol) chains.

82. The coated silicone hydrogel contact lens of embodiment 81, wherein the poly(ethylene glycol) chains each are derived directly from (a) a pol(ethylene glycol) having one sole functional group of —$NH_2$, —SH or —COOH, (b) a pol(ethylene glycol) having two terminal functional groups selected from the group consisting of —$NH_2$, —COOH, —SH, and combinations thereof, (c) a multi-arm poly(ethylene glycol) having one or more functional groups selected from the group consisting of —$NH_2$, —COOH, —SH, and combinations thereof, and (d) combinations thereof.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Oxygen Permeability Measurements

Unless specified, the oxygen transmissibility (Dk/t), the intrinsic (or edge-corrected) oxygen permeability ($Dk_i$ or $Dk_c$) of a lens and a lens material are determined according to procedures described in ISO 18369-4.

Water Break-Up Time (WBUT) Tests

The surface hydrophilicity of lenses (after autoclave) is assessed by determining the time required for the water film to start breaking on the lens surface according to the procedures described in Example 1 of U.S. Pat. Appl. Pub. No. 20210181379 A1.

Equilibrium Water Content

The equilibrium water content (EWC) of contact lenses are determined according to the procedures described in Example 1 of U.S. Pat. Appl. Pub. No. 20210181379 A1.

Elastic Modulus

The elastic modulus of a contact lens is determined according to the procedures described in Example 1 of U.S. Pat. Appl. Pub. No. 20210181379 A1.

Light Transmissibility

Contact lenses are manually placed into a specially fabricated sample holder or the like which can maintain the shape of the lens as it would be when placing onto eye. This holder is then submerged into a 1 cm path-length quartz cell containing phosphate buffered saline (PBS, pH ~7.0-7.4) as the reference. A UV/visible spectrpohotmeter, such as, Varian Cary 3E UV-Visible Spectrophotometer with a Lab-Sphere DRA-CA-302 beam splitter or the like, can be used in this measurement. Percent transmission spectra are collected at a wavelength range of 250-800 nm with % T values collected at 0.5 nm intervals. The light transmissibility of a contact lens is the average % transmission between 400 nm and 700 nm.

Water Contact Angle (WCA) Measurements. Water contact angle (WCA) measurements are performed by the sessile drop method with a DSA 10 drop shape analysis system from Krüss GmbH, Germany with pure water (Fluka, surface tension 72.5 mN/m at 20° C.). For measurement purposes a contact lens is taken off the storage solution with tweezers and excess storage solution is removed by gentle shaking. The contact lens are placed on the male part of a lens mold and gently blotted with a dry and clean cloth. A water droplet (approximately 1 µl) is then dosed on the lens apex, and the change of the contact angle over time of this water droplet (WCA(t), circle fitting mode) is monitored. The WCA is calculated by the extrapolation of the graph WCA(t) to t=0.

Determination of Lens Diameter of Hydrated Contact Lens

The lens diameters of hydrated contact lenses are determined according to the procedures described in Example 1 of U.S. Pat. Appl. Pub. No. 20210181379 A1.

Lubricity Evaluation.

The lubricity of a contact lens is evaluated by using a finger-felt lubricity test which characterizes qualitatively the slipperiness of a lens surface on a friction rating scale of from 0 to 4. The higher the friction rating is, the lower the slipperiness (or lubricity).

Commercial lenses: DAILIES® TOTAL1®; ACUVUE® OASYS™; ACUVUE® ADVANCE PLUS™; DAILIES® Aqua Comfort Plus®; and AIR OPTIX®, are assigned a friction rating (designated "FR" hereinafter) of 0, 1, 2, 3, and 4 respectively. They are used as standard lenses for determining the friction rating of a lens under test.

The samples are placed in PBS for at least two rinses of 30 minutes each and then transferred to fresh PBS before the evaluation. Before the evaluation, hands are rinsed with a soap solution, extensively rinsed with DI water and then dried with KimWipe® towels. The samples are handled between the fingers and a numerical number is assigned for each sample relative to the above standard lenses described above. For example, if lenses are determined to be only slightly better than AIR OPTIX® lenses, then they are assigned a number 3. The value of a friction rating is one obtained by averaging the results of at least two friction ratings of a contact lens by two or more persons and/or by averaging the friction ratings of two or more contact lenses (from the identical batch of lens production) by one person.

The finger lubricities (i.e., friction ratings) of a contact lens can be determined directly out-of-pack (OOP) but after ≥30 min soaking in PBS according to the procedures described above.

Chemicals

The following abbreviations are used in the following examples: HEMA represents hydroxyethyl methacrylate; EOEMA represents ethoxyethyl methacrylate; MAA represents methacrylic acid; AA represents acrylic acid; PEG-DA represents poly(ethylene glycol) diacrylate (Mn ~800 g/mol); PG represents propylene glycol; Vazo 52 represents 2,2'-azobis(2,4-dimethylvaleronitrile); Vazo 67 represents 2,2'-azodi(2-methylbutyronicnitrile); Perkadox 16 represents Di(4-tert-butylcyclohexyl) peroxydicarbonate; MPC represents 2-Methacryloyloxyethyl phosphorylcholine; EGMA represents 2-methoxyethyl methacrylate; AMA represents allyl methacrylate; TEGDMA represents tri(ethylene glycol) di-methacrylate; TEGDVE is tri(ethylene glycol) divinyl ether; Nobloc is 2-[3-(2H-Benzotriazol-2-yl)-5-hydroxyphenyl]ethyl methacrylate; RB247 is Reactive Blue 247; PBS represents a phosphate-buffered saline which has a pH of 7.2±0.2 at 25° C. and contains about 0.044 wt. % $NaH_2PO_4 \cdot H_2O$, about 0.388 wt. % $Na_2HPO_4 \cdot 2H_2O$, and about 0.79 wt. % NaCl and; wt. % represents weight percent; HO-PDMS-MA represents the reaction product of glycidyl methacrylate and

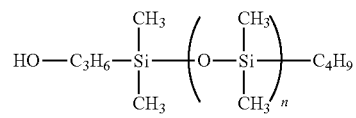

in which n=4-10; "G2" macromer represents a di-methacryloyloxypropyl-terminated polysiloxane (Mn ~8K g/mol, OH content ~3.5 meq/g) of formula (A).

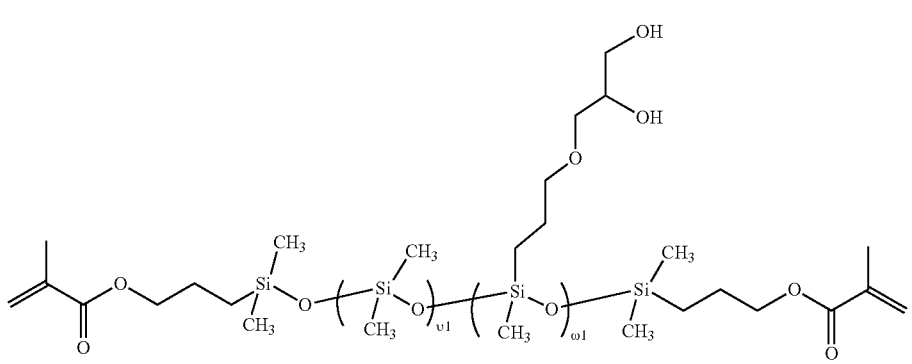

(A)

Example 2

Phosphate Buffered Saline (PBS)

A phosphate buffered saline is prepared by dissolving $NaH_2PO_4 \cdot H_2O$, $Na_2HPO_4 \cdot 2H_2O$, and NaCl in a given volume of purified water (distilled or deionized) to have the following composition: ca. 0.044 w/w % $NaH_2PO_4 \cdot H_2O$, ca. 0.388 w/w/% $Na_2HPO_4 \cdot 2H_2O$, and ca. 0.79 w/w % NaCl.

Preparations of Packaging Saline—Saline-1

Copolymer 845 is a copolymer of N-vinylpyrolidone and dimethylaminoethyl methacrylate ($M_w \sim 700{,}000\text{-}1{,}200{,}000$ g/mol by GPC relative to polyethylene oxide standards, $M_w/M_n \sim 5.7\text{-}8.5$) and is obtained from ISP.

A poly(ethylene glycol)-poly(butylene glycol) block copolymer of

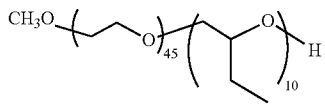

$(CH_3O(EO)_{45}(BO)_{10})$ is prepared according to the procedures described in U.S. Pat. No. 8,318,144.

The packaging saline is prepared by dissolving all the component in 1 L of water to having the following composition: 0.77% by weight of NaCl; 0.076% by weight of $NaH_2PO_4 \cdot H_2O$; 0.47% by weight of $Na_2HPO_4 \cdot 7H_2O$; 1.0% by weight of Copolymer-845; and 0.015% by weight of $CH_3O(EO)_{45}(BO)_{10}$.

Preparation of In-Package-Coating Saline—IPC-1

IPC saline (IPC-1) is prepared by mixing appropriate amount of Poly(AAm-co-AA) or other wetting agent with PAE in phosphate buffered saline and pre-treated at certain temperature for a desired time. Poly(AAm-co-AA)(90/10) partial sodium salt, poly(AAm-co-AA) 90/10, Mw 200,000) is purchased from Polysciences, Inc. and used as received. Kymene or PAE solutions of different solid contents is purchased from Solenis as an aqueous solution and used as received. 0.07% of PAAm-PAA and about 0.1% Kymene was mixed together in PBS and pre-treated at 60° C. for about 6 hours. After the heat pre-treatment, the IPC saline is filtered using a 0.22 micron membrane filter and cooled down back to room temperature. 5 ppm hydrogen peroxide maybe added to the final IPC saline to prevent bioburden growth and the IPC saline is filtered using a 0.22 micron membrane filter.

Preparation of Polymerizable Compositions

Polymerizable compositions (SiHy lens formulations) are prepared to have compositions as shown in Table 1.

TABLE 1

| | SiHy Lens Formulation No (Unit parts by weight) | | |
|---|---|---|---|
| Component | 2-1 | 2-2 | 2-3 |
| HEMA | 80 | 80 | 50 |
| G2 | 20 | 20 | 53 |
| Vazo 67 | 0.5 | 0.5 | 0.5 |
| MAA | 2 | 0 | 0 |
| PG | 10 | 10 | 10 |

The formulations are prepared by adding listed components in their targeted amounts into a clean bottle, with a stir bar to mix at 600 rpm for 30 minutes at room temperature. After all the solid is dissolved, a filtration of the formulation is carried out by using 2.7 μm glass-microfiber-filter (GMF).

Cast-Molded Silicone Hydrogel Contact Lenses

A lens formulation is purged with nitrogen at room temperature for 30 to 35 minutes. The $N_2$-purged lens formulation is introduced into polypropylene molds and thermally cured in an oven under nitrogen under the following curing conditions: ramp from room temperature to 55° C. at a ramp rate of about 7° C./minute; holding at 55° C. for about 30 minutes; ramp from 55° C. to 80° C. at a ramp rate of about 7° C./minute; holding at 80° C. for about 30 minutes; ramp from 80° C. to 100° C. at a ramp rate of about 7° C./minute; and holding at 100° C. for about 30 minutes. The molds are opened and the molded lenses are removed from the molds.

The lenses are then hydrated in a packaging saline for 30 minutes, inspected, and packaged in glass vial in the package saline for sterilization (autoclaved at 121° C. for 45 minutes). The lens properties are listed in Table 2.

TABLE 2

| | Lens properties | | |
|---|---|---|---|
| SiHy Lens Formulation | 2-1 | 2-2 | 2-3 |
| Clarity of dry lens* | White | White | White |
| Clarity of Finished lens (after autoclave) | Hazy (in IPC-1) | Clear (in Saline-1) | Clear (in PBS) |
| Finger lubricity (OOP) | 3 | 4 | 4 |

TABLE 2-continued

| | Lens properties | | |
|---|---|---|---|
| SiHy Lens Formulation | 2-1 | 2-2 | 2-3 |
| Dkc (barrer) | N/A | N/A | 80 |
| Equilibrium water Content (wt %) | N/A | N/A | 23 |
| Modulus (MPa) | N/A | N/A | 0.7 |

*Dry lens: SiHy lens precursor. OOP stands for out-of-package

Example 3

Preparations of Polyacrylic (PAA) Solution

A solution of polyacrylic acid (PAA) (Carbopol®907 polymer from Lubrizol, Mw 82k) is dissolved in propylene glycol to have a concentration of 5% by weight.

Preparations of Packaging Saline—Saline-2

Polyvinylpyrolidone (PVP) ($M_n$~360K from Sigma) is dissolved in PBS prepared in Example 2 to have a concentration of 1% by weight.

Preparation of Polymerizable Compositions

Polymerizable compositions (SiHy lens formulations) are prepared to have compositions as shown in Table 3.

TABLE 3

| | SiHy Lens Formulation No (Unit parts by weight) | |
|---|---|---|
| Component | 3-1 | 3-2 |
| HEMA | 50 | 50 |
| G2 | 50 | 50 |
| Vazo 67 | 0.5 | 0.5 |
| PG | 10 | 10 |
| 5% PAA (in PG) | 1 | 2 |

Cast-Molded Silicone Hydrogel Contact Lenses

SiHy lens precursors (dry lenses) are cast-molded according to the procedures described in Example 2. After dry demolding/delensing, the SiHy lens precursor are hydrated in Saline 2 for about 30 minutes, inspected, and packaged in glass vial in package saline for sterilization (autoclaved at 121° C. for 45 minutes). The lens properties are listed in Table 4.

TABLE 4

| | Lens Properties | |
|---|---|---|
| SiHy Lens Formulation | 3-1 | 3-2 |
| Clarity of Dry Lens | White | White |
| Clarity of Finished lens | Slightly hazy (in Saline-2) | Hazy (in Saline-2) |
| WBUT (sec, OOP) | >20 | >20 |
| Finger lubricity (OOP) | 1-2 | 1-2 |
| Finger lubricity (rinsed in PBS) | 2-3 | 2-3 |
| Dkc (barrer) | 70 | N/A |
| Equilibrium Water Content (wt %) | 28 | N/A |
| Modulus (MPa) | 0.75 | N/A |
| Water Contact Angle (degree) | 45 | N/A |

Example 4

Preparation of Polymerizable Compositions

Polymerizable compositions (SiHy lens formulations) are prepared to have compositions as shown in Table 5.

TABLE 5

| | SiHy Lens Formulation No (unit parts by weight) | | |
|---|---|---|---|
| Component | 4-1 | 4-2 | 4-3 |
| EOEMA | 50 | 50 | 50 |
| G2 | 50 | 50 | 50 |
| Vazo 67 | 0.5 | 0.5 | 0.5 |
| MAA | 4 | 6 | 8 |
| PG | 10 | 10 | 10 |

Cast-Molded Silicone Hydrogel Contact Lenses

SiHy lens precursors (dry lenses) are cast-molded according to the procedures described in Example 2. After dry demolding/delensing, the SiHy lens precursor are placed, inspected, and packaged in glass vial in IPC-1 prepared in Example 2 for sterilization (autoclaved at 121° C. for 45 minutes). The lens properties are listed in Table 6.

TABLE 6

| SiHy Lens Formulation | Lens Properties | | |
|---|---|---|---|
| | 4-1 | 4-2 | 4-3 |
| Clarity of Dry lens | Clear | Clear | Clear |
| Clarity of Finished lens | Clear (in IPC-1) | Clear (in IPC-1) | Clear, but lens out of round (in IPC-1) |
| WBUT (sec, OOP) | 1-2 | ~10 | ~10 |
| Finger lubricity (OOP) | 3-4 | 2-3 | 2 |
| Finger lubricity (rinsed in PBS) | 3-4 | 2-3 | 2 |
| Dkc (barrer) | N/A | 65 | N/A |
| Equilibrium Water Content (wt %) | N/A | 43 | N/A |
| Modulus (MPa) | N/A | 1.0 | N/A |

Example 5

Preparation of Polymerizable Compositions

Polymerizable compositions (SiHy lens formulations) are prepared to have compositions as shown in Table 7.

TABLE 7

| | SiHy Lens Formulation No (part units by weight) | | |
|---|---|---|---|
| Component | 5-1 | 5-2 | 5-3 |
| EOEMA | 50 | 50 | 50 |
| HEMA | 5 | 7.5 | 10 |
| G2 | 50 | 50 | 50 |
| Vazo 67 | 0.5 | 0.5 | 0.5 |
| MAA | 6 | 6 | 6 |
| PG | 10 | 10 | 10 |

Cast-Molded Silicone Hydrogel Contact Lenses

SiHy lens precursors (dry lenses) are cast-molded according to the procedures described in Example 2. After dry demolding/delensing, the SiHy lens precursor are placed, inspected, and packaged in glass vial in PC-1 prepared in Example 2 for sterilization (autoclaved at 121° C. for 45 minutes). The lens properties are listed in Table 8.

TABLE 8

| SiHy | Lens Properties | | |
|---|---|---|---|
| Lens Formulation | 5-1 | 5-2 | 5-3 |
| Dry lens clarity | Clear | Clear | Translucent |
| Finished lens clarity | Clear (in IPC-1) | Clear (in IPC-1) | Slightly hazy (in IPC-1) |
| WBUT (sec, OOP) | >20 | >30 | >40 |
| Finger lubricity (OOP) | 2-3 | 2-3 | 2-3 |
| Finger lubricity (soaked in PBS overnight) | 3 | 3 | 3-4 |
| Dkc (barrer) | 56 | 55 | 56 |
| Equilibrium Water Content (wt %) | N/A | N/A | N/A |
| Modulus (MPa) | 1.08 | 0.95 | 0.87 |

Example 6

Preparation of Polymerizable Compositions

Polymerizable compositions (SiHy lens formulations) are prepared to have compositions as shown in Table 9.

TABLE 9

| | SiHy Lens Formulation (unit parts by weight) | |
|---|---|---|
| Component | 6-1 | 6-2 |
| HEMA | 10 | 8 |
| EOEMA | 40 | 45 |
| G2 | 50 | 45 |
| PEGDA | 0.1 | 0.1 |
| Vazo 67 | 0.5 | 0.5 |
| PG | 20 | 20 |
| MAA | 6 | 6 |
| Norbloc | 1.5 | 1.5 |
| RB247 | 0.01 | 0.01 |

Cast-Molded Silicone Hydrogel Contact Lenses

SiHy lens precursors (dry lenses) are cast-molded according to the procedures described in Example 2. After dry demolding/delensing, the SiHy lens precursor (dry lenses) are packaged in 0.85 mL of IPC-1 prepared in Example 2 individually in dew drop blister shells, followed by sterilization (autoclaved at 121° C. for 45 minutes). The lens properties are listed in Table 10.

TABLE 10

| | Lens Properties | |
|---|---|---|
| SiHy Lens Formulation | 6-1 | 6-2 |
| Clarity of Dry lens | Clear | Clear |
| Clarity of Finished lens | Clear (in IPC-1) | Clear (in IPC-1) |
| WBUT (sec, OOP) | >30 | >30 |
| Finger lubricity (OOP) | 2-3 | 2-3 |
| Finger lubricity (soaked in PBS overnight) | 3 | 3 |
| Dkc (barrer) | 76 | N/A |
| Equilibrium Water Content (wt %) | N/A | N/A |
| Modulus (MPa) | 0.68 | N/A |

The lens diameter data, both out-of-pack and soaked in PBS for certain durations, are measured according to the procedures described in Example 1. As shown in Table 11, the lens diameters, for both types of lenses, increase over time during PBS soaking.

TABLE 11

| | Lens diameter (by Optimec) | |
|---|---|---|
| Lens formulation | 6-1 | 6-2 |
| Out-of-pack | 13.9 mm | 13.5 mm |
| in PBS for 4 hours | 14.3 mm | 13.9 mm |
| in PBS overnight | 15.0 mm | 14.7 mm |

It is believed that, for this diameter increase, that the package saline (0.85 mL of IPC-1) may not have pH high enough and or a buffer capacity enough to neutralize the carboxylic acid groups (i.e., methacrylic acid) in the bulk SiHy material. Therefore, when the SiHy lens precursors are placed in PBS, the phosphates (i.e. more buffer) in PBS could keep deprotonating the carboxylic acids and swell the lens.

To support this hypothesis, the buffer capacity of the IPC-1 is calculated to have [$Na_2HPO_4 \cdot 2H_2O$]=21.8 mM; [$NaH_2PO_4 \cdot H_2O$]=3.2 mM. The concentrations of carboxyl groups (from MAA or AA) are calculated by assuming that 1) dry lens weight is 20 mg and 2) the package saline volume is 0.85 mL to be 16.4 mM and 19.6 mM respectively. Based on those calculations, it is obvious that the buffer capacity (especially the dibasic phosphate that is to neutralize the carboxylic acid) is too close to the acid concentration to neutralize all or most of the acid groups.

Example 7

Phosphate Buffer (PB)

An aqueous solution, phosphate buffer (PB), is prepared by dissolving $NaH_2PO_4 \cdot H_2O$, $Na_2HPO_4 \cdot 2H_2O$ in a given volume of purified water (distilled or deionized) to have the following composition: ca. 1.164 w/w % $Na_2HPO_4 \cdot 2H_2O$, ca. 0.044 w/w/% $NaH_2PO_4 \cdot H_2O$.

Preparation of In-Package-Coating Saline—IPC-2

IPC saline (IPC-2) is prepared by blending IPC-1 prepared in Example 2 and PB prepared above at 1:1 weight ratio. The composition of IPC-2 is: ~0.05% by weight of PAE; 0.035% by weigh of Poly(AAm-co-AA)(90/10), 0.776% by weight of $Na_2HPO_4 \cdot 2H_2O$, 0.044% by weight of $NaH_2PO_4 \cdot H_2O$, and 0.395% by weight of NaCl. Compared to IPC-1, IPC-2 has doubled the concentration of $Na_2HPO_4 \cdot 2H_2O$, whereas PAE, poly(AAm-co-AA) and NaCl concentrations in IPC-2 are reduced by half.

Preparation of Polymerizable Compositions

Polymerizable compositions (SiHy lens formulations) are prepared to have compositions as shown in Table 12.

TABLE 12

| | SiHy lens formulation (Unit parts by weight) | | |
|---|---|---|---|
| Component | 7-1 | 7-2 | 7-3 |
| HEMA | 10 | 10 | 8 |
| EOEMA | 40 | 40 | 45 |
| G2 | 50 | 50 | 45 |
| PEGDA | 0.1 | 0.1 | 0.1 |
| Vazo 67 | 0.5 | 0.5 | 0.5 |
| PG | 20 | 20 | 20 |
| Acid monomer | 6 (AA) | 4 (AA) | 6 (MAA) |
| Norbloc | 1.5 | 1.5 | 1.5 |
| RB247 | 0.01 | 0.01 | 0.01 |

Cast-Molded Silicone Hydrogel Contact Lenses

SiHy lens precursors (dry lenses) are cast-molded according to the procedures described in Example 2. After dry demolding/delensing, the SiHy lens precursor (dry lenses) are packaged in 0.85 mL of IPC-1 prepared in Example 2 individually in dew drop blister shells, followed by sterilization (autoclaved at 121° C. for 45 minutes).

The lens properties are compiled in Tables 13 and 14. It is clear that, after replacing PC-D with kP-2 (having a higher dibasic phosphate concentration and higher pH), the lens diameter become much more stable when soaked in PBS, and the finger lubricity also seems to be improved. These property improvements are achieved despite that IPC-2 only contains half of PAE/Poly(AAm-co-AA) concentration compared to IPC-1.

TABLE 13

| SiHy Lens Formulation | Lens Property | | |
|---|---|---|---|
| | 7-1 | 7-2 | 7-3 |
| Clarity of Dry lens | Clear | Clear | Clear |
| Clarity of Finished lens | Clear (in IPC-1) | Clear (in IPC-1) | Clear (in IPC-1) |
| WBUT (sec, OOP) | >30 | >30 | >30 |
| Finger lubricity (OOP) | 1 | 1 | 1 |
| Finger lubricity (soaked in PBS overnight) | 2~3 | 3 | 2~3 |
| Dkc (barrer) | N/A | N/A | N/A |
| Equilibrium Water content (wt %) | N/A | N/A | N/A |
| Modulus (MPa) | N/A | N/A | 0.82 |

TABLE 14

| SiHy Lens formulation | Lens Evaluation | | | | | |
|---|---|---|---|---|---|---|
| | 7-1 | | 7-2 | | 7-3 | |
| Package saline | IPC-1 | IPC-2 | IPC-1 | IPC-2 | IPC-1 | IPC-2 |
| Lens diameter (mm) (OOP) | 14.6 | 15.7 | 13.9 | 14.6 | 13.6 | N/A |
| Lens diameter (in PBS for 4 hrs) | 15.7 | 15.8 | 14.5 | 14.7 | 14.3 | 14.7 |
| Lens diameter (in PBS for 3 days) | 15.7 | 15.8 | 14.5 | 14.5 | 14.4 | 14.7 |
| Finger lubricity | 2-3 | 2 | 3 | 2 | 2-3 | 2 |

Example 8

Preparation of In-Package-Coating Saline—IPC-3

IPC saline (IPC-3) is prepared by blending IPC-2 prepared in Example 7, PB prepared in Example 7, and propylene glycol (PG) at 50:50:1 weight ratio. The composition of IPC-3 is: ~0.05% by weight of PAE; 0.035% by weigh of Poly(AAm-co-AA)(90/10), 0.768% by weight of $Na_2HPO_4 \cdot 2H_2O$, 0.044% by weight of $NaH_2PO_4 \cdot H_2O$, 0.196% by weight of NaCl; and 0.99% by weight of PG.

Preparation of Polymerizable Compositions

Polymerizable compositions (SiHy lens formulations) are prepared to have compositions as shown in Table 15.

TABLE 15

| Component | Lens Formulation (unit parts by weight) | | | |
|---|---|---|---|---|
| | 8-1 | 8-2 | 8-3 | 8-4 |
| HEMA | 10 | 10 | 8 | 8 |
| EOEMA | 40 | 40 | 45 | 45 |
| G2 | 50 | 50 | 45 | 45 |
| PEGDA | 0.1 | 0.1 | 0.1 | 0.1 |
| Vazo 67 | 0.5 | 0.5 | 0.5 | 0.5 |
| PG | 20 | 20 | 20 | 20 |
| AA | 4 | 3 | 4 | 3 |
| Norbloc | 1.5 | 1.5 | 1.5 | 1.5 |
| RB247 | 0.01 | 0.01 | 0.01 | 0.01 |

Cast-Molded Silicone Hydrogel Contact Lenses

SiHy lens precursors (dry lenses) are cast-molded according to the procedures described in Example 2. After dry demolding/delensing, the SiHy lens precursor (dry lenses) are packaged in 0.85 mL of IPC-2 prepared in Example 7 or IPC-3 prepared above individually in dew drop blister shells, followed by sterilization (autoclaved at 121° C. for 45 minutes).

The lens properties (lens diameter and finger lubricity) are compiled in Table 16. As shown in the table, lens diameters are stable in PBS. Compared to IPC-2, IPC-3 can give even better finger lubricity, likely due to its lower NaCl concentration that further could strengthen the carboxylate-IPC charge complexation and their subsequent reactions during autoclave.

TABLE 16

| Lens formulation | Lens evaluation | | | | | | | |
|---|---|---|---|---|---|---|---|---|
| | 8-1 | | 8-2 | | 8-3 | | 8-4 | |
| Package saline | IPC-3 | IPC-2 | IPC-3 | IPC-2 | IPC-3 | IPC-2 | IPC-3 | IPC-2 |
| Lens diameter (OOP) | 14.4 | 14.4 | 13.8 | 13.7 | 14.1 | 14.1 | 13.5 | 13.5 |
| Lens diameter (in PBS for 1 day) | 14.4 | 14.5 | 13.8 | 13.8 | 14.2 | 14.3 | 13.5 | 13.5 |
| Finger lubricity | 1 | 2-3 | 2-3 | 3 | 1 | 2 | 2 | 3 |

Example 9

Preparation of In-Package-Coating Saline—IPC-4

The saline IPC-4 is prepared based below composition —~0.05% by weight of PAE; 0.035% by weigh of Poly(AAm-co-AA)(90/10), 0.776% by weight of $Na_2HPO_4 \cdot 2H_2O$, 0.044% by weight of $NaH_2PO_4 \cdot H_2O$, 0.198% by weight of NaCl; and 0.0005% by weight of Hydrogen peroxide and 1% of glycerol.

Preparation of Polymerizable Compositions

Polymerizable compositions (SiHy lens formulations) are prepared to have compositions as shown in Table 17.

TABLE 17

| Component | SiHy lens formulation (Unit part by weight) | | |
|---|---|---|---|
| | 9-1 | 9-2 | 9-3 |
| HEMA | 8 | 8 | 8 |
| EOEMA | 45 | 45 | 45 |
| G2 | 45 | 45 | 45 |
| PEGDA | 0.1 | 0.1 | 0.1 |
| Vazo 67 | 0.5 | 0.5 | 0.5 |

TABLE 17-continued

| | SiHy lens formulation (Unit part by weight) | | |
|---|---|---|---|
| Component | 9-1 | 9-2 | 9-3 |
| PG | 20 | 20 | 20 |
| AA | 4 | 5 | 6 |
| Norbloc | 1.5 | 1.5 | 1.5 |
| RB247 | 0.01 | 0.01 | 0.01 |

Cast-Molded Silicone Hydrogel Contact Lenses

SiHy lens precursors (dry lenses) are cast-molded according to the procedures described in Example 2. After dry demolding/delensing, the SiHy lens precursor (dry lenses) are packaged in 0.85 mL of IPC-2 prepared in Example 7 or IPC-4 prepared above individually in dew drop blister shells, followed by sterilization (autoclaved at 121° C. for 45 minutes).

The lens properties are compiled in Table 18 &19. As shown in the tables, lens diameters are slightly shift in PBS. It could be due to glycerol diffusion effect.

TABLE 18

| | Lens Property | | |
|---|---|---|---|
| SiHy Lens Formulation | 9-1 | 9-2 | 9-3 |
| Dry lens clarity | Clear | Clear | Clear |
| Finished lens clarity | Clear (in IPC-4) | Clear (in IPC-4) | Clear (in IPC-4) |
| WBUT (sec, OOP) | >30 | >30 | >30 |
| Finger lubricity (OOP) | 1 | 1 | 1 |
| Finger lubricity (soaked in PBS overnight) | 1-2 | 1~2 | 1~2 |
| Dkc (barrer) | 61 | N/A | N/A |
| Water content (wt %) | 45.7 | N/A | N/A |
| Modulus (MPa) | 0.66 | N/A | N/A |
| Ion Permeability (in IPC-4, 1 × AC) | 0.2 | 12.4 | 18.5 |

TABLE 19

| | Lens evaluation | | |
|---|---|---|---|
| Lens Formulation | 9-1 | 9-2 | 9-3 |
| Package saline | IPC-4 | IPC-4 | IPC-4 |
| Lens diameter (OOP) | 14.4 | 15.4 | 16.1 |
| Lens diameter (in PBS for 1 day) | 14.5 | 15.5 | 16.1 |
| Finger lubricity | 1~2 | 1~2 | 1~2 |

Example 10

Preparation of In-Package-Coating Saline—IPC-4

IPC saline (IPC-4) preparation is the same as Example 9.

Preparation of Polymerizable Compositions

Polymerizable compositions (SiHy lens formulations) are prepared to have compositions as shown in Table 20.

TABLE 20

| | SiHy lens formulation (unit part by weight) | | | | | |
|---|---|---|---|---|---|---|
| Component | 10-1 | 10-2 | 10-3 | 10-4 | 10-5 | 10-6 |
| HEMA | 8 | 8 | 8 | 5 | 2 | 2 |
| EOEMA | 45 | 45 | 45 | 45 | 45 | 45 |
| G2 | 45 | 45 | 45 | 45 | 45 | 45 |
| PEGDA | 0.1 | 0 | 0 | 0 | 0 | 0 |
| TEGDMA | 0.15 | 0.1 | 0.3 | 0.2 | 0.3 | 0.1 |
| Vazo 67 | 0.5 | 0.5 | 0.5 | 0.5 | 0.5 | 0.5 |
| PG | 20 | 20 | 20 | 20 | 20 | 20 |
| AA | 4.8 | 4.5 | 5.5 | 5 | 4.5 | 5.5 |

Cast-Molded Silicone Hydrogel Contact Lenses

SiHy lens precursors (dry lenses) are cast-molded according to the procedures described in Example 2. After dry demolding/delensing, the SiHy lens precursor (dry lenses) are packaged in 0.85 mL of IPC-2 prepared in Example 7 or IPC-4 prepared above individually in dew drop blister shells, followed by sterilization (autoclaved at 121° C. for 45 minutes).

The lens properties are compiled in Table 21 and 22. As shown in the table, lens diameters are still slight shift in PBS. It indicated that there is other factors like AA vs HEMA ratio. 10-5 composition resulted in <1 IP value. It means lens nextwork formed doesn't allow ion penetration in aqueous medium.

TABLE 21

| SiHy Lens Formulation | Lens Property | | | | | |
|---|---|---|---|---|---|---|
| | 10-1 | 10-2 | 10-3 | 10-4 | 10-5 | 10-6 |
| Dry lens clarity | 0 | 0 | 0 | 0 | 0 | 0 |
| Finished lens clarity | 3 | 3 | 4 | 0-1 | 0-1 | 0 |
| WBUT (sec, OOP) | >30 | >40 | >40 | >30 | >30 | >30 |
| Finger lubricity (OOP) | 1 | 1 | 1 | 1 | 1 | 1 |
| Finger lubricity (soaked in PBS overnight) | 1 | 1 | 1 | 1 | 1 | 1 |
| Dkc (barrer) | 59 | N/A | N/A | N/A | N/A | N/A |
| Water content (wt %) | N/A | N/A | N/A | N/A | N/A | N/A |
| Modulus (MPa) | 0.66 | 0.63 | 0.63 | 0.66 | 0.70 | 0.64 |
| Ion Permeability (in IPC-4, 1xAC) | 8.4 | 1.9 | 14.6 | 5.7 | 0.2 | 9.0 |

TABLE 22

| Lens formulation | Lens evaluation | | | | | |
|---|---|---|---|---|---|---|
|  | 10-1 | 10-2 | 10-3 | 10-4 | 10-5 | 10-6 |
| Package saline | IPC-4 | IPC-4 | IPC-4 | IPC-4 | IPC-4 | IPC-4 |
| Lens diameter (OOP) | 13.9 | 14.3 | 14.7 | 14.1 | 13.3 | 14.1 |
| Lens diameter (in PBS for 1 day) | 14.4 | 14.5 | 14.9 | 14.5 | 13.6 | 14.6 |
| Finger lubricity | 1 | 1 | 1 | 1 | 1 | 1 |

Example 11

Preparation of In-Package-Coating Saline—IPC-5

The saline IPC-5 is prepared based below composition —~0.05% by weight of PAE; 0.035% by weigh of Poly (AAm-co-AA)(90/10), 0.776% by weight of $Na_2HPO_4 \cdot 2H_2O$, 0.044% by weight of $NaH_2PO_4 \cdot H_2O$, 0.160% by weight of NaCl; and QS to 100% by water.

Preparation of Polymerizable Compositions

Polymerizable compositions (SiHy lens formulations) are prepared to have compositions as shown in Table 23.

TABLE 23

|  | SiHy lens formulation (unit part by weight) | | |
|---|---|---|---|
| Component | 11-1 | 11-2 | 11-3 |
| HEMA | 5 | 5 | 5 |
| EOEMA | 45 | 45 | 45 |
| G2 | 45 | 45 | 45 |
| TEGDMA | 0.2 | 0.2 | 0.2 |
| Vazo 67 | 0.5 | 0.5 | 0.5 |
| PG | 20 | 20 | 20 |
| AA | 4.2 | 4.4 | 4.6 |
| Norbloc | 1.5 | 1.5 | 1.5 |
| RB247 | 0.01 | 0.01 | 0.01 |

Cast-Molded Silicone Hydrogel Contact Lenses

SiHy lens precursors (dry lenses) are cast-molded according to the procedures described in Example 2. After dry demolding/delensing, the SiHy lens precursor (dry lenses) are packaged in 0.85 mL of prepared IPC-5 prepared above individually in dew drop blister shells, followed by sterilization (autoclaved at 121° C. for 45 minutes).

The lens properties are compiled in Table 24 and 25.

TABLE 24

|  | Lens Property | | |
|---|---|---|---|
| SiHy Lens Formulation | 11-1 | 11-2 | 11-3 |
| Dry lens clarity | Clear | Clear | Clear |
| Finished lens clarity | Clear (in IPC-5) | Clear (in IPC-5) | Clear (in IPC-) |
| WBUT (sec, OOP) | >30 | >30 | >30 |
| Finger lubricity (OOP) | 1 | 1 | 1 |
| Finger lubricity (soaked in PBS overnight) | 1 | 2-3 | 1 |
| Dkc (barrer) | N/A | N/A | N/A |
| Water content (wt %) | 46.8 | N/A | N/A |
| Modulus (MPa) | N/A | N/A | N/A |
| Ion Permeability | 0.3 | 0.7 | 0.5 |

TABLE 25

|  | Lens evaluation | | |
|---|---|---|---|
| Lens formulation | 11-1 | 11-2 | 11-3 |
| Package saline | IPC-5 | IPC-5 | IPC-5 |
| Lens diameter (OOP) | 13.7 | 13.9 | 13.9 |
| Lens diameter (in PBS for 1 day) | 14.4 | 14.5 | 14.1 |
| Finger lubricity | 1 | 2 | 1 |

Example 12

Preparation of In-Package-Coating Saline—IPC-5

IPC saline (IPC-5) preparation is the same as Example 11.

Preparation of Polymerizable Compositions

Polymerizable compositions (SiHy lens formulations) are prepared to have compositions as shown in Table 26.

TABLE 26

|  | SiHy lens formulation (unit part by weight) | | | | | |
|---|---|---|---|---|---|---|
| Component | 12-1 | 12-2 | 12-3 | 12-4 | 12-5 | 12-6 |
| HEMA | 4 | 2 | 4 | 2 | 4 | 2 |
| EOEMA | 45 | 45 | 45 | 45 | 45 | 45 |
| G2 | 45 | 45 | 45 | 45 | 45 | 45 |
| PEG diacrylate | 0.1 | 0 | 0.1 | 0 | 0.1 | 0 |
| TEGDMA | 0.2 | 0.2 | 0.3 | 0.3 | 0.3 | 0.3 |
| Vazo 67 | 0.5 | 0.5 | 0.5 | 0.5 | 0.5 | 0.5 |
| PG | 20 | 20 | 20 | 20 | 20 | 20 |
| AA | 4.8 | 5.5 | 4.8 | 5.5 | 5.0 | 5.5 |
| Norbloc | 1.5 | 1.5 | 1.5 | 1.5 | 1.5 | 1.5 |
| MPC | 0 | 0 | 0 | 0 | 0 | 2 |
| RB247 | 0.01 | 0.01 | 0.01 | 0.01 | 0.01 | 0.01 |

Cast-Molded Silicone Hydrogel Contact Lenses

SiHy lens precursors (dry lenses) are cast-molded according to the procedures described in Example 2. After dry demolding/delensing, the SiHy lens precursor (dry lenses) are packaged in 0.85 mL of IPC-5 prepared in Example 11 in dew drop blister shells, followed by sterilization (autoclaved at 121° C. for 45 minutes).

TABLE 27

| SiHy Lens Formulation | Lens Property | | | | | |
|---|---|---|---|---|---|---|
|  | 12-1 | 12-2 | 12-3 | 12-4 | 12-5 | 12-6 |
| Ion Permeability (IPC-5, 1xAC) | 0.3 | 0.5 | 0.1 | 1.5 | 1.8 | 10.7 |

The lens properties are compiled in Table 27 and 28. As shown in the tables, MPC in formulation plays a big role in lens IP improvement.

TABLE 28

| Lens formalation | Lens evaluation | | | | | |
|---|---|---|---|---|---|---|
|  | 12-1 | 12-2 | 12-3 | 12-4 | 12-5 | 12-6 |
| Lens diameter (OOP) | N/A | N/A | N/A | 14.0 | 13.9 | N/A |
| Lens diameter (in PBS for 1 day) | N/A | N/A | N/A | 14.3 | 14.1 | N/A |

Example 13

Preparation of In-Package-Coating Saline—IPC-5
  IPC saline (IPC-5) preparation is the same as Example 11.
Preparation of Polymerizable Compositions
  Polymerizable compositions (SiHy lens formulations) are prepared to have compositions as shown in Table 29.

TABLE 29

| Component | SiHy lens formulation (unit part by weight) | | | | | | | | | |
|---|---|---|---|---|---|---|---|---|---|---|
| | 13-1 | 13-2 | 13-3 | 13-4 | 13-5 | 13-6 | 13-7 | 13-8 | 13-9 | 13-10 |
| HEMA | 8 | 5 | 2 | 2 | 8 | 2 | 4 | 2 | 4 | 2 |
| EOEMA | 45 | 45 | 45 | 45 | 45 | 45 | 45 | 45 | 45 | 45 |
| G2 | 45 | 45 | 45 | 45 | 45 | 45 | 45 | 45 | 45 | 45 |
| TEGDMA | 0.1 | 0.2 | 0.3 | 0.1 | 0.3 | 0.3 | 0.3 | 0.3 | 0.3 | 0.3 |
| Vazo 67 | 0.5 | 0.5 | 0.5 | 0.5 | 0.5 | 0.5 | 0.5 | 0.5 | 0.5 | 0.5 |
| PG | 20 | 20 | 20 | 20 | 20 | 20 | 20 | 20 | 20 | 10 |
| AA | 4.8 | 5.5 | 4.8 | 5.5 | 5.0 | 4.5 | 4 | 4 | 4.5 | 4.5 |
| Norbloc | 1.5 | 1.5 | 1.5 | 1.5 | 1.5 | 1.5 | 1.5 | 1.5 | 1.5 | 1.5 |
| MPC | 0 | 0 | 0 | 0 | 0 | 1 | 2 | 4 | 2 | 4 |
| RB247 | 0.01 | 0.01 | 0.01 | 0.01 | 0.01 | 0.01 | 0.01 | 0.01 | 0.01 | 0.01 |

Cast-Molded Silicone Hydrogel Contact Lenses
  SiHy lens precursors (dry lenses) are cast-molded according to the procedures described in Example 2. After dry demolding/delensing, the SiHy lens precursor (dry lenses) are packaged individually in 0.85 mL of IPC-5 saline prepared above in dew drop blister shells, followed by sterilization (autoclaved at 121° C. for 45 minutes).

TABLE 30

| SiHy Lens | Lens Property | | | | | | | | | |
|---|---|---|---|---|---|---|---|---|---|---|
| Formulation | 13-1 | 13-2 | 13-3 | 13-4 | 13-5 | 13-6 | 13-7 | 13-8 | 13-9 | 13-10 |
| Dry lens clarity | clear | clear | clear | clear | clear | clear | clear | clear | clear | clear |
| Finished lens clarity | clear | clear | slight haze | clear | haze | clear | clear | clear | clear | NA |
| WBUT (sec, OOP) | >30 | >30 | >30 | >30 | >30 | >30 | >30 | >30 | >30 | NA |
| Finger lubricity (OOP) | 1 | 1-2 | 2 | 1 | 1-2 | 0-1 | 0-1 | 0-1 | 0-1 | NA |
| Finger lubricity (soaked in PBS overnight) | 1 | 1-2 | 2 | 1 | 1-2 | NA | NA | NA | NA | NA |
| Dkc (barrer) | NA | NA | NA | NA | NA | NA | NA | 64 | 64 | NA |
| Modulus | NA | NA | 0.70 | NA | NA | NA | NA | 0.72 | 0.69 | NA |
| Lens clarity | clear | Clear/specks | Hazy/specks | clear | Hazy/specks | NA | NA | NA | NA | NA |
| IP (IPC-5, 1x AC) | 0.3 | 0.1 | 0.0 | 0.1 | 0.0 | 0.8 | 0.3 | 1.7 | 4.8 | NA |

The lens properties are compiled in Table 30 and 31. It demonstrated that MPC vs HEMA ratio is another factor on lens IP.

TABLE 31

| Lens formulation | Lens evaluation | | | | | | | | | |
|---|---|---|---|---|---|---|---|---|---|---|
| | 13-1 | 13-2 | 13-3 | 13-4 | 13-5 | 13-6 | 13-7 | 13-8 | 13-9 | 13-10 |
| Package saline | IPC-4 | IPC-4 | IPC-4 | IPC-4 | IPC-4 | IPC-4 | IPC-4 | IPC-4 | IPC-4 | IPC-4 |
| Lens diameter (OOP) | 13.7 | 13.2 | 13.3 | 13.3 | 12.8 | 14.0 | 13.9 | 14.1 | 14.0 | NA |
| Finger lubricity | 1 | 1-2 | 2 | 1 | 1-2 | 0-1 | 0-1 | 0-1 | 0-1 | NA |

Example 15

Preparation of In-Package-Coating Saline—IPC-5

IPC saline (IPC-5) preparation is the same as Example 11.

Preparation of Polymerizable Compositions

Polymerizable compositions (SiHy lens formulations) are prepared to have compositions as shown in Table 32.

TABLE 32

| Component | SiHy lens formulation (unit part by weight) | | | | |
|---|---|---|---|---|---|
| | 14-1 | 14-2 | 14-3 | 14-4 | 14-5 |
| HEMA | 2 | 4 | 3 | 3 | 2 |
| EOEMA | 45 | 45 | 45 | 45 | 45 |
| G2 | 40 | 40 | 40 | 40 | 40 |
| TEGDMA | 0.3 | 0.3 | 0.3 | 0.3 | 0.3 |
| Perkadox 16 | 0.5 | 0.5 | 0.5 | 0.5 | 0.5 |
| PG | 10 | 10 | 10 | 10 | 20 |
| AA | 4.8 | 5.5 | 4.8 | 5.5 | 5.0 |
| Norbloc | 1.5 | 1.5 | 1.5 | 1.5 | 1.5 |
| MPC | 4 | 0 | 0 | 0 | 0 |
| RB247 | 0.01 | 0.01 | 0.01 | 0.01 | 0.01 |

Cast-Molded Silicone Hydrogel Contact Lenses

SiHy lens precursors (dry lenses) are cast-molded according to the procedures described in Example 2. After dry demolding/delensing, the SiHy lens precursor (dry lenses) are packaged individually in 0.85 mL of IPC-5 saline prepared above in dew drop blister shells, followed by sterilization (autoclaved at 121° C. for 45 minutes).

TABLE 33

| | Lens Property | | | | |
|---|---|---|---|---|---|
| SiHy Lens Formulation | 14-1 | 14-2 | 14-3 | 14-4 | 14-5 |
| Modulus | N/A | N/A | 0.70 | N/A | N/A |
| Haze rate | clear | Clear/specks | hazy/specks | clear | hazy/specks |
| IP (IPC-5, 1AC) | 5.5 | 1.7 | 1.3 | 3.7 | 0.4 |

The lens properties are compiled in Table 33. The experiments showed MPC also improved lens clarity.

Example 16

Preparation of In-Package-Coating Saline—IPC-5

IPC saline (IPC-5) preparation is the same as Example 11.

Preparation of Polymerizable Compositions

Polymerizable compositions (SiHy lens formulations) are prepared to have compositions as shown in Table 34.

TABLE 34

| Component | SiHy lens formulation (unit part by weight) | | | |
|---|---|---|---|---|
| | 15-1 | 15-2 | 15-3 | 15-4 |
| HEMA | 2 | 2 | 2 | 2 |
| EOEMA | 45 | 45 | 45 | 45 |
| G2 | 40 | 40 | 40 | 40 |
| TEGDMA | 0.3 | 0.3 | 0.3 | 0.3 |
| Vazo 67 | 0.5 | 0.5 | 0.5 | 0.5 |
| PG | 20 | 20 | 20 | 20 |
| MAA | 3 | 3 | 3 | 3 |
| Norbloc | 1.5 | 1.5 | 1.5 | 1.5 |
| MPC | 1 | 1 | 1 | 1 |
| RB247 | 0.01 | 0.01 | 0.01 | 0.01 |

TABLE 34-continued

| Component | SiHy lens formulation (unit part by weight) | | | |
|---|---|---|---|---|
| | 15-1 | 15-2 | 15-3 | 15-4 |
| NVP | 0 | 1 | 1 | 1 |
| AMA | 0 | 0 | 0.1 | 0 |
| TEGDVE | 0 | 0 | 0 | 0.1 |

Cast-Molded Silicone Hydrogel Contact Lenses

SiHy lens precursors (dry lenses) are cast-molded according to the procedures described in Example 2. After dry demolding/delensing, the SiHy lens precursor (dry lenses) are packaged individually in 0.85 mL of IPC-5 saline prepared above in dew drop blister shells, followed by sterilization (autoclaved at 121° C. for 45 minutes).

TABLE 35

| | Lens Property | | | |
|---|---|---|---|---|
| SiHy Lens Formulation | 15-1 | 15-2 | 15-3 | 15-4 |
| IP (IPC-5, 1 × AC) | 0.7 | 0.4 | 0.6 | 0.4 |

The lens IP values are listed in table 35. The experiments showed that small amount of NVP, AMA or TEGDVE in formulation didn't improve lens IP.

Example 17

Preparation of In-Package-Coating Saline—IPC-5

IPC saline (IPC-5) preparation is the same as Example 11.

Preparation of Polymerizable Compositions

Polymerizable compositions (SiHy lens formulations) are prepared to have compositions as shown in Table 36.

TABLE 36

| Component | Lens formulation (unit parts by weight) | | |
|---|---|---|---|
| | 16-1 | 16-2 | 16-3 |
| HEMA | 3 | 2 | 2 |
| EOEMA | 45 | 45 | 45 |
| G2 | 45 | 45 | 45 |
| TEGDMA | 0.3 | 0.3 | 0.3 |
| Vazo 67 | 0.5 | 0.5 | 0.5 |
| PG | 20 | 20 | 20 |
| AA | 4.5 | 5 | 5 |
| Norbloc | 1.5 | 1.5 | 1.5 |
| MPC | 3 | 3 | 2 |
| RB247 | 0.01 | 0.01 | 0.01 |
| NVP | 0 | 0 | 0.5 |

Cast-Molded Silicone Hydrogel Contact Lenses

SiHy lens precursors (dry lenses) are cast-molded according to the procedures described in Example 2. After dry demolding/delensing, the SiHy lens precursor (dry lenses) are packaged individually in 0.85 mL of IPC-5 saline prepared above in dew drop blister shells, followed by sterilization (autoclaved at 121° C. for 45 minutes).

TABLE 37

| | Lens Property | | |
|---|---|---|---|
| SiHy Lens Formulation | 16-1 | 16-2 | 16-3 |
| Finger lubricity (OOP) | 1 | 1 | 0-1 |
| Finger lubricity (soaked in PBS overnight) | 1 | 1 | 1 |

TABLE 37-continued

| | Lens Property | | |
|---|---|---|---|
| SiHy Lens Formulation | 16-1 | 16-2 | 16-3 |
| Dkc (barrer) | 64 | 65 | NA |
| Contact angle | 46 | 49 | NA |
| Modulus (MPa) | 0.71 | 0.69 | NA |
| Haze | clear | clear | clear |
| IP (IPC-5, 1 × AC) | 6.0 | 9.5 | 7.4 |

Example 18

Preparation of In-Package-Coating Saline—IPC-7

The IPC saline (IPC-7) is prepared based below composition —~0.05% by weight of PAE; 0.07% by weight of Poly(AAm-co-AA) (90/10), 0.776% by weight of Na2HPO4·2H2O, 0.044% by weight of NaH2PO4·H2O, 0.160% by weight of NaCl; and QA to 100% by water.

Preparation of In-Package-Coating Saline—IPC-7B

The IPC saline (IPC-7B) is prepared based below composition —~0.05% by weight of PAE; 0.07% by weight of Poly(AAm-co-AA) (90/10), 0.776% by weight of Na2HPO4·2H2O, 0.044% by weight of NaH2PO4·H2O, 0.160% by weight of NaCl; EDTA 10 ppm, and QA to 100% by water.

Preparation of Polymerizable Compositions

Polymerizable compositions (SiHy lens formulation) are prepared to have compositions as shown in Table 38.

TABLE 38

| | Lens formulation (Unit parts by weight) | | | |
|---|---|---|---|---|
| Component | 17-1 | 17-2 | 17-3 | 17-4 |
| G2 | 45 | 45 | 45 | 25 |
| HO-PDMS-MA | — | — | — | 20 |
| EOEMA | 45 | 45 | 35 | 40 |
| HEMA | 2 | 2 | 2 | 6 |
| AA | 5 | 3 | — | 2.5 |
| MAA | — | — | 3 | — |
| AA potassium salt | — | 3 | — | — |
| MAA sodium salt | — | — | 3 | 3 |
| MPC | 3 | 3 | 3 | 3 |
| PG | 20 | 20 | 20 | 20 |
| TEGDMA | 0.3 | 0.3 | 0.3 | 0.3 |
| Vazo 67 | 0.5 | — | 0.5 | 0.5 |
| Vazo 52 | — | 0.5 | — | — |
| Norbloc | 1.5 | 1.5 | 1.5 | 1.5 |
| RB247 | 0.01 | 0.01 | 0.01 | 0.01 |

Cast-Molded Silicone Hydrogel Contact Lenses

SiHy lens precursors (dry lenses) are cast-molded from lens formulations 17-1 and 17-3 according to the procedures described in Example 2.

SiHy lens precursors (dry lenses) are cast-molded from lens formulations 17-2 and 17-4 as follows. A lens formulation is purged with nitrogen at room temperature for 30 to 35 minutes. The $N_2$-purged lens formulation is introduced into polypropylene molds and thermally cured in an oven under nitrogen under the following curing conditions: ramp from room temperature to 55° C. at a ramp rate of about 7° C./minute; holding at 55° C. for about 30 minutes; ramp from 55° C. to 100° C. at a ramp rate of about 7° C./minute; and holding at 100° C. for about 100 minutes.

After dry demolding/delensing, the SiHy lens precursor (dry lens) are packaged individually in 0.85 mL of IPC-7 or IPC-7B saline prepared above in dew drop blister shells, followed by sterilization (autoclaved at 121° C. for 45 minutes)

TABLE 39

| SiHy Lens Formulation | Lens Property | | | |
|---|---|---|---|---|
| | 17-1 | 17-2 | 17-3 | 17-4 |
| Clarity of Dry Lens | Clear | Clear | Clear | Clear |
| Clairty of Finished Lens | Clear | Clear | Clear | Clear |
| Modulus | 0.68 ± 0.00 | 0.87 ± 0.02 | 0.83 ± 0.01 | 0.61 ± 0.01 |
| EtB % | 143 ± 11 | 105 ± 54 | 127 ± 4 | 160 ± 3 |
| SBQ % | 1.06 | 0.02 | 0.71 | 0.001 |
| Finger lubricity (OOP) | 1 | 0-1 | 0-1 | 0-1 |
| Finger lubricity (overnight in PBS) | 1 | 0-1 | 0-1 | 0-1 |
| Dkc (barrer) | 61 ± 4 | N/A | N/A | 66 ± 1 |
| Ion permeability | 12.7 ± 0.8 | 11.9 ± 1.5 | N/A | N/A |

EtB % stands for elongation at break; SBQ % stands for Sudan Black Quantifier which is determined in Sudan Black staining tests and measured at a scale of 0-100%.

All the publications, patents, and patent application publications, which have been cited herein above in this application, are hereby incorporated by reference in their entireties.

What is claimed is:

1. A method for producing coated silicone hydrogel contact lenses which are optically clear and have an oxygen permeability of at least about 50 barrers, wherein no ophthalmically incompatible organic solvent is used in the method, wherein the method comprises the steps of:

(1) introducing a polymerizable composition into a lens mold, wherein the polymerizable composition comprises (a) from about 35% to about 60% at least one hydrophilized polysiloxane vinylic crosslinker relative to the total amount of all polymerizable components, (b) hydroxyethyl methacrylate, (c) ethoxyethyl (meth)acrylate, (d) from about 2% to about 10% by weight of at least one carboxyl-containing (meth)acryloxy monomer relative to the total amount of all polymerizable components, and (e) at least one free-radical initiator, wherein the polymerizable composition is formulated in an ophthalmically compatible organic solvent selected from the group consisting of propylene glycol, a polyethyleneglycol having a molecular weight of about 400 Daltons or less, wherein the sum of the amounts of components (a) to (e) is at least 96 by weight, relative to the total amount of all polymerizable components in the polymerizable composition, wherein the sum of the amounts of components of components (b) and (c) is from about 35% to about 60% by weight relative to the total amount of all polymerizable components in the polymerizable composition;

(2) curing thermally or actinically the polymerizable composition in the lens mold to form a dry lens precursor comprising a bulk silicone hydrogel material that comprises carboxyl groups carboxyl groups on and/or near the surface of the bulk silicone hydrogel material; and (3) forming a coated silicone hydrogel contact lens by heating the dry lens precursor obtained in step (2) directly in an aqueous solution having a pH from about 6.8 to about 8.5 and including at least one water-soluble, thermally-crosslinkable hydrophilic polymeric material at a temperature from about 60° C. to about 140° C., wherein the coated silicone hydrogel contact lens comprises the bulk silicone hydrogel material and a layer of a crosslinked hydrophilic polymeric material that is covalently attached onto the bulk silicone hydrogel material through the carboxyl groups on and/or near the surface of the bulk silicone hydrogel material, wherein the coated silicone hydrogel contact lens exhibits a water-break-up-time (WBUT) of at least about 10 seconds and an oxygen permeability of at least about 50 barrers.

2. The method of claim 1, wherein the polymerizable composition further comprises one or more polymerizable components selected from the group consisting of (g) a non-silicone vinylic crosslinker, (h) a UV-absorbing vinylic monomer, (i) a polymerizable UV/high-energy-violet-light absorbing compound, (j) a polymerizable photochromic compound, (k) a polymerizable tinting agent, and (l) combinations thereof, provided the sum of the components (g) to (l) is less than 4% by weight relative to the amount of all polymerizable components.

3. The method of claim 2, wherein the step of heating is performed by autoclaving the dry lens precursor immersed in a packaging solution which is a buffered aqueous solution in a sealed lens package at a temperature of from about 115° C. to about 125° C. for approximately 20-90 minutes.

4. The method of claim 3, wherein said at least one water-soluble and thermally crosslinkable hydrophilic polymeric material comprises azetidinium groups, epoxy groups or combinations thereof.

5. The method of claim 4, wherein said at least one water-soluble and thermally crosslinkable hydrophilic polymeric material is: one or more multi-armed polyethylene glycols each having terminal epoxy groups; a mixture of a multi-armed polyethylene glycol having terminal epoxy group and one or more polyethylene glycol each having terminal functional groups selected from the group consisting of primary amine groups, secondary amine groups, carboxyl groups, thiol groups, and combinations thereof; a partial reaction product of a multi-armed polyethylene having terminal epoxy groups and a hydrophilicity-enhancing agent having at least one reactive functional group selected from the group consisting of amino group, carboxyl group, thiol group; or combinations thereof.

6. The method of claim 4, wherein said at least one water-soluble and thermally crosslinkable hydrophilic polymeric material comprises azetidinium groups and is a partial reaction product of an azetidinium-containing polymer and a hydrophilicity-enhancing agent having at least one reactive functional group selected from the group consisting of a primary amine group, a secondary amine group, a carboxyl group, a thiol group, and combinations thereof.

7. The method of claim 6, wherein the azetidinium-containing polymer is a poly(2-oxazoline-co-ethylene-imine)-epichlorohydrin copolymer, a polyamidoamine-epichlorohydrin, a copolymer of an azetidinium-containing vinylic monomer with one or more hydrophilic vinylic monomers, or combinations thereof, wherein the hydrophilicity-enhancing agent is: (a) a primary amino-, secondary amino-, carboxyl- or thiol-containing monosaccharide; (b) a primary amino-, secondary amino-, carboxyl- or thiol-containing disaccharide; (c) a primary amino-, secondary amino-, carboxyl- or thiol-containing oligosaccharide; (d) a polysaccharide having primary amine groups, secondary amine groups, carboxyl groups, or combinations thereof; (e) a poly(ethylene glycol) having one sole functional group of —$NH_2$, —SH or —COOH; (f) a poly(ethylene glycol) having two terminal functional groups selected from the group consisting of —$NH_2$, —COOH, —SH, and combinations thereof; (g) a multi-arm poly(ethylene glycol) having one or more functional groups selected from the group consisting of —$NH_2$, —COOH, —SH, and combinations thereof; (h) a monoamino-, monocarboxyl-, diamino- or dicarboxyl-terminated homo- or copolymer of a non-reactive hydrophilic vinylic monomer; (i) a copolymer which is a polymerization product of a composition comprising (1) from about 0.1% to about 30% of a reactive vinylic monomer and (2) at least one non-reactive hydrophilic vinylic monomer, wherein the reactive vinylic monomer is a vinylic monomer having a functional group selected from the group consisting of carboxyl group, a primary amine group, and a secondary amine group, wherein the non-reactive hydrophilic monomer is a hydrophilic vinylic monomer free of any carboxyl group, primary amine group, secondary amine group, epoxide group, isocyanate group, azlactone group, or aziridine group; or (j) combinations thereof.

8. The method of claim 7, wherein the aqueous solution has a pH of from about 7.0 to about 8.2, wherein the aqueous solution comprises from about 0.01% to about 2% by weight of said at least one water-soluble thermally-crosslinkable hydrophilic polymeric material.

9. The method of claim 4, wherein the coated silicone hydrogel contact lens has an elastic modulus of from about 0.2 MPa to about 1.8 MPa, an equilibrium water content of from about 20% to about 75% by weight (i.e., when being fully hydrated), a friction rating of about 3.0 or lower, an average water contact angle of about 90 degrees or lower by sessile drop.

10. The method of claim 4, wherein said at least one hydrophilized polysiloxane vinylic crosslinker comprises at least about 1.50 milliequivalent/gram ("meq/g") of hydrophilic moieties, which preferably are hydroxyl groups (—OH), carboxyl groups (—COOH), amino groups (—$NHR_{N1}$ in which $R_{N1}$ is H or $C_1$-$C_2$ alkyl), amide moieties (—CO—$NR_{N1}R_{N2}$ in which $R_{N1}$ is H or $C_1$-$C_2$ alkyl and $R_{N2}$ is a covalent bond, H, or $C_1$-$C_2$ alkyl), N—$C_1$-$C_3$ acylamino groups, urethane moieties (—NH—CO—O—), urea moieties (—NH—CO—NH—), a polyethylene glycol chain of

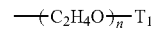

in which n is an integer of 2 to 20 and $T_1$ is H, methyl or acetyl or a phosphorylcholine group, or combinations thereof.

11. The method of claim 10, wherein said at least one hydrophilized polysiloxane vinylic crosslinker a polysiloxane vinylic crosslinker that comprises (1) a polysiloxane segment comprising dimethylsiloxane units and hydrophilized siloxane units each having one methyl substituent and one monovalent $C_4$-$C_{40}$ organic radical substituent having 2 to 6 hydroxyl groups and (2) two terminal (meth) acryloyl groups.

12. The method of claim 11, wherein said at least one hydrophilized polysiloxane vinylic crosslinker comprises a polysiloxane vinylic crosslinker of formula (1)

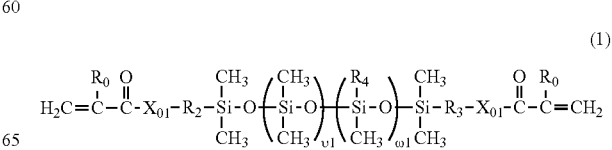

in which:

υ1 is an integer of from 30 to 500 and ω1 is an integer of from 1 to 75, provided that ω1/υ1 is from about 0.035 to about 0.15;

$X_{01}$ is O or $NR_n$ in which $R_n$ is hydrogen or $C_1$-$C_{10}$-alkyl;

$R_o$ is hydrogen or methyl;

$R_2$ and $R_3$ independently of each other are a substituted or unsubstituted $C_1$-$C_{10}$ alkylene divalent radical or a divalent radical of —$R_5$—O—$R_6$— in which $R_5$ and $R_6$ independently of each other are a substituted or unsubstituted $C_1$-$C_{10}$ alkylene divalent radical;

$R_4$ is a monovalent radical of any one of formula (2) to (7)

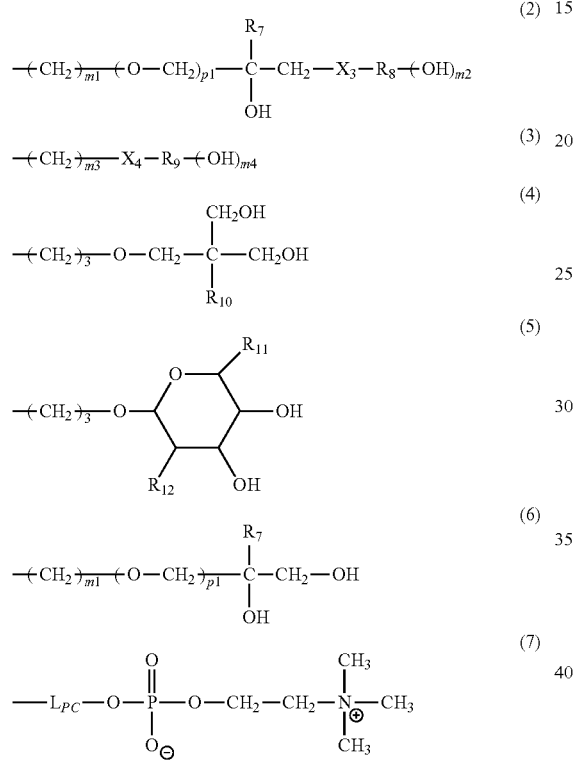

p1 is zero or 1; m1 is an integer of 2 to 4; m2 is an integer of 1 to 5; m3 is an integer of 3 to 6; m4 is an integer of 2 to 5;

$R_7$ is hydrogen or methyl;

$R_8$ is a $C_2$-$C_6$ hydrocarbon radical having (m2+1) valencies;

$R_9$ is a $C_2$-$C_6$ hydrocarbon radical having (m4+1) valencies;

$R_{10}$ is ethyl or hydroxymethyl;

$R_{11}$ is methyl or hydromethyl;

$R_{12}$ is hydroxyl or methoxy;

$X_3$ is a sulfur linkage of —S— or a tertiary amino linkage of —$NR_{13}$— in which $R_{13}$ is $C_1$-$C_1$ alkyl, hydroxyethyl, hydroxypropyl, or 2,3-dihydroxypropyl;

$X_4$ is an amide linkage of

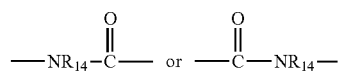

in which $R_{14}$ is hydrogen or $C_1$-$C_{10}$ alkyl;

$L_{PC}$ is a divalent radical of

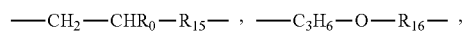

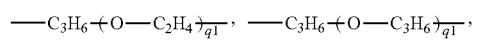

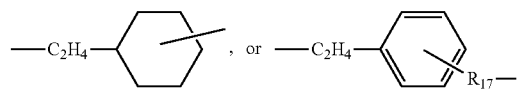

in which q1 is an integer of 1 to 20, $R_{15}$ is a linear or branched $C_1$-$C_{10}$ alkylene divalent radical, $R_{16}$ is a linear or branched $C_3$-$C_{10}$ alkylene divalent radical, and $R_{17}$ is a direct bond or a linear or branched $C_1$-$C_4$ alkylene divalent radical.

* * * * *